US012652623B2

(12) United States Patent
Farag

(10) Patent No.: US 12,652,623 B2
(45) Date of Patent: Jun. 9, 2026

(54) SL POSITIONING POWER CONTROL

(71) Applicant: Samsung Electronics Co., Ltd.,
Suwon-si (KR)

(72) Inventor: Emad Nader Farag, Flanders, NJ (US)

(73) Assignee: Samsung Electronics Co., Ltd.,
Suwon-si (KR)

( * ) Notice: Subject to any disclaimer, the term of this
patent is extended or adjusted under 35
U.S.C. 154(b) by 323 days.

(21) Appl. No.: 18/414,097

(22) Filed: Jan. 16, 2024

(65) Prior Publication Data

US 2024/0276397 A1 Aug. 15, 2024

Related U.S. Application Data

(60) Provisional application No. 63/470,316, filed on Jun.
1, 2023, provisional application No. 63/446,725, filed
(Continued)

(51) Int. Cl.
*H04W 52/32* (2009.01)
*H04W 52/06* (2009.01)
*H04W 52/24* (2009.01)

(52) U.S. Cl.
CPC ......... *H04W 52/325* (2013.01); *H04W 52/06*
(2013.01); *H04W 52/242* (2013.01)

(58) Field of Classification Search
CPC .. H04W 52/325; H04W 52/06; H04W 52/242
(Continued)

(56) References Cited

U.S. PATENT DOCUMENTS

| | | | | |
|---|---|---|---|---|
| 10,716,084 | B2 * | 7/2020 | Wang | G01S 5/021 |
| 11,357,000 | B2 * | 6/2022 | Liu | H04W 72/044 |

(Continued)

FOREIGN PATENT DOCUMENTS

| | | | | |
|---|---|---|---|---|
| WO | 2022068610 A1 | 4/2022 | | |
| WO | WO-2023048917 A1 * | 3/2023 | | G01S 5/0236 |

OTHER PUBLICATIONS

"5G; NR; Physical channels and modulation (3GPP TS 38.211
version 17.6.0 Release 17)", ETSI TS 138 211 V17.6.0, Oct. 2023,
140 pages.

(Continued)

*Primary Examiner* — April G Gonzales

(57) ABSTRACT

Methods and apparatuses for sidelink (SL) positioning
power control in a wireless communication system. A
method of operating a user equipment (UE) includes deter-
mining a power for a SL positioning reference signal (PRS)
in a transmission occasion i based on $P_{SL\text{-}PRS}(i)=$
$\min(P_{CMAX}, P_{MAX,CBR}, \min(P_{SL\text{-}PRS,D}(i), P_{SL\text{-}PRS,SL}(i)))$.
$P_{CMAX}$ is a configured maximum output power of the UE.
$P_{MAX,CBR}$ is related to a priority level of the SL PRS and a
channel busy ratio (CBR) range for a CBR measured in slot
i–N, where N is a congestion control processing time.
$P_{SL\text{-}PRS,D}(i)$ is a component for downlink (DL) pathloss
based power control for the SL PRS. $P_{SL\text{-}PRS,SL}(i)$ is a
component for SL pathloss based power control for the SL
PRS. The method further includes transmitting the SL PRS
in the transmission occasion i with the power $P_{SL\text{-}PRS}(i)$.

20 Claims, 8 Drawing Sheets

Related U.S. Application Data on Feb. 17, 2023, provisional application No. 63/442,036, filed on Jan. 30, 2023.

(58) Field of Classification Search
USPC ......................................................... 455/522
See application file for complete search history.

(56) References Cited

U.S. PATENT DOCUMENTS

| | | | | |
|---|---|---|---|---|
| 11,457,431 | B2 * | 9/2022 | Tseng | H04W 76/14 |
| 11,516,749 | B2 * | 11/2022 | Scholand | H04W 52/242 |
| 11,595,912 | B2 * | 2/2023 | Fakoorian | H04W 72/53 |
| 11,700,580 | B2 * | 7/2023 | Lee | H04L 5/0051 |
| | | | | 370/318 |
| 11,737,029 | B2 * | 8/2023 | Ryu | H04B 17/309 |
| | | | | 370/329 |
| 11,770,804 | B2 * | 9/2023 | Lee | H04W 28/26 |
| | | | | 370/329 |
| 11,902,910 | B2 * | 2/2024 | Cozzo | H04W 52/346 |
| 12,207,234 | B2 * | 1/2025 | Hwang | H04W 72/02 |
| 12,302,308 | B2 * | 5/2025 | Hwang | H04W 4/40 |
| 12,302,384 | B2 * | 5/2025 | Hwang | H04W 76/28 |
| 12,426,093 | B2 * | 9/2025 | Hwang | H04B 17/328 |
| 2017/0339658 | A1 * | 11/2017 | Wang | G01S 5/021 |
| 2019/0132033 | A1 * | 5/2019 | Akkarakaran | H04B 7/0682 |
| 2020/0045674 | A1 * | 2/2020 | Tseng | H04W 76/14 |
| 2020/0314770 | A1 * | 10/2020 | Wu | H04W 52/367 |
| 2020/0413348 | A1 * | 12/2020 | Ryu | H04W 52/241 |
| 2021/0029685 | A1 * | 1/2021 | Liu | H04W 52/283 |
| 2022/0007302 | A1 * | 1/2022 | Lin | H04B 17/328 |
| 2022/0116996 | A1 * | 4/2022 | Lee | H04W 74/0816 |
| 2022/0159583 | A1 * | 5/2022 | Wang | H04W 52/242 |
| 2022/0210747 | A1 * | 6/2022 | Lee | H04W 92/18 |
| 2022/0338132 | A1 * | 10/2022 | Hosseini | H04W 52/242 |
| 2023/0015555 | A1 * | 1/2023 | Hwang | H04W 52/367 |
| 2023/0052126 | A1 * | 2/2023 | Nam | H04L 5/00 |
| 2023/0403660 | A1 * | 12/2023 | Zhang | H04L 5/005 |
| 2025/0379873 | A1 * | 12/2025 | Azzedin | H04L 63/1416 |

OTHER PUBLICATIONS

"5G; NR; Multiplexing and channel coding (3GPP TS 38.212 version 17.6.0 Release 17)", ETSI TS 138 212 V17.6.0, Oct. 2023, 206 pages.

"5G; NR; Physical layer procedures for control (3GPP TS 38.213 version 17.7.0 Release 17)", ETSI TS 138 213 V17.7.0, Oct. 2023, 268 pages.

"5G; NR; Physical layer procedures for data (3GPP TS 38.214 version 17.7.0 Release 17)", ETSI TS 138 214 V17.7.0, Oct. 2023, 236 pages.

"3rd Generation Partnership Project; Technical Specification Group Radio Access Network; NR; Physical layer measurements (Release 17)", 3GPP TS 38.215 V17.4.0, Dec. 2023, 27 pages.

"5G; NR; Medium Access Control (MAC) protocol specification (3GPP TS 38.321 version 17.6.0 Release 17)", ETSI TS 138 321 V17.6.0, Oct. 2023, 255 pages.

"5G; NR; Radio Resource Control (RRC); Protocol specification (3GPP TS 38.331 version 17.3.0 Release 17)", ETSI TS 138 331 V17.3.0, Jan. 2023, 1295 pages.

"3rd Generation Partnership Project; Technical Specification Group Radio Access Network; Evolved Universal Terrestrial Radio Access (E-UTRA); Physical layer procedures (Release 17)", 3GPP TS 36.213 V17.6.0, Dec. 2023, 584 pages.

"3rd Generation Partnership Project; Technical Specification Group Radio Access Network; Study on scenarios and requirements of in-coverage, partial coverage, and out-of-coverage NR positioning use cases (Release 17)", 3GPP TR 38.845 V17.0.0, Sep. 2021, 16 pages.

International Search Report and Written Opinion issued May 27, 2024 regarding International Application No. PCT/KR2024/001377, 7 pages.

Catt et al., "Further discussion on potential solutions for SL positioning", 3GPP TSG RAN WG1 #111 R1-2211203, Nov. 2022, 25 pages.

"3rd Generation Partnership Project; Technical Specification Group Radio Access Network; NR; Physical layer procedures for control (Release 17)", 3GPP TS 38.213 V17.4.0, Dec. 2022, 258 pages.

ZTE, "Discussion on potential solutions for SL positioning", 3GPP TSG RAN WG1 #111, R1-2211501, Nov. 2022, 28 pages.

Huawei et al., "Remaining issues for SL positioning solutions", 3GPP TSG-RAN WG1 Meeting #111, R1-2210901, Nov. 2022, 15 pages.

"3rd Generation Partnership Project; Technical Specification Group Radio Access Network; NR· Physical layer procedures for control (Release 17)", 3GPP TS 38.213 V17.0.0, Dec. 2021, 225 pages.

Supplementary European Search Report dated Apr. 14, 2026, in connection with European Application No. 24750528.2, 10 pages.

* cited by examiner

800
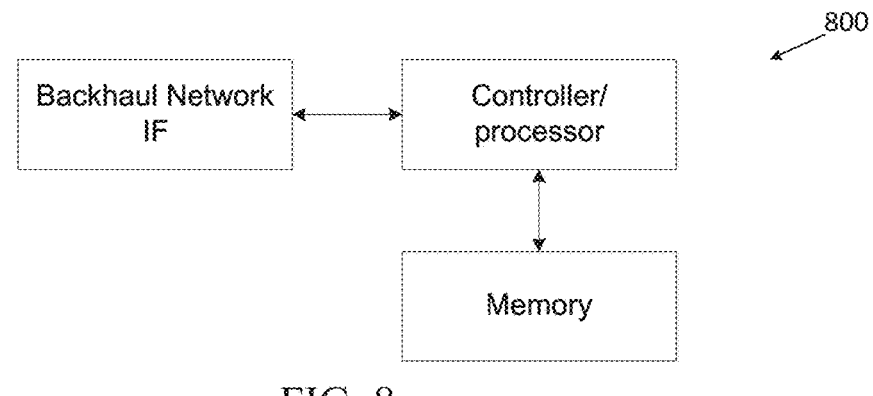
FIG. 8
900
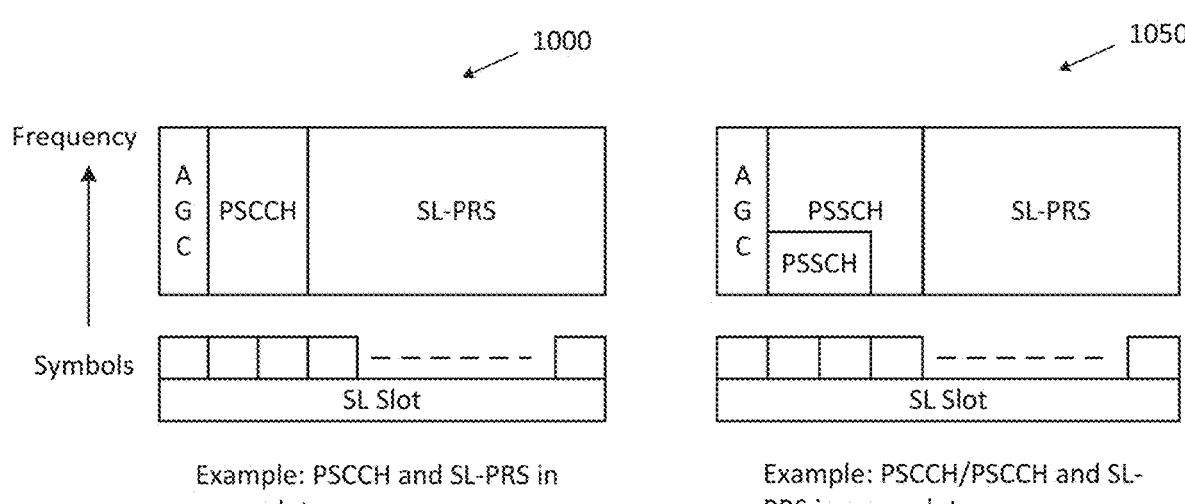
FIG. 9
1000
1050
FIG. 10A
FIG. 10B

SL POSITIONING POWER CONTROL

CROSS-REFERENCE TO RELATED APPLICATIONS AND CLAIM OF PRIORITY

The present application claims priority to:

U.S. Provisional Patent Application No. 63/442,036, filed on Jan. 30, 2023;

U.S. Provisional Patent Application No. 63/446,725, filed on Feb. 17, 2023; and

U.S. Provisional Patent Application No. 63/470,316, filed on Jun. 1, 2023. The contents of the above-identified patent documents are incorporated herein by reference.

TECHNICAL FIELD

The present disclosure relates generally to wireless communication systems and, more specifically, the present disclosure relates to sidelink (SL) positioning power control in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a SL positioning power control in a wireless communication system.

In one embodiment, a user equipment (UE) is provided. The UE includes a processor configured to determine a power for a SL positioning reference signal (PRS) in a transmission occasion i based on $P_{SL\text{-}PRS}(i)=\min(P_{CMAX}, P_{MAX,CBR},\min(P_{SL\text{-}PRS,D}(i),P_{SL\text{-}PRS,SL}(i)))$. $P_{CMAX}$ is a configured maximum output power of the UE. $P_{MAX,CBR}$ is related to a priority level of the SL PRS and a channel busy ratio (CBR) range for a CBR measured in slot i–N, where N is a congestion control processing time. $P_{SL\text{-}PRS,D}$ (i) is a component for downlink (DL) pathloss based power control for the SL PRS. $P_{SL\text{-}PRS,SL}(i)$ is a component for SL pathloss based power control for the SL PRS. The UE further includes a transceiver operably coupled to the processor. The transceiver is configured to transmit the SL PRS in the transmission occasion i with the power $P_{SL\text{-}PRS}(i)$.

In another embodiment, a method of operating a UE is provided. The method includes determining a power for a SL PRS in a transmission occasion i based on $P_{SL\text{-}PRS}(i)=\min(P_{CMAX},P_{MAX,CBR},\min(P_{SL\text{-}PRS,D}(i), P_{SL\text{-}PRS,SL}(i)))$. $P_{CMAX}$ is a configured maximum output power of the UE. $P_{MAX,CBR}$ is related to a priority level of the SL PRS and a CBR range for a CBR measured in slot i–N, where N is a congestion control processing time. $P_{SL\text{-}PRS,D}$ (i) is a component for DL pathloss based power control for the SL PRS. $P_{SL\text{-}PRS,SL}(i)$ is a component for SL pathloss based power control for the SL PRS. The method further includes transmitting the SL PRS in the transmission occasion i with the power $P_{SL\text{-}PRS}(i)$.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 8 illustrates an example of LMF according to embodiments of the present disclosure;

FIG. 9 illustrates an example of UE in a coverage of a network according to embodiments of the present disclosure;

FIGS. 10A-10B illustrate examples of SL-PRS transmission according to embodiments of the present disclosure;

DETAILED DESCRIPTION

Figure 1:
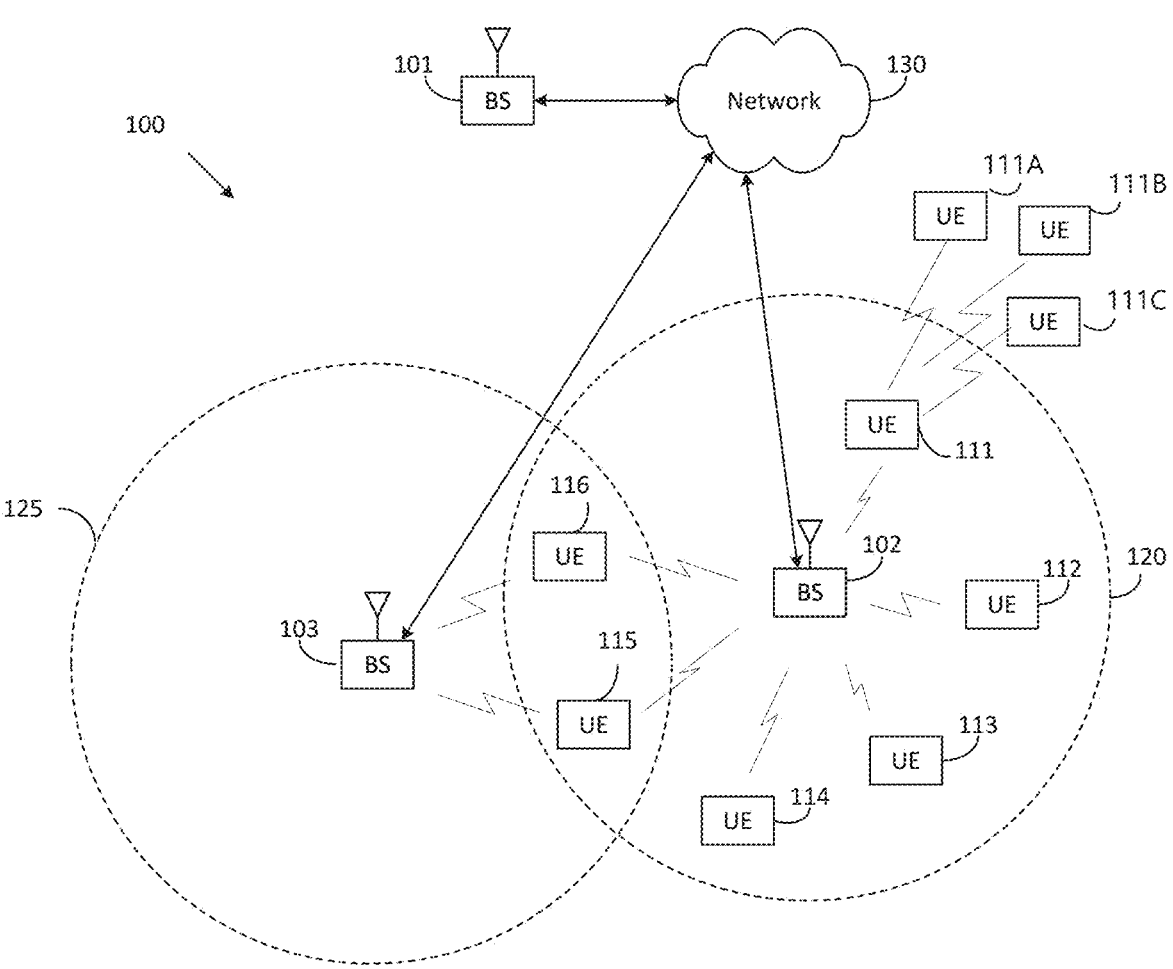
FIG. 1 illustrates an example of wireless network according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v17.6.0, "NR; Physical channels and modulation"; 3GPP TS 38.212 v17.6.0, "NR; Multiplexing and Channel coding"; 3GPP TS 38.213 v17.7.0, "NR; Physical Layer Procedures for Control"; 3GPP TS 38.214 v17.7.0, "NR; Physical Layer Procedures for Data"; 3GPP TS 38.215 v17.4.0, "NR; Physical Layer Measurements"; 3GPP TS 38.321 v17.6.0, "NR; Medium Access Control (MAC) protocol specification"; and 3GPP TS 38.331 v17.3.0, "NR; Radio Resource Control (RRC) Protocol Specification"; 3GPP TS 36.213 v17.6.0, "Evolved Universal Terrestrial Radio Access (E-UTRA); Physical layer procedures"; and 3GPP TR 38.845 v17.0.0, "Study on scenarios and requirements of in-coverage, partial coverage, and out-of-coverage NR positioning use cases."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation, radio access technology (RAT)-dependent positioning and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 2:
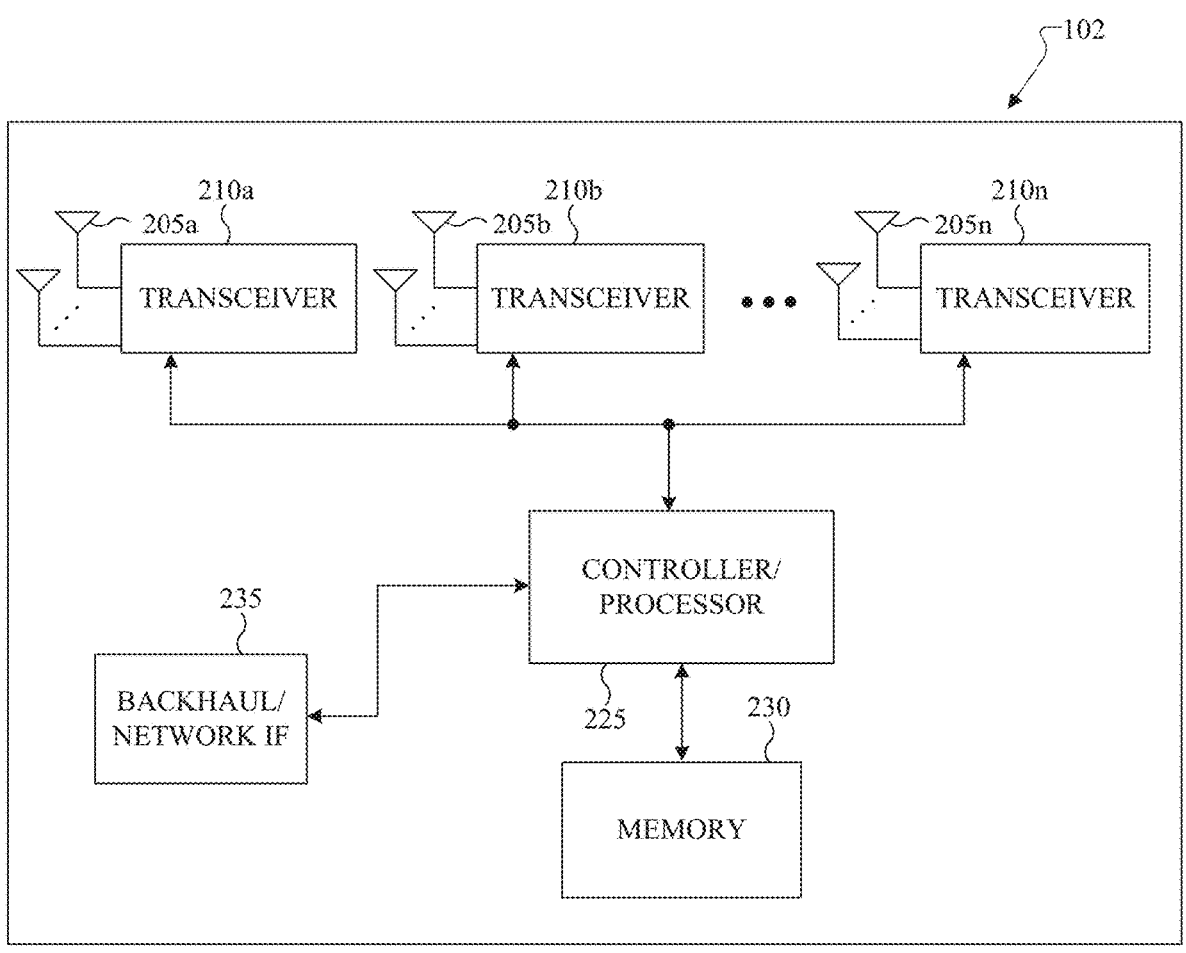
FIG. 2 illustrates an example of gNB according to embodiments of the present disclosure.
Figure 3:
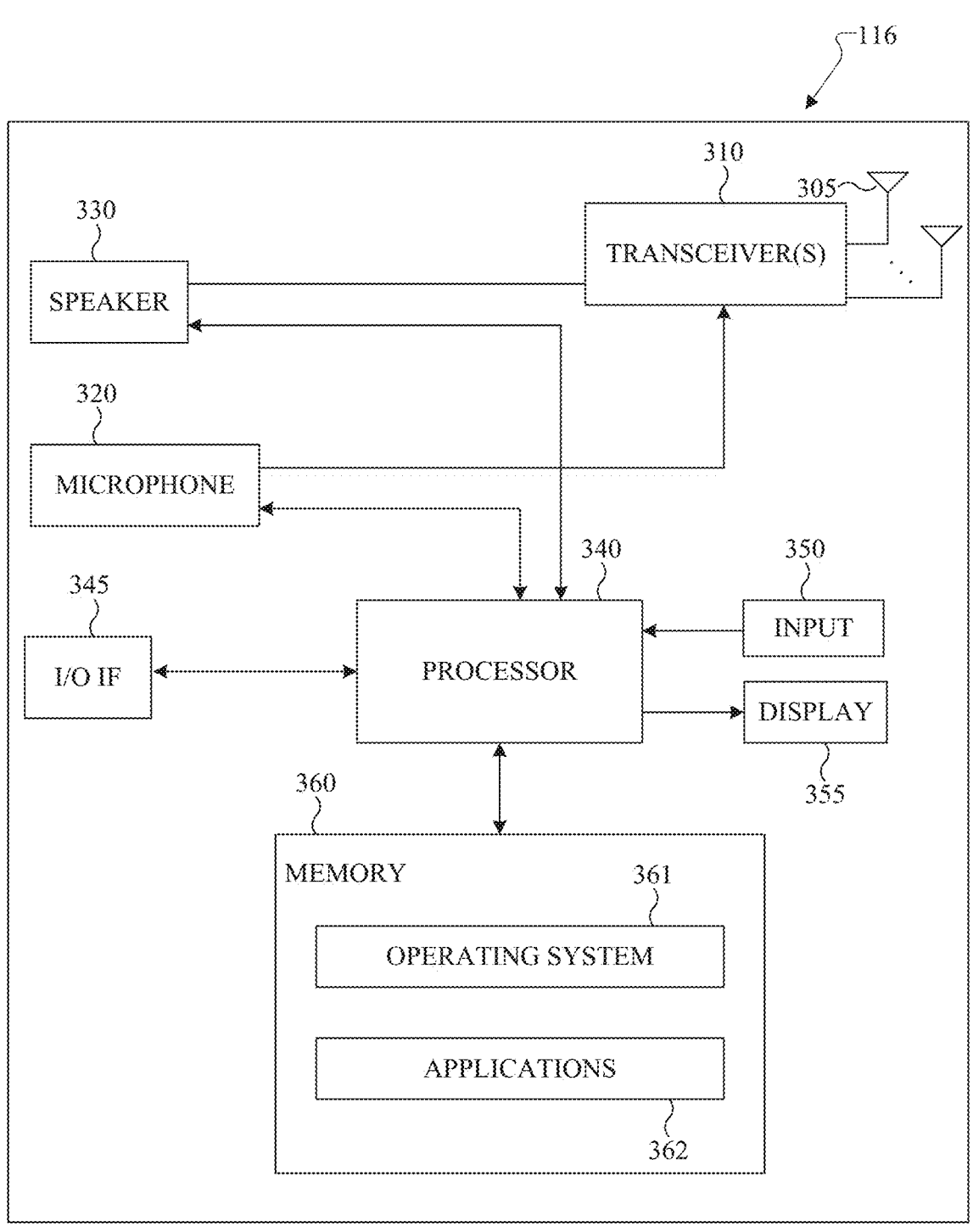
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

In another example, the UE 116 may be within network coverage and the other UE may be outside network coverage (e.g., UEs 111A-111C). In yet another example, both UEs are outside network coverage. In some embodiments, one or more of the gNBs 101-103 may communicate with each other and with the UEs 111-116 using 5G/NR, LTE, LTE-A, WiMAX, WiFi, or other wireless communication techniques. In some embodiments, the UEs 111-116 may use a device to device (D2D) interface called PC5 (e.g., also known as sidelink at the physical layer) for communication.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3$^{rd}$ generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for SL positioning power control in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UEs 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UEs 111A to 111C with or without support by the BS 102. Various of the UEs (e.g., as depicted by UEs 112 to 116) may be capable of one or more communication with their other UEs (such as UEs 111A to 111C as for UE 111).

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channels and/or signals and the transmission of DL channels and/or signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The controller/processor 225 is also capable of executing programs and other processes resident in the memory 230, such as an OS. The controller/processor 225 can move data into or out of the memory 230 as required by an executing process.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100 or by other UEs (e.g., one or more of UEs 111-115) on a SL channel. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channels and/or signals and SL channels and/or signals and the transmission of UL channels and/or signals and SL channels and/or signals by the transceiver(s) 310 in accordance with well-known principles. In some embodiments, the processor 340 includes at least one microprocessor or microcontroller.

The processor 340 is also capable of executing other processes and programs resident in the memory 360, such as processes for SL positioning power control in a wireless communication system.

The processor 340 can move data into or out of the memory 360 as required by an executing process. In some embodiments, the processor 340 is configured to execute the applications 362 based on the OS 361 or in response to signals received from gNBs or another UE or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355 which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figures 4, 5:
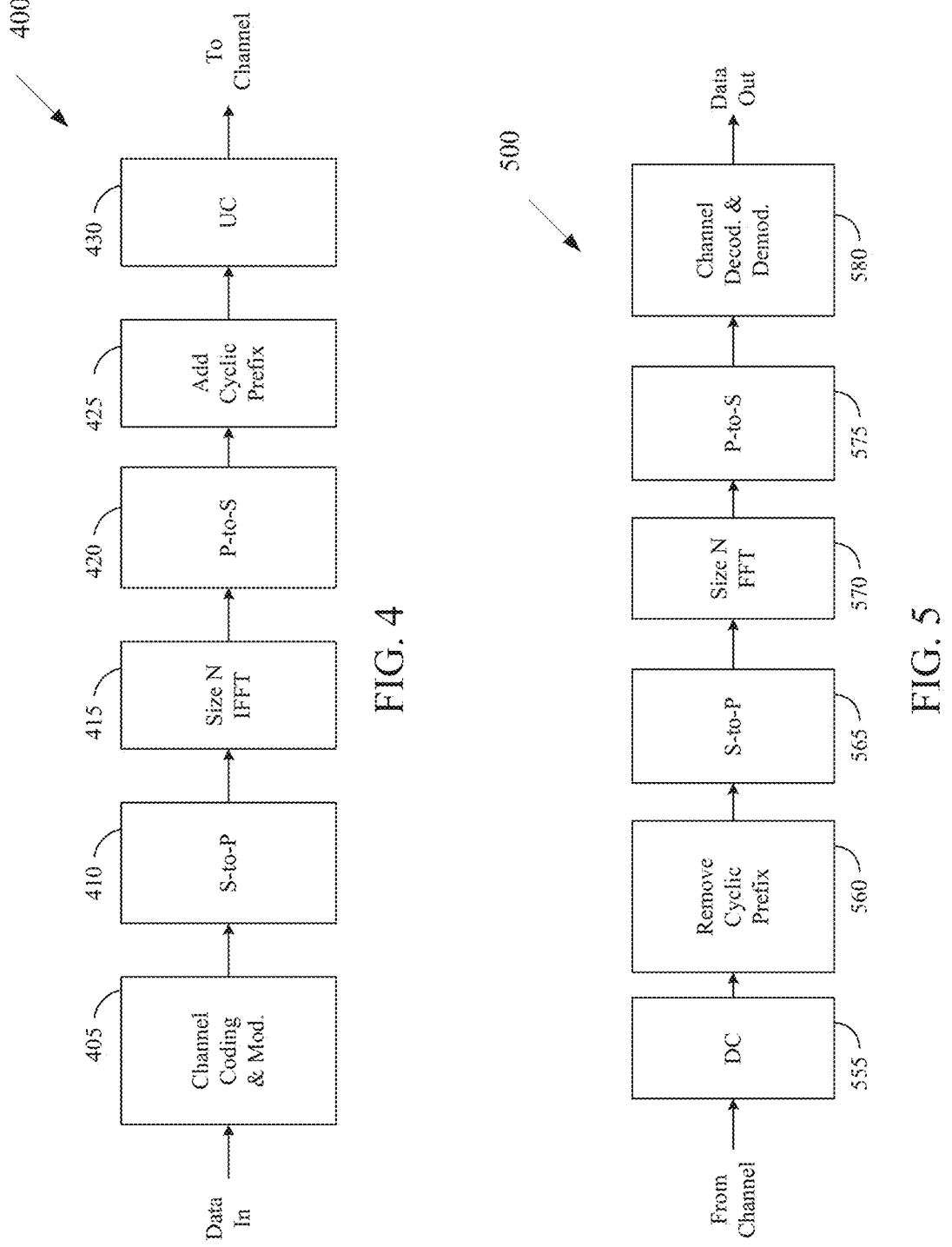
FIGS. 4 and 5 illustrate example of wireless transmit and receive paths according to this disclosure.

FIG. 4 and FIG. 5 illustrate example wireless transmit and receive paths according to this disclosure. In the following description, a transmit path 400 may be described as being implemented in a first UE (such as the UE 111), while a receive path 500 may be described as being implemented in a second UE (such as a UE 111A). However, it may be understood that the receive path 500 can be implemented in the second UE 111A and that the transmit path 400 can be implemented in the first UE 111. In some embodiments, the transmit path 400 and the receive path 500 are configured to support SL positioning power control in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 or another UE arrives at the UE 116 after passing through the wireless channel, and reverse operations to those at the gNB 102 or another UE are performed at the UE 116.

As illustrated in FIG. 5, the down converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 or transmitting in the sidelink to another UE and may implement the receive path 500 for receiving in the downlink from the gNBs 101-103 or receiving in the sidelink from another UE.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
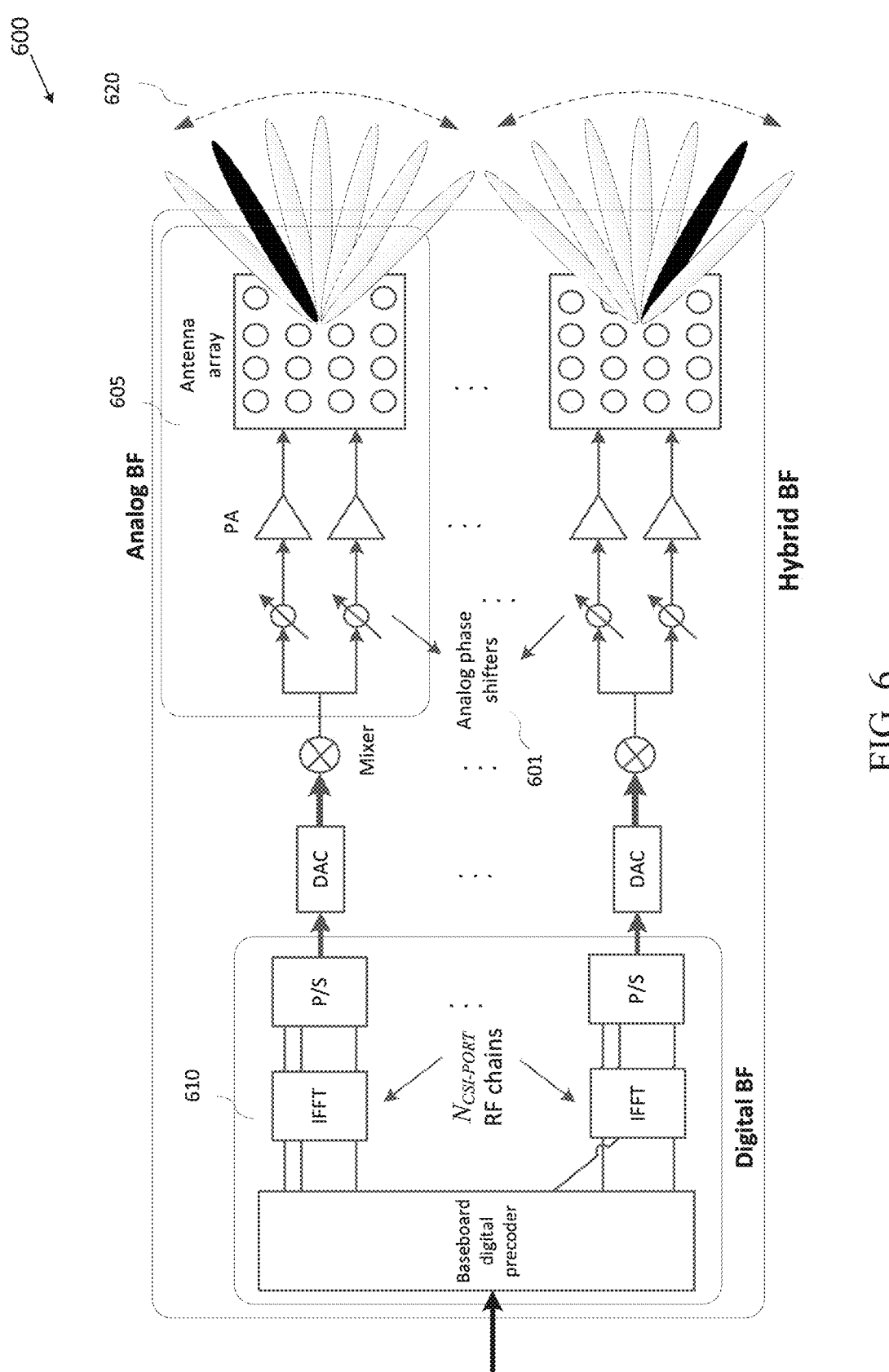
FIG. 6 illustrates an example of antenna structure according to embodiments of the present disclosure.

FIG. 6 illustrates an example antenna structure 600 according to embodiments of the present disclosure. For example, the antenna structure 600 may be implemented in user equipment such as UE 111. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL or SL TX beam (also termed "beam indication"), measuring at least one reference signal for calculating and performing beam reporting (also termed "beam measurement" and "beam reporting," respectively), and receiving a DL or UL or SL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

A time unit for DL signaling, for UL signaling, or for SL signaling on a cell is one symbol. A symbol belongs to a slot that includes a number of symbols such as 14 symbols. A slot can also be used as a time unit. A bandwidth (BW) unit is referred to as a resource block (RB). One RB includes a number of sub-carriers (SCs). For example, a slot can have duration of one millisecond and an RB can have a bandwidth of 180 kHz and include 12 SCs with inter-SC spacing of 15 kHz. As another example, a slot can have a duration of 0.25 milliseconds and include 14 symbols and an RB can have a BW of 720 kHz and include 12 SCs with SC spacing of 60 kHz. An RB in one symbol of a slot is referred to as physical RB (PRB) and includes a number of resource elements (REs). A slot can be either full DL slot, or full UL slot, or hybrid slot similar to a special subframe in time division duplex (TDD) systems. In addition, a slot can have symbols for SL communications and/or SL positioning. A UE can be configured one or more bandwidth parts (BWPs) of a system BW for transmissions or receptions of signals or channels.

An NR supports positioning on the Uu interface and SL interface. In the DL positioning reference signal (PRS) can be transmitted by a gNB to a UE to enable the UE to perform positioning measurements. In the UL a UE can transmit positioning sounding reference signal (SRS) to enable a gNB to perform positioning measurements. In SL a UE can transmit SL positioning reference signal (SL PRS) to another UE to perform positioning measurements for SL. UE measurements or metrics for positioning include; DL PRS reference signal received power (DL PRS RSRP), DL PRS reference signal received path power (DL PRS-RSRPP), DL reference signal time difference (DL RSTD), UE Rx–Tx time difference, DL reference signal carrier phase (DL RSCP), DL reference signal carrier phase difference (DL RSCPD), NR enhanced cell ID (E-CID) DL SSB radio resource management (RRM) measurement, and NR E-CID DL CSI-RS RRM measurement. UE measurements for positioning on the SL interface include; sidelink PRS reference signal received power (SL PRS-RSRP), sidelink PRS reference signal received path power (SL PRS-RSRPP), sidelink relative time of arrival (SL-RTOA), sidelink angle of arrival (SL AoA), sidelink Rx–Tx time difference, and sidelink reference signal time difference (SL RSTD). NG-RAN measurements for positioning include; UL relative time of arrival (UL-RTOA), UL angle of arrival (UL AoA), UL SRS reference signal received power (UL SRS-RSRP), UL SRS reference signal received path power (UL SRS-RSRPP), gNB Rx–Tx time difference, and UL reference signal carrier phase (UL RSCP). NR introduced several radio access technology (RAT) dependent positioning methods; time difference of arrival-based methods such DL time difference of arrival (DL-TDOA), UL time difference of arrival (UL TDOA) and SL time difference of arrival (SL TDOA), angle based methods such as UL angle of arrival (UL AoA) and DL angle of departure (DL AoD) and SL angle of arrival (SL AoA), multi-round trip time (RTT) based methods for Uu interface and SL interface and E-CID based methods.

Positioning schemes can be UE-based, i.e., the UE determines the location or UE-assisted (e.g., location management function (LMF) based), i.e., UE provides measurements for a network entity (e.g., LMF) to determine the location. LTE positioning protocol (LPP) [TS 37.355], first introduce for LTE and then extended to NR is used for communication between the UE and LMF. NR positioning protocol annex (NRPPa) [TS 38.455] is used for communication between the gNB and the LMF.

Figure 7:
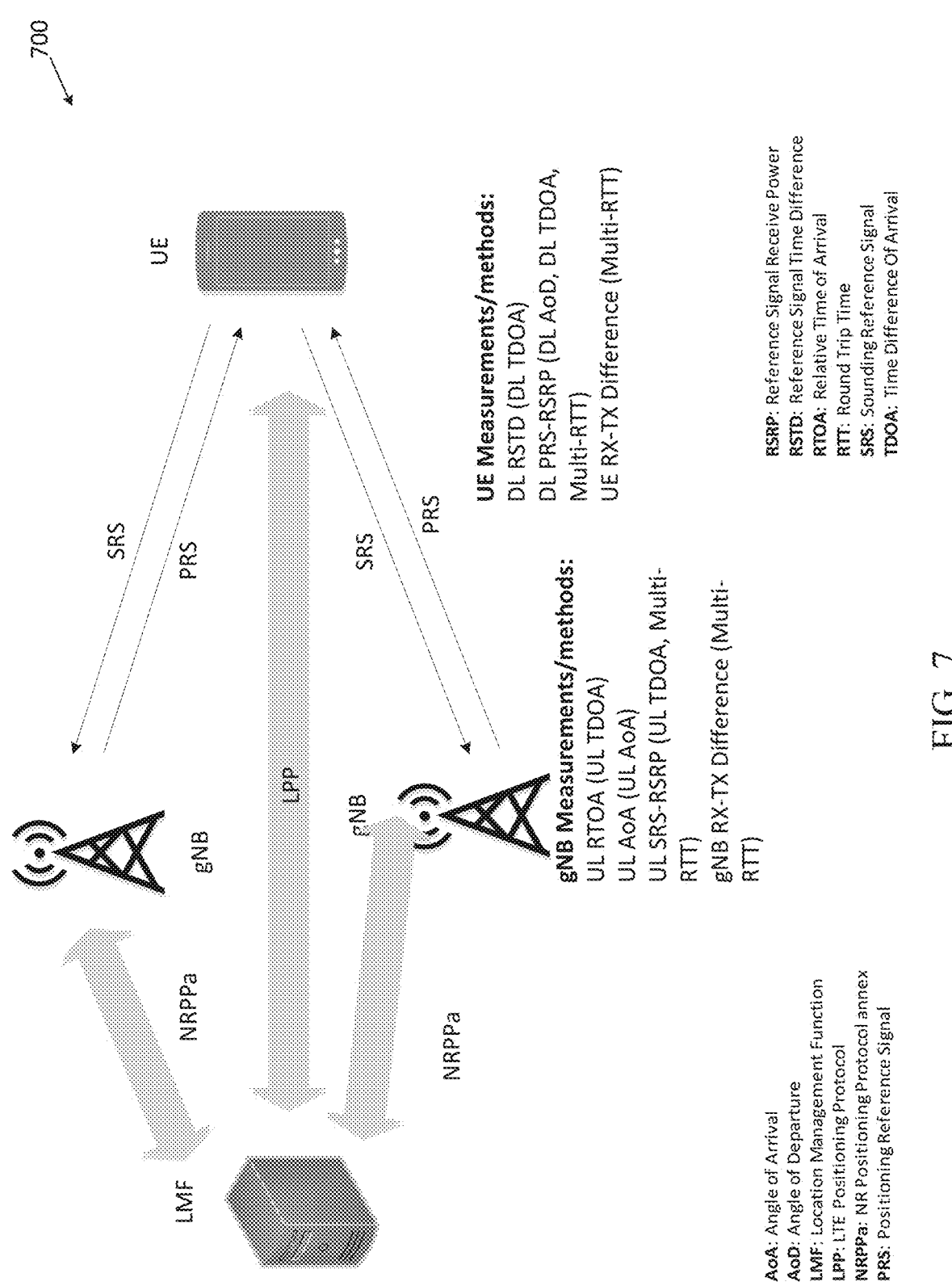
FIG. 7 illustrates an example of overall positioning architecture along with positioning measurements according to embodiments of the present disclosure.

FIG. 7 illustrates an example of overall positioning architecture along with positioning measurements 700 according to embodiments of the present disclosure. The embodiment of the overall positioning architecture along with positioning measurements 700 illustrated in FIG. 3 is for illustration only.

FIG. 8 illustrates an example of LMF 800 according to embodiments of the present disclosure. The embodiment of the LMF 800 illustrated in FIG. 8 is for illustration only.

FIG. 8 illustrates an example LMF according to this disclosure. The embodiment of the LMF shown in FIG. 8 is for illustration only. However, LMFs come in a wide variety of configurations, and FIG. 8 does not limit the scope of this disclosure to any particular implementation of an LMF.

As shown in FIG. 8, the LMF includes a controller/processor, a memory, and a backhaul or network interface.

The controller/processor can include one or more processors or other processing devices that control the overall operation of the LMF. For example, the controller/processor can support functions related to positioning and location services. Any of a wide variety of other functions can be supported in the LMF by the controller/processor. In some embodiments, the controller/processor includes at least one microprocessor or microcontroller.

The controller/processor is also capable of executing programs and other processes resident in the memory, such as a basic OS. In some embodiments, the controller/processor supports communications between entities, such as gNB and UE and supports protocols such as LPP and NRPPa. The controller/processor can move data into or out of the memory as required by an executing process.

The controller/processor is also coupled to the backhaul or network interface. The backhaul or network interface allows the LMF to communicate with other devices or systems over a backhaul connection or over a network. The interface can support communications over any suitable wired or wireless connection(s). For example, when the LMF is implemented as part of a cellular communication system or wired or wireless local area network (such as one supporting 5G, LTE, or LTE-A), the interface can allow the LMF to communicate with gNBs or eNBs or other network elements over a wired or wireless backhaul connection. The interface includes any suitable structure supporting communications over a wired or wireless connection, such as an Ethernet or RF transceiver.

The memory is coupled to the controller/processor. Part of the memory can include a RAM, and another part of the memory can include a Flash memory or other ROM. In certain embodiments, a plurality of instructions, such as a BIS algorithm is stored in memory. The plurality of instructions is configured to cause the controller/processor to perform the BIS process and to perform positioning or location services algorithms.

SL signals and channels are transmitted and received on sub-channels within a resource pool, where a resource pool is a set of time-frequency resources used for SL transmission and reception within a SL BWP. SL channels include physical SL shared channels (PSSCHs) conveying data information and second stage/part SL control information (SCI), physical SL control channels (PSCCHs) conveying first stage/part SCI for scheduling transmissions/receptions of PSSCHs, physical SL feedback channels (PSFCHs) conveying hybrid automatic repeat request acknowledgement (HARQ-ACK) information in response to correct (ACK value) or incorrect (NACK value) transport block receptions in respective PSSCHs, PSFCHs can also convey conflict information, and physical SL Broadcast channel (PSBCH) conveying system information to assist in SL synchronization. SL signals include demodulation reference signals DM-RS that are multiplexed in PSSCH or PSCCH transmissions to assist with data or SCI demodulation, channel state information reference signals (CSI-RS) for channel measurements, phase tracking reference signals (PT-RS) for tracking a carrier phase, SL primary synchronization signals (S-PSS) and SL secondary synchronization signals (S-SSS) for SL synchronization, and SL position reference signal (SL PRS) for SL positioning measurements. SCI can include two parts/stages corresponding to two respective SCI formats where, for example, the first SCI format is multiplexed on a PSCCH, and the second SCI format is multiplexed along with SL data on a PSSCH that is transmitted in physical resources indicated by the first SCI format.

A SL channel can operate in different cast modes. In a unicast mode, a PSCCH/PSSCH conveys SL information from one UE to only one other UE. In a groupcast mode, a PSCCH/PSSCH conveys SL information from one UE to a group of UEs within a (pre-)configured set. In a broadcast mode, a PSCCH/PSSCH conveys SL information from one UE to all surrounding UEs. In NR release 16, there are two resource allocation modes for a PSCCH/PSSCH transmission. In resource allocation mode 1, a gNB schedules a UE on the SL and conveys scheduling information to the UE transmitting on the SL through a DCI format (e.g., DCI Format 3_0) transmitted from the gNB on the DL. In resource allocation mode 2, a UE schedules a SL transmission. SL transmissions can operate within network coverage where each UE is within the communication range of a gNB, outside network coverage where all UEs have no communication with any gNB, or with partial network coverage, where only some UEs are within the communication range of a gNB.

In case of groupcast PSCCH/PSSCH transmission, a network can configure a UE one of two options for reporting of HARQ-ACK information by the UE: (1) HARQ-ACK reporting option (1): A UE can attempt to decode a transport block (TB) in a PSSCH reception if, for example, the UE detects a SCI format scheduling the TB reception through a corresponding PSSCH. If the UE fails to correctly decode the TB, the UE multiplexes a negative acknowledgement (NACK) in a PSFCH transmission. In this option, the UE does not transmit a PSFCH with a positive acknowledgment (ACK) when the UE correctly decodes the TB; and (2) HARQ-ACK reporting option (2): A UE can attempt to decode a TB if, for example, the UE detects a SCI format that schedules a corresponding PSSCH. If the UE correctly decodes the TB, the UE multiplexes an ACK in a PSFCH transmission; otherwise, if the UE does not correctly decode the TB, the UE multiplexes a NACK in a PSFCH transmission.

In HARQ-ACK reporting option (1), when a UE that transmitted the PSSCH detects a NACK in a PSFCH reception, the UE can transmit another PSSCH with the TB (retransmission of the TB). In HARQ-ACK reporting option (2) when a UE that transmitted the PSSCH does not detect an ACK in a PSFCH reception, such as when the UE detects a NACK or does not detect a PSFCH reception, the UE can transmit another PSSCH with the TB.

A sidelink resource pool includes a set/pool of slots and a set/pool of RBs used for sidelink transmission and sidelink reception. A set of slots which belong to a sidelink resource pool can be denoted by $$\{t_0^{\prime SL}, t_1^{\prime SL}, t_2^{\prime SL}, \ldots, t_{T'_{\text{MAX}}-1}^{\prime SL}\}$$

and can be configured, for example, at least using a bitmap. Where, $T'_{MAX}$ is the number of SL slots in a resource pool within 1024 frames. Within each slot $$t_y^{\prime SL}$$

of a sidelink resource pool, there are $N_{subCH}$ contiguous sub-channels in the frequency domain for sidelink transmission, where $N_{subCH}$ is provided by a higher-layer parameter. Subchannel m, where m is between 0 and $N_{subCH}-1$, is given by a set of $n_{subCHsize}$ contiguous PRBs, given by $n_{PRB}=n_{subCHstart}+m\cdot n_{subCHsize}+j$, where $j=0, 1, \ldots, n_{subCHsize}-1$, $n_{subCHstart}$ and $n_{subCHsize}$ are provided by higher layer parameters.

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where $i=0, 1, \ldots, L_{subCH}-1$ in slot $$t_y^{SL}.$$

$T_1$ is determined by the UE such that, $$0 \le T_1 \le T_{proc,1}^{SL},$$

where $$T_{proc,1}^{SL}$$

is a PSSCH processing time for example as defined in TS 38.214. $T_2$ is determined by the UE such that $T_{2min} \le T_2 \le$ Remaining Packet Delay Budget, as long as $T_{2min} <$ Remaining Packet Delay Budget, else $T_2$ is equal to the Remaining Packet Delay Budget. $T_{2min}$ is a configured by higher layers and depends on the priority of the SL transmission.

The slots of a SL resource pool are determined as shown in TABLE 1.

TABLE 1

| Determination of SL resource pool |
|---|

1. Let set of slots that may belong to a resource be denoted by $\{t_0^{SL}, t_1^{SL}, t_2^{SL}, \ldots, t_{T_{MAX}-1}^{SL}\}$, where $0 \le t_i^{SL} < 10240 \times 2^\mu$, and $0 \le i < T_{max}$. $\mu$ is the sub-carrier spacing configuration. $\mu = 0$ for a 15 kHz sub-carrier spacing. $\mu = 1$ for a 30 kHz sub-carrier spacing. $\mu = 2$ for a 60 kHz sub-carrier spacing. $\mu = 3$ for a 120 kHz sub-carrier spacing. The slot index is relative to slot#0 of system frame number (SFN)#0 of the serving cell, or direct frame number (DFN)#0. The set of slots includes all slots except:

a. $N_{S-SSB}$ slots that are configured for SL SS/PBCH Block (S-SSB).

b. $N_{nonSL}$ slots where at least one SL symbol is not not-semi-statically configured as TABLE 1-continued Determination of SL resource pool UL symbol by higher layer parameter tdd-UL-DL-ConfigurationCommon or sl-
TDD-Configurauion. In a SL slot, OFDM symbols Y-th, (Y + 1)-th, . . . , (Y + X − 1)-th
are SL symbols, where Y is determined by the higher layer parameter sl-StartSymbol
and X is determined by higher layer parameter sl-LengthSymbols.
  c. $N_{reserved}$ reserved slots. Reserved slots are determined such that the slots in the set
    $\{t_0^{SL}, t_1^{SL}, t_2^{SL}, \ldots, t_{T_{MAX}-1}^{SL}\}$, is a multiple of the bitmap length ($L_{bitmap}$), where the
    bitmap $(b_0, b_1, \ldots, b_{L_{bitmap}-1})$ is configured by higher layers. The reserved slots are
    determined as follows:
      i. Let $\{l_0, l_1, \ldots, l_{2^{\mu} \times 10240 - N_{S\text{-}SSB} - N_{nonSL} - 1}\}$ be the set of slots in range 0 . . .
       $2^{\mu} \times 10240 − 1$, excluding S-SSB slots and non-SL slots. The slots are
       arranged in ascending order of the slot index.
      ii. The number of reserved slots is given by: $N_{reserved} = (2^{\mu} \times 10240 −$
       $N_{S\text{-}SSB} − N_{nonSL})$ mod $L_{bitmap}$.

iii. The reserved slots $l_r$ are given by: $r = \left\lfloor \dfrac{m \cdot (2^{\mu} \times 10240 - N_{S\text{-}SSB} - N_{nonSL})}{N_{reserved}} \right\rfloor$, where, $m = 0, 1, \ldots, N_{reserved} − 1$
  $T_{max}$ is given by: $T_{max} = 2^{\mu} \times 10240 − N_{S\text{-}SSB} − N_{nonSL} − N_{reserved}$.
2. The slots are arranged in ascending order of slot index.
3. The set of slots belonging to the SL resource pool, $\{t'_0{}^{SL}, t'_1{}^{SL}, t'_2{}^{SL}, \ldots, t'_{T_{MAX}-1}{}^{SL}\}$, are
  determined as follows:
    a. Each resource pool has a corresponding bitmap $(b_0, b_1, \ldots, b_{L_{bitmap}-1})$ of length
     $L_{bitmap}$.
    b. A slot $t_k^{SL}$ belongs to the SL resource pool if $b_{k \bmod L_{bitmap}} = 1$
    c. The remaining slots are indexed successively staring from 0, 1, . . . $T'_{MAX} − 1$.
     Where, $T'_{MAX}$ is the number of remaining slots in the set.

Slots can be numbered (indexed) as physical slots or logical slots, wherein physical slots include all slots numbered sequential, while logical slots include only slots that are allocated to sidelink resource pool as described above numbered sequentially. The conversion from a physical duration, $P_{rsvp}$, in milli-second to logical slots, $$P'_{rsvp},$$

is given by $$P'_{rsvp} = \left\lceil \frac{T'_{max}}{10240 \text{ ms}} \times P_{rsvp} \right\rceil$$

(see 38.214).

For resource (re-)selection or re-evaluation in slot n, a UE can determine a set of available single-slot resources for transmission within a resource selection window $[n+T_1, n+T_2]$, such that a single-slot resource for transmission, $R_{x,y}$ is defined as a set of $L_{subCH}$ contiguous subchannels x+i, where i=0, 1, . . . , $L_{subCH}−1$ in slot $$t_y^{SL}.$$

$T_1$ is determined by the UE such that, $$0 \le T_1 \le T_{proc,1}^{SL},$$

where $$T_{proc,1}^{SL}$$

is a PSSCH processing time for example as defined in 3GPP standard specification, TS 38.214. $T_2$ is determined by the UE such that $T_{2min} \le T_2 \le$ Remaining Packet Delay Budget, as long as $T_{2min} <$ Remaining Packet Delay Budget, else $T_2$ is equal to the Remaining Packet Delay Budget. $T_{2min}$ is configured by higher layers and depends on the priority of the SL transmission.

The resource (re-)selection is a two-step procedure.

In one example, the first step (e.g., performed in the physical layer) is to identify the candidate resources within a resource selection window. Candidate resources are resources that belong to a resource pool, but exclude resources (e.g., resource exclusion) that were previously reserved, or potentially reserved by other UEs. The resources excluded are based on SCIs decoded in a sensing window and for which the UE measures a SL RSRP that exceeds a threshold. The threshold depends on the priority indicated in a SCI format and on the priority of the SL transmission. Therefore, sensing within a sensing window involves decoding the first stage SCI, and measuring the corresponding SL RSRP, wherein the SL RSRP can be based on PSCCH DMRS or PSSCH DMRS. Sensing is performed over slots where the UE does not transmit SL. The resources excluded are based on reserved transmissions or semi-persistent transmissions that can collide with the excluded resources or any of reserved or semi-persistent transmissions. The identified candidate resources after resource exclusion are provided to higher layers.

In one example, the second step (e.g., performed in the higher layers) is to select or re-select a resource from the identified candidate resources for PSSCH/PSCCH transmission.

During the first step of the resource (re-)selection procedure, a UE can monitor slots in a sensing window $[n-T_0, n-T_{proc,0})$, where the Us monitors slots belonging to a corresponding sidelink resource pool that are not used for the UE's own transmission. For example, $$T^{SL}_{proc,0}$$

is the sensing processing latency time, for example as defined in 3GPP standard specification, TS 38.214.

To determine a candidate single-slot resource set to report to higher layers, a UE excludes (e.g., resource exclusion) from the set of available single-slot resources for SL transmission within a resource pool and within a resource selection window, the following as shown in TABLE 2.

TABLE 2

Determination of candidate single-slot resource set

1. Single slot resource $R_{x,y}$, such that for any slot $t'_m{}^{SL}$ not monitored within the sensing window with a hypothetical received SCI Format 1-0, with a "Resource reservation period" set to any periodicity value allowed by a higher layer parameter reseverationPeriodAllowed, and indicating all sub-channels of the resource pool in this slot, satisfies condition 2.2. below.
2. Single slot resource $R_{x,y}$, such that for any received SCI within the sensing window:
    1. The associated L1-RSRP measurement is above a (pre-)configured SL-RSRP threshold, where the SL-RSRP threshold depends on the priority indicated in the received SCI and that of the SL transmission for which resources are being selected.
    2. (Condition 2.2) The received SCI in slot $t'_m{}^{SL}$, or if "Resource reservation field" is present in the received SCI the same SCI is assumed to be received in slot $t'_{m+q\times P'_{rsvp\_Rx}}{}^{SL}$, indicates a set of resource blocks that overlaps $R_{x,y+j\times P'_{rsvp\_Tx}}$ where, $t'_{m+q\times P'_{rsvp\_Rx}}{}^{SL}$, indicates a set of resource blocks that overlaps $R_{x,y+j\times P'_{rsvp\_Tx}}$ where, $q = 1, 2, \ldots, Q$, where, If $P_{rsvp\_RX} \le T_{scal}$ and $n' - m < P'_{rsvp\_Rx} \to Q = \left\lceil \dfrac{T_{scal}}{P_{rsvp\_RX}} \right\rceil \cdot T_{scal}$ is $T_2$ in units of milli-seconds.
    Else $Q = 1$
    If n belongs to $(t'_0{}^{SL}, t'_1{}^{SL}, \ldots, t'_{T_{max}-1}{}^{SL})$, n' = n, else n' is the first slot after slot n belonging to set $(t'_0{}^{SL}, t'_1{}^{SL}, \ldots, t'_{T_{max}-1}{}^{SL})$.
        $j = 0, 1, \ldots, C_{resel} - 1$
        $P_{rsvp\_RX}$ is the indicated resource reservation period in the received SCI in physical slots, and $P'_{rsvp\_Rx}$ is that value converted to logical slots.
        $P'_{rsvp\_Tx}$ is the resource reservation period of the SL transmissions for which resources are being reserved in logical slots.
3. If the candidate resources are less than a (pre-)configured percentage given by higher layer parameter sl_TxPrecentageList($prio_{TX}$) that depends on the priority of the SL transmission $prio_{TX}$, such as 20%, of the total available resources within the resource selection window, the (pre-)configured SL-RSRP thresholds are increased by a predetermined amount, such as 3 dB.

NR sidelink introduced two new procedures for mode 2 resource allocation; re-evaluation and pre-emption.

Re-evaluation check occurs when a UE checks the availability of pre-selected SL resources before the resources are first signaled in an SCI Format, and if needed re-selects new SL resources.

For a pre-selected resource to be first-time signaled in slot m, the UE performs a re-evaluation check at least in slot $m-T_3$. The re-evaluation check includes: (1) performing the first step of the SL resource selection procedure as defined in the 3GPP specifications (e.g., TS 38.214), which involves identifying a candidate (available) sidelink resource set in a resource selection window as previously described; (2) if the pre-selected resource is available in the candidate sidelink resource set, the resource is used/signaled for sidelink transmission; and (3) else, the pre-selected resource is not available in the candidate sidelink resource set, a new sidelink resource is re-selected from the candidate sidelink resource set.

A pre-emption check occurs when a UE checks the availability of pre-selected SL resources that have been previously signaled and reserved in an SCI Format, and if needed re-selects new SL resources. For a pre-selected and reserved resource to be signaled in slot m, the UE performs a pre-emption check at least in slot $m-T_3$.

When pre-emption check is enabled by higher layers, pre-emption check includes: (1) performing the first step of the SL resource selection procedure as defined in the 3GPP specifications 38.214, which involves identifying candidate (available) sidelink resource set in a resource selection window as previously described; (2) if the pre-selected and reserved resource is available in the candidate sidelink resource set, the resource is used/signaled for sidelink transmission; (3) else, the pre-selected and reserved resource is NOT available in the candidate sidelink resource set. The resource is excluded from the candidate resource set due to an SCI, associated with a priority value $P_{RX}$, having an RSRP exceeding a threshold. Let the priority value of the sidelink resource being checked for pre-emption be $P_{TX}$: (i) if the priority value $P_{RX}$ is less than a higher-layer configured threshold and the priority value $P_{RX}$ is less than the priority value $P_{TX}$. The pre-selected and reserved sidelink resource is pre-empted. A new sidelink resource is re-selected from the candidate sidelink resource set. Note that, a lower priority value indicates traffic of higher priority; and (ii) else, the resource is used/signaled for sidelink transmission.

In one example, a UE determines a power, $P_{S-SSB}(i)$, in dBm, for an S-SS/PSBCH block (S-SSB) transmission occasion in slot i on an active SL BWP b of a carrier f, as:

$$P_{S-SSB}(i) = \min\left(P_{CMAX}, P_{O,S-SSB} + 10\log_{10}\left(2^\mu \cdot M_{RB}^{S-SSB}\right) + \alpha_{S-SSB} \cdot PL\right)$$

where:

$P_{CMAX}$ is the configured maximum output power of the UE (e.g., TS 38.101);

$P_{O,S\text{-}SSB}$ is the P0 value for DL pathloss based power control for PSBCH. If dl-P0-PSBCH-r17 is configured and supported by the UE it is used for $P_{O,S\text{-}SSB}$, else if dl-P0-PSBCH-r16 is configured it is used for $P_{O,S\text{-}SSB}$, else DL pathloss based power control for PSBCH is disabled, i.e., $P_{S\text{-}SSB}(i) = P_{CMAX}$:

dl-P0-PSBCH-r16 has a range of −16 . . . 15, and dl-P0-PSBCH-r17 has a range of −202 . . . 24;

μ is the sub-carrier spacing configuration as previously described;

$$M_{RB}^{S\text{-}SSB}$$

is the number of resource blocks for S-SS/PSBCH block transmission.

$$M_{RB}^{S\text{-}SSB} = 11;$$

$\alpha_{S\text{-}SSB}$ is the alpha value for DL pathloss based power control for PSBCH. This is provided by higher layer parameter dl-Alpha-PSBCH-r16, and is 1 if that parameter is not configured. dl-Alpha-PSBCH-r16 is a value from the set {0, 0.4, 0.5, 0.6, 0.7, 0.8, 0.9, 1}; and PL is the pathloss, which is given by $PL = PL_{b,f,c}(q_d)$ when the active SL BWP is on serving cell c. The RS resource $q_d$ for determining the pathloss is given by:

When the UE is configured to monitor PDCCH for detection of DCI Format 0_0 in serving cell c: RS resource used for determining the power of a PUSCH transmission scheduled by DCI Format 0_0 in serving cell c, and When the UE is not configured to monitor PDCCH for detection of DCI Format 0_0 in serving cell c: RS resource corresponding to SS/PBCH block used by the UE to obtain the MIB.

In one example, a UE determines a power, $P_{PSSCH}(i)$, in dBm, for a PSSCH transmission occasion i of a resource pool, on an active SL BWP b of a carrier f, and in symbols where PSSCH is not transmitted as: $P_{PSSCH}(i) = \min(P_{CMAX}, P_{MAX,CBR}, \min(P_{PSSCH,D}(i), P_{PSSCH,SL}(i)))$ where:

$P_{CMAX}$ is the configured maximum output power of the UE (e.g., TS 38.101);

$P_{MAX,CBR}$ is determined based on the priority level and the CBR range for a CBR measured in slot i−N. Where, N is the congestion control processing time (e.g., TS 38.214);

$P_{PSSCH,D}(i)$ is the component for DL pathloss based power control for PSSCH. Which is given by:

If dl-P0-PSSCH-PSCCH is provided:

$$P_{PSSCH,D}(i) = P_{O,D} + 10\log_{10}\!\left(2^{\mu} \cdot M_{RB}^{PSSCH}(i)\right) + \alpha_D \cdot PL_D,$$

If dl-P0-PSSCH-PSCCH is not provided: $P_{PSSCH,D}(i) = \min(P_{CMAX}, P_{MAX,CBR})$, and $P_{O,D}$ is the P0 value for DL pathloss based power control for PSSCH/PSCCH. If dl-P0-PSSCH-PSCCH-r17 is configured and supported by the UE it is used for $P_{O,D}$, else if dl-P0-PSSCH-PSCCH-r16 is configured it is used for $P_{O,D}$, else DL pathloss based power control for PSSCH/PSCCH is disabled:

dl-P0-PSSCH-PSCCH-r16 has a range of −16 . . . 15, and dl-P0-PSSCH-PSCCH-r17 has a range of −202 . . . 24, μ is the sub-carrier spacing configuration as previously described, $$M_{RB}^{PSSCH}(i)$$

is the number of resource blocks for PSSCH transmission occasion i, $\alpha_D$ is the alpha value for DL pathloss based power control for PSSCH/PSCCH. This is provided by higher layer parameter dl-Alpha-PSSCH-PSCCH-r16, and is 1 if that parameter is not configured. dl-Alpha-PSSCH-PSCCH-r16 is a value from the set {0, 0.4, 0.5, 0.6, 0.7, 0.8, 0.9, 1}, $PL_D$ is the DL pathloss, which is given by $PL_D = PL_{b,f,c}(q_d)$ when the active SL BWP is on serving cell c. The RS resource q for determining the pathloss is given by:

When the UE is configured to monitor PDCCH for detection of DCI Format 0_0 in serving cell c: RS resource used for determining the power of a PUSCH transmission scheduled by DCI Format 0_0 in serving cell c, and When the UE is not configured to monitor PDCCH for detection of DCI Format 0_0 in serving cell c: RS resource corresponding to SS/PBCH block used by the UE to obtain the MIB;

$P_{PSSCH,SL}(i)$ is the component for SL pathloss based power control for PSSCH. Which is given by:

If sl-P0-PSSCH-PSCCH is provided:

$$P_{PSSCH,SL}(i) = P_{O,SL} + 10\log_{10}\!\left(2^{\mu} \cdot M_{RB}^{PSSCH}(i)\right) + \alpha_{SL} \cdot PL_{SL},$$

If sl-P0-PSSCH-PSCCH is not provided: $P_{PSSCH,SL}(i) = \min(P_{CMAX}, P_{PSSCH,D}(i))$, $P_{O,SL}$ is the P0 value for SL pathloss based power control for PSSCH/PSCCH. If sl-P0-PSSCH-PSCCH-r17 is configured and supported by the UE it is used for $P_{O,SL}$, else if sl-P0-PBSCH-r16 is configured it is used for $P_{O,SL}$, else SL pathloss based power control for PSSCH/PSCCH is disabled:

sl-P0-PSSCH-PSCCH-r16 has a range of −16 . . . 15, and sl-P0-PSSCH-PSCCH-r17 has a range of −202 . . . 24, μ is the sub-carrier spacing configuration as previously described, $$M_{RB}^{PSSCH}(i)$$

is the number of resource blocks for PSSCH transmission occasion i, $\alpha_{SL}$ is the alpha value for SL pathloss based power control for PSSCH/PSCCH. This is provided by higher layer parameter sl-Alpha-PSSCH-PSCCH-r16, and is 1 if that parameter is not configured.

sl-Alpha-PSSCH-PSCCH-r16 is a value from the set {0, 0.4, 0.5, 0.6, 0.7, 0.8, 0.9, 1}, $PL_{SL}$ is the SL pathloss, which is given by $PL_{SL}$=referenceSignalPower–higher layer filtered RSRP:

referenceSignalPower is obtained by summing the PSSCH transmit power per RE over all antenna ports and higher layer filtered across PSSCH transmission occasions using filter configuration provided by sl-FilterCoefficient, and "higher layer filtered RSRP" is the SL RSRP measured by the UE receiving the PSSCH/PSCCH transmissions and reported to the UE that transmitted PSSCH/PSCCH. The SL RSRP is measured on PSSCH DMRS and filtered across PSSCH transmission occasions using filter configuration provided by sl-FilterCoefficient.

The UE splits its power equally among antenna ports that have non-zero power.

In one example, in symbols where PSSCH and PSCCH are transmitted, a UE determines a power, $P_{PSSCH2}(i)$, in dBm, for a PSSCH transmission occasion i of a resource pool, on an active SL BWP b of a carrier f, and in symbols where PSSCH and PSCCH are transmitted as:

$$P_{PSSCH2}(i) = 10 \log_{10}\left(\frac{M_{RB}^{PSSCH}(i) - M_{RB}^{PSCCH}(i)}{M_{RB}^{PSSCH}(i)}\right) + P_{PSSCH}(i)$$

where:

$$M_{RB}^{PSSCH}(i)$$

is the number of resource blocks for PSSCH transmission occasion i;

$$M_{RB}^{PSCCH}(i)$$

is the number of resource blocks for PSCCH transmission occasion i; and $P_{PSSCH}(i)$ is the PSSCH power in symbols with no PSCCH.

In one example, a UE determines a power, $P_{PSCCH}(i)$, in dBm, for a PSCCH transmission occasion i of a resource pool, on an active SL BWP b of a carrier f, as:

$$P_{PSCCH}(i) = 10 \log_{10}\left(\frac{M_{RB}^{PSCCH}(i)}{M_{RB}^{PSSCH}(i)}\right) + P_{PSSCH}(i)$$

$$M_{RB}^{PSSCH}(i)$$

is the number of resource blocks for PSSCH transmission occasion i;

$$M_{RB}^{PSCCH}(i)$$

is the number of resource blocks for PSCCH transmission occasion i; and $P_{PSSCH}(i)$ is the PSSCH power in symbols with no PSCCH.

In one example, a UE has $N_{sch,TX,PSFCH}$ scheduled with PSFCH transmissions for HARQ-ACK information and conflict information. The UE is capable of transmitting a maximum of $N_{max,PSFCH}$. The UE determines $N_{TX,PSFCH}$ PSFCH to transmit, each with a power $P_{PSFCH,k}(i)$, for $1 \le k \le N_{TX,PSFCH}$, for a PSFCH transmission occasion i of a resource pool, on an active SL BWP b of a carrier f. A UE can be provided with higher layer parameter dl-P0-PSFCH for P0 for DL pathloss based power control for PSFCH. The UE calculates $P_{PSFCH,one}$ in dBm: $P_{PSFCH,one}=P_{0,PSFCH}+10 \log_{10}(2^{\mu})+\alpha_{PSFCH} \cdot PL$ where:

$P_{0,PSFCH}$ is the P0 value for DL pathloss based power control for PSFCH. If dl-P0-PSFCH-r17 is configured and supported by the UE it is used for $P_{0,PSFCH}$, else if dl-P0-PSFCH-r16 is configured it is used for $P_{0,PSFCH}$, else DL pathloss based power control for PSFCH is disabled, i.e., $P_{PSFCH,k}(i)=P_{CMAX}-10 \log_{10}(N_{TX,PSFCH})$, where $P_{CMAX}$ is determined for $N_{TX,PSFCH}$ transmissions:

dl-P0-PSFCH-r16 has a range of −16 . . . 15, and dl-P0-PSFCH-r17 has a range of −202 . . . 24;

$\mu$ is the sub-carrier spacing configuration as previously described;

$\alpha_{PSFCH}$ is the alpha value for DL pathloss based power control for PSFCH. This is provided by higher layer parameter dl-Alpha-PSFCH-r16, and is 1 if that parameter is not configured. dl-Alpha-PSFCH-r16 is a value from the set {0, 0.4, 0.5, 0.6, 0.7, 0.8, 0.9, 1}; and PL is the pathloss, which is given by $PL=PL_{b,f,c}(q_d)$ when the active SL BWP is on serving cell c. The RS resource $q_d$ for determining the pathloss is given by:

when the UE is configured to monitor PDCCH for detection of DCI Format 0_0 in serving cell c: RS resource used for determining the power of a PUSCH transmission scheduled by DCI Format 0_0 in serving cell c, and when the UE is not configured to monitor PDCCH for detection of DCI Format 0_0 in serving cell c: RS resource corresponding to SS/PBCH block used by the UE to obtain the MIB.

If the number of scheduled PSFCH transmissions (i.e., $N_{sch,TX,PSFCH}$) is less than or equal to the number of maximum number of PSFCH transmission the UE is capable to transmit (i.e., $N_{max,PSFCH}$): $N_{sch,TX,PSFCH} \le N_{max,PSFCH}$, and: (1) if the power to transmit the $N_{sch,TX,PSFCH}$ scheduled PSFCH transmissions does not exceed the maximum configured output power $P_{CMAX}$ determined for $N_{sch,TX,PSFCH}$ PSFCH transmissions, i.e., $P_{PSFCH,one}+10 \log_{10}(N_{sch,TX,PSFCH}) \le P_{CMAX}$, therefore: $N_{TX,PSFCH}=N_{sch,TX,PSFCH}$ and $P_{PSFCH,k}(i)=$PSFCH,one; and (2) if the power to transmit the $N_{sch,TX,PSFCH}$ scheduled PSFCH transmissions exceeds the maximum configured output power $P_{CMAX}$, i.e., $P_{PSFCH,one}+10 \log_{10}(N_{sch,TX,PSFCH})>P_{CMAX}$, the UE determines $N_{TX,PSFCH}$ PSFCH transmissions, first with ascending order of priority field for PSFCH transmissions that carry HARQ-ACK information, then with ascending order of priority field for PSFCH transmissions that carry conflict information, such that $$N_{TX,PSFCH} \ge \max\left(1, \sum_{i=1}^{K} M_i\right).$$

Where, for $1 \leq i \leq 8$, $M_i$ is the number of PSFCH transmissions carrying HARQ-ACK information with priority level i, and for i>8, $M_i$ is the number of PSFCH transmissions carrying conflict information with priority level i–8. K is the largest value satisfying $$P_{PSFCH,one} + 10\log_{10}\left(\max\left(1, \sum_{i=1}^{K} M_i\right)\right) \leq P_{CMAX},$$

if any, otherwise K=0. The PSFCH power is given by: $P_{PSFCH,k}(i)=\min(P_{CMAX}-10 \log_{10}(N_{TX,PSFCH}),P_{PSFCH,one})$, where $P_{CMAX}$ is determined for $N_{TX,PSFCH}$ transmissions.

If the number of scheduled PSFCH transmissions (i.e., $N_{sch,TX,PSFCH}$) exceeds the number of maximum number of PSFCH transmission the UE is capable to transmit (i.e., $N_{max,PSFCH}$) $N_{sch,TX,PSFCH}>N_{max,PSFCH}$, the UE selects $N_{max,PSFCH}$ PSFCH transmission based on the priority of the PSFCH transmissions as described later.

If the power to transmit the $N_{max,PSFCH}$ PSFCH transmissions does not exceed the maximum configured output power $P_{CMAX}$ determined for $N_{max,PSFCH}$ PSFCH transmissions, i.e., $P_{PSFCH,one}+10 \log_{10}(N_{max,PSFCH}) \leq CMAX$, therefore: $N_{TX,PSFCH}=N_{max,PSFCH}$ and $P_{PSFCH,k}(i)=P_{PSFCH,one}$.

If the power to transmit the $N_{max,PSFCH}$ PSFCH transmissions exceeds the maximum configured output power $P_{CMAX}$, i.e., $P_{PSFCH,one}+10 \log_{10}(N_{max,PSFCH})>P_{CMAX}$, the UE determines $N_{TX,PSFCH}$ PSFCH transmissions, first with ascending order of priority field for PSFCH transmissions that carry HARQ-ACK information, then with ascending order of priority field for PSFCH transmissions that carry conflict information, such that $$N_{TX,PSFCH} \geq \max\left(1, \sum_{i=1}^{K} M_i\right).$$

Where, for $1 \leq i \leq 8$, $M_i$ is the number of PSFCH transmissions carrying HARQ-ACK information with priority level i, and for i>8, $M_i$ is the number of PSFCH transmissions carrying conflict information with priority level i–8. K is the largest value satisfying $$P_{PSFCH,one} + 10\log_{10}\left(\max\left(1, \sum_{i=1}^{K} M_i\right)\right) \leq P_{CMAX},$$

if any, otherwise K=0. The PSFCH power is given by: $P_{PSFCH,k}(i)=\min(P_{CMAX}-10 \log_{10}(N_{TX,PSFCH}),P_{PSFCH,one})$, where $P_{CMAX}$ is determined for $N_{TX,PSFCH}$ transmissions.

The priority of PSFCH transmissions and receptions are determined as follows: (1) for a PSFCH transmission or reception with HARQ-ACK information, a priority value for the PSFCH is equal to the priority value indicated by SCI format 1-A associated with the PSFCH; (2) for a PSFCH transmission with conflict information, a priority value for the PSFCH is equal to the smallest priority value determined by the corresponding SCI format(s) 1-A for the conflicting resource(s); and (3) for a PSFCH reception with conflict information, a priority value for the PSFCH is equal to the priority value determined by corresponding SCI format 1-A for the conflicting resource.

In one example, for PSFCH transmissions in a slot, the PSFCH transmissions have a priority value equal to the smallest priority value of PSFCH transmissions with HARQ-ACK information and PSFCH transmissions with conflict information in the slot.

In one example, for PSFCH receptions in a slot, the PSFCH receptions have a priority value equal to the smallest priority value of PSFCH receptions with HARQ-ACK information and PSFCH receptions with conflict information in the slot.

In one example, if (1) a UE would transmit a first channel or signal using the E-UTRA radio access, and transmit second channels and/or signals using NR radio access, (2) a transmission of the first channel or signal overlaps in time with a transmission of the second channels and/or signals, and (3) the priories of the channels and signals are known to the UE at least T msec before the earliest transmission, where T≤4 up to the UEs implementation; the UE transmits the channels or signals of the radio access technology with the highest priority. The priority is determined based on (1) the SCI formats scheduling the transmissions, (2) as indicated by higher layers for S-SSB (provided by higher layer parameter sl-SSB-Priority NR) and E-UTRA SL synchronization signal, (3) for PSFCH as described earlier.

In one example, if (1) a UE would transmit or received a first channel or signal using the E-UTRA radio access, and receive a second channel or signal or transmit second channels and/or signals using NR radio access, (2) a transmission or reception of the first channel or signal overlaps in time with a reception of the second channel or signal or a transmission of the second channels and/or signals, and (3) the priories of the channels and signals are known to the UE at least T msec before the earliest transmission, where T≤4 up to the UEs implementation; the UE transmits or receives the channels or signals of the radio access technology with the highest priority. The priority is determined based on (1) the SCI formats scheduling the transmissions, (2) as indicated by higher layers for S-SSB (provided by higher layer parameter sl-SSB-Priority NR) and E-UTRA SL synchronization signal, (3) for PSFCH as described earlier.

In one example, if (1) a UE would transmit $N_{sch,TX,PSFCH}$ PSFCHs and receive $N_{sch,RX,PSFCH}$ PSFCHs, and (2) the transmissions of the $N_{sch,TX,PSFCH}$ PSFCHs overlap in time with the receptions of the $N_{sch,RX,PSFCH}$ PSFCHs, the UE transmits or receives only a set of PSFCHs corresponding to the smallest priority field value (highest priority) as follows: (i) first determined by PSFCHs with HARQ-ACK information; and (ii) if no PSFCHs have HARQ-ACK information, then determined by PSFCHs with conflict information.

In one example, if a UE would transmit $N_{sch,TX,PSFCH}$ PSFCHs in a PSFCH transmission occasion and the UE transmits $N_{TX,PSFCH}$ PSFCHs in the transmission occasion: (1) the UE first transmits PSFCHs with HARQ-ACK information from $N_{TX,PSFCH}$ PSFCHs with the smallest priority field values (highest priority); and (2) subsequently the UE transmits the remaining PSFCHs with conflict information from $N_{TX,PSFCH}$ PSFCHs with the smallest priority field values (highest priority).

In one example, if a UE indicates a capability to receive $N_{RX,PSFCH}$ PSFCHs in a PSFCH reception occasion: (1) the UE first receives PSFCHs with HARQ-ACK information; and (2) subsequently the UE receive PSFCHs with conflict information.

In one example, if (1) a UE would simultaneously transmit on UL and on SL in a carrier or in two respective carriers, and (2) the UE is not capable of simultaneous transmissions on UL and on SL in a carrier or in two respective carriers; the UE only transmits on the link (UL or SL) with the higher priority.

In one example, if (1) a UE would simultaneously transmit on UL and receive on SL in a carrier, or (2) the UE would simultaneously transmit on UL and receive on SL in two respective carriers and the UE is not capable of simultaneous transmissions on UL and reception on SL in two respective carriers; the UE only transmits on UL or receives on SL with the higher priority.

In one example, if (1) a UE is capable of simultaneous transmission on UL and SL in two respective carriers, (2) would transmit on UL and on SL in two respective carriers, (3) the transmissions on UL and SL would over in a time period, and (4) the total UE transmit power exceeds $P_{CMAX}$ over the time period: (i) if the SL transmission has a higher priority than the UL transmission: the UE reduces the power of the UL transmission power prior to the start of the UL transmission such that the total UE transmission power over the time period does not exceed $P_{CMAX}$; and (ii) if the UL transmission has a higher priority than the SL transmission: the UE reduces the power of the SL transmission power prior to the start of the SL transmission such that the total UE transmission power over the time period does not exceed $P_{CMAX}$.

One type of UL transmission can include, denote this as UL transmission TypeX: (1) a PRACH transmission; (2) a PUSCH scheduled by an UL grant in a RAR or its retransmission; (3) a PUSCH for Type-2 random access procedure and its retransmission; (4) PUCCH with HARQ-ACK information in response to a success RAR; and (5) PUCCH indicated by a DCI format 1_0 with CRC scrambled by a TC-RNTI.

In one example, if an UL transmission of TypeX, as previously described, overlaps with a SL transmission, the UL transmission has a higher priority.

In one example, if an UL transmission other than that of TypeX, as previously described, overlaps with a SL transmission, the priority of UL and SL transmissions are determined as follows: (1) if the UL transmission is a PUSCH or a PUCCH with priority index 1: (i) if the priority value of the SL transmission or reception is smaller than sl-PriorityThreshold-UL-URLLC, the SL transmission has a higher priority, (ii) if the priority value of the SL transmission or reception is not smaller than sl-PriorityThreshold-UL-URLLC, the UL transmission has a higher priority, and (iii) if higher layer parameter is not provided (configured), the UL transmission has a higher priority; and (2) Otherwise (UL transmission does not have priority index 1: (i) if the priority value of the SL transmission or reception is smaller than sl-PriorityThreshold, the SL transmission has a higher priority, and (ii) if the priority value of the SL transmission or reception is not smaller than sl-PriorityThreshold, the UL transmission has a higher priority.

In one example, a PUCCH transmission with SL HARQ-ACK information has a higher priority than a SL transmission, if the priority value of the PUCCH is smaller than the priority value of the SL transmission. A SL transmission has a higher priority than a PUCCH transmission with SL HARQ-ACK information, if the priority value of the PUCCH is larger than the priority value of the SL transmission.

In one example, a PUCCH transmission with SL HARQ-ACK information has a higher priority than a PSFCH/S-SSB reception, if the priority value of the PUCCH is smaller than the priority value of the PSFCH/S-SSB reception. A PSFCH/S-SSB reception has a higher priority than a PUCCH transmission with SL HARQ-ACK information, if the priority value of the PUCCH is larger than the priority value of the PSFCH/S-SSB reception.

In one example, if one or more SL transmissions from a UE overlap with multiple non-overlapping UL transmissions from the UE, the UE performs SL transmission if at least one SL transmission is prioritized over all UL transmissions from the UE subject to the UE processing timeline with respect to the first SL transmission and the first UL transmission.

In one example, if one or more UL transmissions from a UE overlap with multiple non-overlapping SL transmissions from the UE, the UE performs UL transmission if at least one UL transmission is prioritized over all SL transmissions from the UE subject to the UE processing timeline with respect to the first SL transmission and the first UL transmission.

In one example, if one SL transmission from a UE overlap with one or more overlapping UL transmissions from the UE, the UE performs SL transmission if the SL transmission is prioritized over all UL transmissions from the UE subject to the UE multiplexing and processing timelines with respect to the first SL transmission and the first UL transmission.

In one example, if one SL transmission from a UE overlap with one or more overlapping UL transmissions from the UE, the UE performs UL transmission if at least one UL transmission from the UE is prioritized over the SL transmission subject to the UE multiplexing and processing timelines with respect to the first SL transmission and the first UL transmission.

As described above, the monitoring procedure for resource (re)selection during the sensing window requires sensing which includes reception and decoding of a SCI format during the sensing window, as well as measuring the SL RSRP. This reception and decoding process and measuring the SL RSRP increases a processing complexity and power consumption of a UE for sidelink communication. The aforementioned sensing procedure is referred to a full sensing.

Rel-17 introduced low-power resource allocation. Low-power resource allocation schemes include partial sensing and random resource selection. If a SL transmission from a UE is periodic, partial sensing can be based on periodic-based partial sensing (PBPS), and/or contiguous partial sensing (CPS). If a SL transmission from a UE is aperiodic, partial sensing can be based on CPS and PBPS if the resource pool supports periodic reservations (i.e., sl_multi-ReserveResource is enabled). When a UE performs PBPS, the UE selects a set of Y slots ($Y \geq Y_{min}$) within a resource selection window corresponding to PBPS, where $Y_{min}$ is provided by higher layer parameter minNumCandidateSlotsPeriodic . . . . The UE monitors slots at $$t'^{SL}_{y-k \times P_{reserve}}, \text{ where } t'^{SL}_{y}$$

is a slot of the Y selected candidate slots. The periodicity value for sensing for PBPS, i.e., $P_{reserve}$ is a subset of the resource reservation periods allowed in a resource pool provided by higher layer parameter sl-ResourceReservePeriodList. $P_{reserve}$ is provided by higher layer parameter periodicSensingOccasionReservePeriodList, if not configured, $P_{reserve}$ includes all periodicities in sl-ResourceReservePeriodList. The UE monitors k sensing occasions determined by additionalPeriodicSensingOccasion, as previously described, and not earlier than $n-T_0$. For a given periodicity $P_{reserve}$, the values of k correspond to the most recent sensing occasion earlier than $$t'^{SL}_{y0} - \left(T^{SL}_{proc,0} + T^{SL}_{proc,1}\right)$$

if additionalPeriodicSensingOccasion is not (pre-)configured, and additionally includes the value of k corresponding to the last periodic sensing occasion prior to the most recent one if additionalPeriodicSensingOccasion is (pre-)configured.

$$t_{y0}^{\prime SL}$$

is the first slot of the selected Y candidate slots of PBPS. When a UE performs CPS, the UE selects a set of Y' slots $(Y' \geq Y'_{min})$ within a resource selection window corresponding to CPS, where $Y_{min}$ is provided by higher layer parameter minNumCandidateSlotsAperiodic. The sensing window for CPS starts at least M logical slots before $$t_{y0}^{\prime SL}$$

(the first of the Y' candidate slots) and ends at $$t_{y0}^{\prime SL} - \left( T_{proc,0}^{SL} + T_{proc,1}^{SL} \right).$$

Rel-17 introduced inter-UE co-ordination (IUC) to enhance the reliability and reduce the latency for resource allocation, where SL UEs exchange information with one another over sidelink to aid the resource allocation mode 2 (re-)selection procedure. A UE-A provides information to a UE-B, and the UE-B uses the provided information for its resource allocation mode 2 (re-)selection procedure. IUC is designed to address issues with distributed resource allocation such as: (1) Hidden node problem, where a UE-B is transmitting to a UE-A and the UE-B cannot sense or detect transmissions from a UE-C that interfere with its transmission to a UE-A, (2) Exposed node problem, where a UE-B is transmitting to a UE-A, and the UE-B senses or detects transmissions from a UE-C and avoids the resources used or reserved by the UE-C, but the UE-C does not cause interference at the UE-A, (3) Persistent collision problem, and (4) Half-duplex problem, where the UE-B is transmitting to a UE-A in the same slot that the UE-A is transmitting. The UE-A will miss the transmission from the UE-B as it cannot receive and transmit in the same slot.

In the present disclosure, two schemes are provided for inter-UE co-ordination.

In one example, in scheme 1, a UE-A can provide to another UE-B indications of resources that are preferred to be included in the UE-B's (re-)selected resources or non-preferred resources to be excluded for the UE-B's (re-)selected resources. When given preferred resources, the UE-B may use only those resources for its resource (re-)selection, or it may combine them with resources identified by its own sensing procedure, by finding the intersection of the two sets of resources, for its resource (re-)selection. When given non-preferred resources, the UE-B may exclude these resources from resources identified by its own sensing procedure for its resource (re-)selection. Transmissions of co-ordination information (e.g., IUC messages) sent by the UE-A to the UE-B, and co-ordination information requests for (e.g., IUC requests) sent by the UE-B to the UE-A, are sent in a MAC-CE message and may also, if the supported by the UE, be sent in a 2$^{nd}$-stage SCI Format (SCI Format 2-C). The benefit of using the 2nd stage SCI is to reduce latency. IUC messages from the UE-A to the UE-B can be sent standalone, or can be combined with other SL data. Coordination information (IUC messages) can be in response to a request from the UE-B, or due to a condition at the UE-A. An IUC request is unicast from the UE-B to the UE-A, in response the UE-A sends an IUC message in unicast mode to the UE-B. An IUC message transmitted as a result of an internal condition at the UE-A can be unicast to the UE-B, when it includes preferred resources, or can be unicast, groupcast or broadcast to the UE-B when it includes non-preferred resources. The UE-A can determine preferred or non-preferred resources for the UE-B based on its own sensing taking into account the SL-RSRP measurement of the sensed data and the priority of the sensed data, i.e., the priority field of the decoded PSCCH during sensing as well as the priority of the traffic transmitted by the UE-B in case of request-based IUC or a configured priority in case of condition-based IUC. Non-preferred resource to the UE-B can also be determined to avoid the half-duplex problem, where the UE-A cannot receive data from a UE-B in the same slot the UE-A is transmitting.

In another example, in scheme 2, a UE-A can provide to another UE-B an indication that resources reserved for the UE-B's transmission, whether or not the UE-A is the destination UE, are subject to conflict with a transmission from another UE. The UE-A determines the conflicting resources based on the priority and RSRP of the transmissions involved in the conflict. The UE-A can also determine a presence of a conflict due to the half-duplex problem, where the UE-A cannot receive a reserved resource from the UE-B at the same time the UE-A is transmitting. When the UE-B receives a conflict indication for a reserved resource, it can re-select new resources to replace them. The conflict information from the UE-A is sent in a PSFCH channel separately (pre-)configured from the PSFCH of SL-HARQ operation. The timing of the PSFCH channel carrying conflict information can be based on the SCI indicating reserved resource, or based on the reserved resource.

In both schemes, the UE-A can identify resources according to a number of conditions which are based on the SL-RSRP of the resources in question as a function of the traffic priority, and/or whether the UE-A would be unable to receive a transmission from the UE-B, due to performing its own transmission, i.e., a half-duplex problem. The purpose of this exchange of information is to give the UE-B information about resource occupancy acquired by the UE-A which it may not be able to determine on its own due to hidden nodes, exposed nodes, persistent collisions, etc.

The positioning solutions provided for release 16 target the following commercial requirements for commercial applications.

TABLE 3

| Commercial requirements | |
| --- | --- |
| Requirement characteristic | Requirement target |
| Horizontal Positioning Error | Indoor: 3 m for 80% of the UEs |
| | Outdoor: 10 m for 80% of the UEs |
| Vertical Positioning Error | Indoor: 3 m for 80% of the UEs |
| | Outdoor: 3 m for 80% of the UEs |
| End to end latency | Less than 1 second |

To meet these requirements, radio access technology (RAT)-dependent, RAT independent, and a combination of RAT-dependent and RAT independent positioning schemes have been considered. For the RAT-dependent positioning schemes, timing-based positioning schemes as well as angle-based positioning schemes have been considered. For timing-based positioning schemes, NR supports DL Time Difference of Arrival (DL-TDOA), using positioning reference signals (PRS) for time of arrival measurements. NR also supports UL Time Difference of Arrival (UL-TDOA), using sounding reference signals (SRS) for time of arrival measurements. In Rel-18, NR introduced SL positioning, and supports SL time difference of arrival (SL-TDOA) using SL PRS.

NR also supports round-trip time (RTT) with one or more neighboring gNBs or transmission/reception points (TRPs), as well as RTT between UEs. For angle-based positioning schemes, NR exploits the beam-based air interface, supporting downlink angle of departure (DL-AoD), uplink angle of arrival (UL-AoA), as well as sidelink angle of arrival (SL-AoA). Furthermore, NR supports enhanced cell-ID (E-CID) based positioning schemes. RAT independent positioning schemes can be based on global navigation satellite systems (GNSS), WLAN (e.g., WiFi), Bluetooth, Terrestrial Beacon System (TBS), as well as sensors within the UE such as accelerometers, gyroscopes, magnetometers, etc. Some of the UE sensors are also known as inertial measurement unit (IMU).

As NR expands into new verticals, there is a need to provide improved and enhanced location capabilities to meet various regulatory and commercial positioning requirements. 3GPP SA1 considered the service requirements for high accuracy positioning in TS 22.261 and identified seven service levels for positioning, with varying levels of accuracy (horizontal accuracy and vertical accuracy), positioning availability, latency requirement, as well as positioning type (absolute or relative).

One of the positioning service levels is relative positioning (e.g., TS 22.261), with a horizontal and vertical accuracy of 0.2 m, availability of 99%, latency of 1 sec, and targeting indoor and outdoor environments with speed up to 30 km/hr and distance between UEs or a UE and a 5G positioning node of 10 m.

Rel-17 further enhanced the accuracy, latency, reliability and efficiency of positioning schemes for commercial and IIoT applications. Targeting to achieve sub-meter accuracy with a target latency less than 100 ms for commercial applications, and accuracy better than 20 cm with a target latency in the order of 10 ms for IIoT applications.

In Rel-17, RAN undertook a study item for in-coverage, partial coverage and out-of-coverage NR positioning use cases [RP-201518]. The study focused on identifying positioning use cases and requirements for V2X and public safety as well as identifying potential deployment and operation scenarios. The outcome of the study item is included in TR 38.845. V2X positioning requirements depend on the service the UE operates and are applicable to absolute and relative positioning. Use cases include indoor, outdoor and tunnel areas, within network coverage or out of network coverage; as well as with GNSS-based positioning available, not available, or not accurate enough; and with UE speeds up to 250 km/h. There are three sets of requirements for V2X use cases; the first with horizontal accuracy in the 10 to 50 m range, the second with horizontal accuracy in the 1 to 3 m range, and the third with horizontal accuracy in the 0.1 to 0.5 m range. The 5G system can also support determining the velocity of a UE with a speed accuracy better that 0.5 m/s and a 3-Dimension direction accuracy better than 5 degrees. Public safety positioning is to support indoor and outdoor use cases, with in network coverage or out of network coverage; as well as with GNSS-based positioning available, not available, or not accurate enough. Public safety positioning use cases target a 1-meter horizontal accuracy and a vertical accuracy of 2 m (absolute) or 0.3 m (relative).

In terms of deployment and operation scenarios for in-coverage, partial-coverage and out-of-coverage NR positioning use case, TR 38.845 has identified the following: (1) for network coverage: In-network coverage, partial network coverage as well as out-of-network coverage. In addition to scenarios with no GNSS and no network coverage; (2) radio link: Uu interface (UL/DL interface) based solutions, PC5 interface (SL interface) based solutions and their combinations (hybrid solutions). As well as RAT-independent solutions such as GNSS and sensors; (3) positioning calculation entity: Network-based positioning when the positioning estimation is performed by the network and UE-based positioning when the positioning estimation is performed by the UE; (4) a UE Type: For V2X UEs, this can be a UE installed in a vehicle, a road side unit (RSU), or a vulnerable road user (VRU). Some UEs can have distributed antennas, e.g., multiple antenna patterns that can be leveraged for positioning. UEs can have different power supply limitations, for example VRUs or handheld UEs have limited energy supply compared to other UEs; and (5) spectrum: This can include, licensed spectrum and unlicensed spectrum for the Uu interface and the PC5 interface; as well as ITS-dedicated spectrum for the PC5 interface.

In the present disclosure, aspects for determining the transmit power of SL PRS are provided in a resource pool dedicated for SL PRS or SL positioning or where SL PRS and SL transmissions for SL communication share the resource pool as well aspects related to determining the power of a PSFCH associated with SL PRS, the PSFCH can carry acknowledgment or conflict information. Finally, aspects related to prioritization of SL PRS and PSFCH associated with SL PRS are provided.

SL is one of the promising features of NR, targeting verticals such the automotive industry, public safety and other commercial application. 3GPP Rel-16 is the first NR release to include sidelink through work item "5G V2X with NR sidelink" with emphasis on V2X and public safety where the requirements are met. In Rel-17, the support of SL has been expanded to other types of UEs such a vulnerable road users (VRUs), pedestrian UEs (PUEs) and other types of handheld devices, by supporting mechanisms for power saving for SL resource allocation as well as mechanisms that enhance reliability and reduce latency of SL transmissions. Another feature that NR supports is positioning, using the NR radio interface for performing positioning measurements to determine or assist in determining the location of a UE. NR positioning was first introduced using the Uu interface in Rel-16, through work item "NR Positioning Support." Rel-17 further enhanced accuracy and reduced the latency of NR-based positioning through work item "NR Positioning Enhancements" [RP-210903]. In Rel-17, a study was conducted in the RAN on "scenarios and requirements of in-coverage, partial coverage, and out-of-coverage positioning use cases" with accuracy requirements in the 10's of cm range, using the PC5 interface as well as the Uu interface for absolute and relative positioning. In Rel-18, evaluation of performance and feasibility of potential solutions for SL positioning is provided.

In the present disclosure, aspects for determining the transmit power of SL PRS are provided in a resource pool dedicated for SL PRS or SL positioning or where SL PRS and SL transmissions for SL communication share the resource pool as well aspects related to determining the power of a PSFCH associated with SL PRS, the PSFCH can carry acknowledgment or conflict information. Finally, aspects related to prioritization of SL PRS and PSFCH associated with SL PRS are provided.

The present disclosure relates to a 5G/NR communication system.

The present disclosure provides power control and prioritization for SL PRS in a resource pool dedicated to SL PRS or where SL PRS and SL transmissions for SL communication share the resource pool: (1) a power control for SL PRS; (2) a power control for PSFCH associated with SL PRS; (3) a power control for PSFCH associated with PSSCH/PSCCH with positioning measurement report; (4) a prioritization of SL PRS; (5) a prioritization of PSSCH/PSCCH with positioning measurement report; and (6) a prioritization of PSFCH associated with SL PRS.

In the following examples, time can be expressed in one of following: (1) logical slots within a resource pool: (i) a logical slot index for a slot within a resource pool is denoted as $$t_i^{'SL},$$

and (ii) a time period expressed in logical slots within a resource pool is denoted as T'; (2) logical slots that can be in a resource pool. These are the SL slots before the application of the resource pool bitmap, as described in TS 38.214: (i) a logical slot index for a slot that can be in a resource pool is denoted as $$t_i^{SL},$$

and (ii) a time period expressed in logical slots that can be in a resource pool is denoted as T'. While this is the same notation as used for logical slots within a resource pool the value is different, and it may be apparent from the context which value to use; and (3) physical slots or physical time: (i) a Physical slot number (or index) is denoted as n or n'. n is the physical slot number of any physical slot, while n' is the physical slot number of a slot in the resource pool, and (ii) a time period is expressed as physical time (e.g., in milliseconds (ms)) or in units of physical slots.

When used in the same equation, time units may be the same, i.e.: (1) if logical slots within a resource pool are used in an equation, inequality or expression, the time period in the same equation, inequality or expression may be expressed in units of logical slots within a resource pool; (2) if logical slots that can be in a resource pool are used in an equation, inequality or expression, the time period in the same equation, inequality or expression may be expressed in units of logical slots that can be in a resource pool; and (3) if physical slots are used in an equation, inequality or expression, the time period in the same equation, inequality or expression may be expressed in units of physical slots or physical time scaled by the slot duration.

Time units can be converted from one unit to another.

In one example, for each logical slot index for a slot within a resource pool there is a corresponding physical slot number. The converse is not true, i.e., not every physical slot corresponds to a logical slot within a resource pool. When converting from physical slot number to logical slot index: (1) if the physical slot is in the resource pool, the corresponding logical slot index within the resource pool is determined and (2) if the physical slot is not in the resource pool, the index of an adjacent logical slot within the resource pool is determined, wherein one of: (i) the adjacent logical slot is the next logical slot after the physical slot, and (ii) the adjacent logical slot is the pervious logical slot before the physical slot' (3) to convert from physical time (in ms) to time in units of logical slots within a resource pool, the following equation can be used, wherein T is in units of ms and T' is in units of logical slots within a resource pool:

$$T' = \left\lceil \frac{T'_{max}}{10240 \text{ ms}} \times T \right\rceil$$

wherein, $T'_{max}$ is the number of logical slots within the resource pool in 1024 frames or 10240 ms.

The slot index or the time period provided by higher layers or specified in the specifications can be given in one unit, e.g., in physical slots or in ms, and is converted to a logical slot index or units of logical slots within a resource pool before being used in the corresponding equations, or vice versa.

In the present disclosure, a SL positioning reference signal refers generically to a physical reference signal transmitted on the SL interface to assist in determining a position of a SL UE based on measurements performed on the SL positioning reference signal. In one example, a SL positioning reference signal can have a physical signal structure and/or resource allocation similar to the physical signal structure and/or resource allocation of a DL positioning reference signal (PRS) used in DL of the Uu interface in NR, except that it is transmitted/received on the SL interface (PC5 interface). In another example, a SL positioning reference signal can have a physical signal structure and/or resource allocation similar to the physical signal structure and/or resource allocation of a UL positioning sounding reference signal (SRS) used in UL of the Uu interface in NR, except that it is transmitted/received on the SL interface (PC5 interface). In another example, a SL positioning reference signal can have a physical signal structure and/or resource allocation combining aspects of the physical signal structure and/or resource allocation of (1) DL positioning reference signal (PRS) used in DL of the Uu interface in NR and (2) UL positioning sounding reference signal (SRS) used in UL of the Uu interface in NR, except that it is transmitted/received on the SL interface (PC5 interface). In another example, a SL positioning reference signal can have a new physical signal structure and/or resource allocation for use on the SL interface (PC5 interface).

As described in greater detail in U.S. patent application Ser. No. 18/183,037 filed Mar. 13, 2023, which is incorporated by reference herein its entirety, a reference signal used for positioning can be pre-configured and/or configured and/or allocated a network and/or by a SL UE.

In one embodiment, the network can configure SL resources for SL positioning reference signal and/or SL resources for reporting SL measurements. The network can further configure SL UEs to transmit and/or receive SL positioning reference signals. The network can further configure SL UEs to perform SL positioning measurements.

FIG. 9 illustrates an example of UE in a coverage of a network 900 according to embodiments of the present disclosure. The embodiment of the UE in a coverage of a network 900 illustrated in FIG. 9 is for illustration only.

A UE is in coverage of a network as shown in FIG. 9. The network can configure the UE with resources to use for: (1) SL positioning reference signals on the SL interface (PC5 interface) and (2) reporting of SL positioning measurements on the SL interface (PC5 interface).

In another embodiment, a SL UE is (pre-)configured SL resources for SL positioning reference signal and/or SL resources for reporting SL measurements. The UE can be further configured to transmit and/or receive SL positioning reference signals. The UE can be further configured to perform SL positioning measurements.

The UE can be configured with resources to use for: (1) SL positioning reference signals on the SL interface (PC5 interface) and (2) reporting of SL positioning measurements on the SL interface (PC5 interface).

SL Positioning reference signals are reference signals transmitted on the SL interface by a first UE. The SL positioning reference signals are received by one or more second UE(s), wherein the second UE(s) performs SL positioning measurements on the SL positioning reference signals. SL positioning measurements are measurements that aid in finding the position of a SL UE, e.g., the absolute position of the first SL UE and/or the absolute position of the second SL UE, and/or the relative of position of the first SL UE to the second SL UE and/or the relative position of the second SL UE to the first SL UE. Absolute position is defined in a frame of reference, e.g., the global frame of reference (e.g., using latitude and longitude and/or elevation).

SL positioning measurements can include: (1) SL reference signal time difference (RSTD). For example, the time difference between a positioning reference signal received by a SL UE and a reference time; (2) sidelink relative time of arrival (SL-RTOA); (3) SL reference signal received power (RSRP) of a SL positioning reference signal; (4) SL Angle of Arrival (SL AoA) of a SL positioning reference signal; (5) SL Rx–Tx time difference. For example, this can be the difference between the receive time of a first SL positioning reference signal and the transmit time of a second SL positioning reference signal; and (6) SL PRS reference signal received path power (SL PRS-RSRPP), which can provide the power of the i-th path delay.

In one example, a SL resource pool is dedicated to SL positioning reference signal (SL PRS). The SL PRS is transmitted or received in resource pool configured or dedicated for the SL PRS.

In one example, a SL resource pool is dedicated to SL positioning. The SL PRS is transmitted or received in resource pool configured or dedicated for SL positioning. SL measurements can also be transmitted in the resource pool dedicated to SL positioning.

In one example, a SL resource pool is shared between SL communication (e.g., SL data) and SL PRS. The SL PRS is transmitted or received in resource pool that can also be used for other SL transmissions that include SL transmissions used for SL communication (e.g., SL data) as well as SL transmissions used for SL positioning measurements.

In one example, in response to a reception of a SL PRS, a UE can transmit PSFCH with Acknowledgement Information. For example, if the SL PRS has an SINR or RSRP that is greater than (or greater than or equal to) a threshold, a positive acknowledgment can be sent. In one example, if the SL PRS has an SINR or RSRP that is less than or equal to (or less than) a threshold a negative acknowledgment can be sent.

In one example, a UE can transmit or receive PSFCH with conflict information for SL PRS. In example, a PSFCH can indicate a presence of conflict for SL PRS. In another, a PSFCH can indicate the absence of a conflict for SL PRS.

In one example, a UE determines a power, $P_{SL-PRS}(i)$, in dBm, for a SL-PRS transmission occasion i of a resource pool, wherein the resource pool is dedicated for SL-PRS (or the resource pool is dedicated for SL positioning) or a shared resource pool with SL communications, on an active SL BWP b of a carrier f, and in symbols where PSCCH and/or PSSCH, if any, are not transmitted as one of: (1) $P_{SL-PRS}(i)=\min(P_{CMAX},P_{MAX,CBR},\min(P_{SL-PRS,D}(i), P_{SL-PRS,SL}(i)))$; (2) $P_{SL-PRS}(i)=\min(P_{CMAX},\min(P_{SL-PRS,D}(i), P_{SL-PRS,SL}(i)))$ (3) $P_{SL-PRS}(i)=\min(P_{CMAX},P_{MAX,CBR}, P_{SL-PRS,D}(i))$; (4) $P_{SL-PRS}(i)=\min(P_{CMAX},P_{MAX,CBR},P_{SL-PRS, SL}(i))$; (5) $P_{SL-PRS}(i)=\min(P_{CMAX},P_{SL-PRS,D}(i))$; (6) $P_{SL-PRS}(i)=\min(P_{CMAX},P_{SL-PRS,SL}(i))$; and (7) $P_{SL-PRS}(i)=\min(P_{CMAX},P_{MAX,CBR})$.

For the above equations, followings are provided.

$P_{CMAX}$ is the configured maximum output power of the UE [TS 38.101].

$P_{MAX,CBR}$ is determined based on the priority level and the CBR range for a CBR measured in slot i–N. Where, N is the congestion control processing time [TS 38.214].

$P_{SL-PRS,D}$ (i), e.g., in dBm, is the component for DL pathloss based power control for SL-PRS. Which is given by one or more of the following: (1) if a higher layer parameter for P0 (e.g., dl-P0-SLPRS) is provided:

$$P_{SL-PRS,D}(i) = P_{O,D} + 10\log_{10}\left(2^{\mu} \cdot M_{RB}^{SL-PRS}(i)\right) + \alpha_D \cdot PL_D;$$

(2) if a higher layer parameter for P0 (e.g., dl-P0-SLPRS) is not provided: $P_{SL-PRS,D}(i)=\min(P_{CMAX},P_{MAX,CBR})$; and (3) $P_{O,D}$ is the P0 value for DL pathloss based power control for SL-PRS. In one example (e.g., for a dedicated resource pool for SL PRS), a P0 can be configured by higher layers for SL-PRS (e.g., dl-P0-SLPRS). If dl-P0-SLPRS is configured and supported by the UE it is used for $P_{O,D}$, else DL pathloss based power control for SL-PRS is disabled. In another example (e.g., a resource pool shared between SL-PRS and SL communication or a resource pool shared between SL PRS and PSSCH (e.g., PSSCH carrying SL data or SL-SCH)), P0 configured for PSSCH/PSCCH is used for $P_{O,D}$ of SL PRS. If dl-P0-PSSCH-PSCCH-r17 is configured and supported by the UE it is used for $P_{O,D}$, else if dl-P0-PSSCH-PSCCH-r16 is configured it is used for $P_{O,D}$, else DL pathloss based power control for SL-PRS is disabled: (i) dl-P0-PSSCH-PSCCH-r17 has a range of −16 . . . 15 and (ii) dl-P0-PSSCH-PSCCH-r16 has a range of −202 . . . 24.

In another example (e.g., a resource pool shared between SL-PRS and SL communication or a resource pool shared between SL PRS and PSSCH (e.g., PSSCH carrying SL data or SL-SCH)), if a higher layer parameter for P0 for SL PRS is configured (e.g., dl-P0-SLPRS), it is used for $P_{O,D}$ Of SL-PRS, else if higher layer parameter for P0 for PSSCH/PSCCH is configured (e.g., dl-P0-PSSCH-PSCCH-r16, or dl-P0-PSSCH-PSCCH-r17) it is used for SL PRS, else DL pathloss based power control for SL-PRS is disabled.

In another example (e.g., a resource pool shared between SL-PRS and SL communication or a resource pool shared between SL PRS and PSSCH (e.g., PSSCH carrying SL data or SL-SCH)), if higher layer parameter for P0 for PSSCH/PSCCH is configured (e.g., dl-P0-PSSCH-PSCCH-r16, or dl-P0-PSSCH-PSCCH-r17) it is used for SL PRS, else if a higher layer parameter for P0 for SL PRS is configured (e.g., dl-P0-SLPRS), it is used for $P_{O,D}$ of SL-PRS, else DL pathloss based power control for SL-PRS is disabled In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, downlink-based P0 for SL PRS is given by P0 used for PSSCH (e.g., dl-P0-PSSCH-PSCCH-r16, or dl-P0-PSSCH-PSCCH-r17) if configured, else DL pathloss based power control for SL-PRS is disabled. (2) if SL PRS is transmitted in a slot not containing PSSCH, downlink-based P0 for SL PRS is given by P0 configured for SL PRS (e.g., dl-P0-SLPRS) if configured, else DL pathloss based power control for SL-PRS is disabled.

In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, downlink-based P0 for SL PRS is given by P0 used for PSSCH (e.g., dl-P0-PSSCH-PSCCH-r16, or dl-P0-PSSCH-PSCCH-r17) if configured, else DL pathloss based power control for SL-PRS is disabled. (2) if SL PRS is transmitted in a slot not containing PSSCH, downlink-based P0 for SL PRS is given by P0 configured for SL PRS (e.g., dl-P0-SLPRS) if configured, else downlink-based P0 for SL PRS is given by P0 used for PSSCH (e.g., dl-P0-PSSCH-PSCCH-r16, or dl-P0-PSSCH-PSCCH-r17) if configured, else DL pathloss based power control for SL-PRS is disabled.

$\mu$ is the sub-carrier spacing configuration of SL-PRS as previously described.

$$M_{RB}^{SL-PRS}(i)$$

is the number of resource blocks for SL-PRS transmission occasion i.

$\alpha_D$ is the alpha value for DL pathloss based power control for SL-PRS. In one example, (e.g., for a dedicated resource pool for SL PRS), this can be provided by higher layer parameter, e.g., dl-Alpha-SLPRS, and is 1 if that parameter is not configured. dl-Alpha-SLPRS can have a value from the set {0, 0.4, 0.5, 0.6, 0.7, 0.8, 0.9, 1}. In one example, (e.g., for a dedicated resource pool for SL PRS), $\alpha_D$ can be provided by higher layer parameter, e.g., dl-Alpha-SLPRS. In a variant example (e.g., a resource pool shared between SL-PRS and SL communication or a resource pool shared between SL PRS and PSSCH (e.g., PSSCH carrying SL data or SL-SCH)), dl-Alpha-PSSCH-PSCCH-r16 is used for the DL alpha value ($\alpha_D$) of SL PRS if configured, else $\alpha_D$=1, if not configured. In a variant example (e.g., a resource pool shared between SL-PRS and SL communication or a resource pool shared between SL PRS and PSSCH (e.g., PSSCH carrying SL data or SL-SCH)), $\alpha_D$ can be provided by a higher layer parameter for SL PRS (e.g., dl-Alpha-SLPRS), if configured, else $\alpha_D$ can be provided by higher layer parameter for PSSCH/PSCCH (e.g., dl-Alpha-PSSCH-PSCCH-r16), if configured, else $\alpha_D$=1.

In a variant example (e.g., a resource pool shared between SL-PRS and SL communication or a resource pool shared between SL PRS and PSSCH (e.g., PSSCH carrying SL data or SL-SCH)), $\alpha_D$ can be provided by higher layer parameter for PSSCH/PSCCH (e.g., dl-Alpha-PSSCH-PSCCH-r16), if configured, else $\alpha_D$ can be provided by a higher layer parameter for SL PRS (e.g., dl-Alpha-SLPRS), if configured, else $\alpha_D$=1.

In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, $\alpha_D$ for SL PRS is given by alpha used for PSSCH (e.g., dl-Alpha-PSSCH-PSCCH-r16) if configured, else $\alpha_D$=1. (2) if SL PRS is transmitted in a slot not containing PSSCH, $\alpha_D$ for SL PRS is given by alpha configured for SL PRS (e.g., dl-Alpha-SLPRS) if configured, else $\alpha_D$=1.

In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, $\alpha_D$ for SL PRS is given by alpha used for PSSCH (e.g., dl-Alpha-PSSCH-PSCCH-r16) if configured, else $\alpha_D$=1. (2) if SL PRS is transmitted in a slot not containing PSSCH, $\alpha_D$ for SL PRS is given by alpha configured for SL PRS (e.g., dl-Alpha-SLPRS) if configured, else $\alpha_D$ for SL PRS is given by alpha used for PSSCH (e.g., dl-Alpha-PSSCH-PSCCH-r16) if configured, else $\alpha_D$=1.

$PL_D$ is the DL pathloss, which is given by $PL_D$=$PL_{b,f,c}(q_d)$ when the active SL BWP is on serving cell c. The RS resource q for determining the pathloss is given by: (1) when the UE is configured to monitor PDCCH for detection of DCI Format 0_0 in serving cell c: RS resource used for determining the power of a PUSCH transmission scheduled by DCI Format 0_0 in serving cell c and (2) when the UE is not configured to monitor PDCCH for detection of DCI Format 0_0 in serving cell c: RS resource corresponding to SS/PBCH block used by the UE to obtain the MIB.

$P_{SL-PRS,SL}(i)$, e.g., in dBm, is the component for SL pathloss based power control for SL-PRS. Which is given by one or more of: (1) if a higher layer parameter for P0 (e.g., sl-P0-SLPRS) is provided:

$$P_{SL-PRS,SL}(i) = P_{O,SL} + 10\log_{10}\left(2^\mu \cdot M_{RB}^{PSSCH}(i)\right) + \alpha_{SL} \cdot PL_{SL};$$

(2) if a higher layer parameter for P0 (e.g., sl-P0-SLPRS) is not provided: $P_{SL-PRS,SL}(i)$=min($P_{CMAX}$,$P_{SL-PRS,D}(i)$); and (3) $P_{O,SL}$ is the P0 value for SL pathloss based power control for SL-PRS. In one example (e.g., for a dedicated resource pool for SL PRS), a P0 can be configured by higher layers for SL-PRS (e.g., sl-P0-SLPRS). If sl-P0-SLPRS is configured and supported by the UE it is used for $P_{O,SL}$, else SL pathloss based power control for SL PRS is disabled. In another example (e.g., a resource pool shared between SL-PRS and SL communication or a resource pool shared between SL PRS and PSSCH (e.g., PSSCH carrying SL data or SL-SCH)), P0 configured for PSSCH/PSCCH is used for $P_{O,SL}$ of SL PRS. If sl-P0-PSSCH-PSCCH-r17 is configured and supported by the UE it is used for $P_{O,SL}$, else if sl-P0-PSSCH-PSCCH-r16 is configured it is used for $P_{O,SL}$, else SL pathloss based power control for SL-PRS is disabled: (i) sl-P0-PSSCH-PSCCH-r17 has a range of −16 . . . 15 and (ii) sl-P0-PSSCH-PSCCH-r16 has a range of −202 . . . 24.

In another example (e.g., a resource pool shared between SL-PRS and SL communication or a resource pool shared between SL PRS and PSSCH (e.g., PSSCH carrying SL data or SL-SCH)), if a higher layer parameter for P0 for SL PRS is configured (e.g., sl-P0-SLPRS), it is used for $P_{O,SL}$ of SL-PRS, else if higher layer parameter for P0 for PSSCH/PSCCH is configured (e.g., sl-P0-PSSCH-PSCCH-r16, or sl-P0-PSSCH-PSCCH-r17) it is used for SL PRS, else SL pathloss based power control for SL PRS is disabled.

In another example (e.g., a resource pool shared between SL-PRS and SL communication or a resource pool shared between SL PRS and PSSCH (e.g., PSSCH carrying SL data or SL-SCH)), if higher layer parameter for P0 for PSSCH/PSCCH is configured (e.g., sl-P0-PSSCH-PSCCH-r16, or sl-P0-PSSCH-PSCCH-r17) it is used for SL PRS, else if a higher layer parameter for P0 for SL PRS is configured (e.g., sl-P0-SLPRS), it is used for $P_{O,SL}$ of SL-PRS, else SL pathloss based power control for SL PRS is disabled.

In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, sidelink-based P0 for SL PRS is given by P0 used for PSSCH (e.g., sl-P0-PSSCH-PSCCH-r16, or sl-P0-PSSCH-PSCCH-r17) if configured, else SL pathloss based power control for SL-PRS is disabled. (2) if SL PRS is transmitted in a slot not containing PSSCH, sidelink-based P0 for SL PRS is given by P0 configured for SL PRS (e.g., sl-P0-SLPRS) if configured, else SL pathloss based power control for SL-PRS is disabled.

In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, sidelink-based P0 for SL PRS is given by P0 used for PSSCH (e.g., sl-P0-PSSCH-PSCCH-r16, or sl-P0-PSSCH-PSCCH-r17) if configured, else SL pathloss based power control for SL-PRS is disabled. (2) if SL PRS is transmitted in a slot not containing PSSCH, sidelink-based P0 for SL PRS is given by P0 configured for SL PRS (e.g., sl-P0-SLPRS) if configured, else sidelink-based P0 for SL PRS is given by P0 used for PSSCH (e.g., sl-P0-PSSCH-PSCCH-r16, or sl-P0-PSSCH-PSCCH-r17) if configured, else SL pathloss based power control for SL-PRS is disabled.

$\mu$ is the sub-carrier spacing configuration of SL PRS as previously described.

$$M_{RB}^{SL-PRS}(i)$$

is the number of resource blocks for SL PRS transmission occasion i.

$\alpha_{SL}$ is the alpha value for SL pathloss based power control for SL-PRS. In one example, (e.g., for a dedicated resource pool for SL PRS), this can be provided by higher layer parameter, e.g., sl-Alpha-SLPRS, and is 1 if that parameter is not configured. sl-Alpha-SLPRS can have a value from the set {0, 0.4, 0.5, 0.6, 0.7, 0.8, 0.9, 1}. In one example, (e.g., for a dedicated resource pool for SL PRS), $\alpha_{SL}$ can be provided by higher layer parameter, e.g., sl-Alpha-SLPRS. In a variant example (e.g., a resource pool shared between SL-PRS and SL communication or a resource pool shared between SL PRS and PSSCH (e.g., PSSCH carrying SL data or SL-SCH)), sl-Alpha-PSSCH-PSCCH-r16 is used the SL alpha value ($\alpha_{SL}$) of SL PRS if configured, else $\alpha_{SL}=1$, if not configured. In a variant example (e.g., a resource pool shared between SL-PRS and SL communication or a resource pool shared between SL PRS and PSSCH (e.g., PSSCH carrying SL data or SL-SCH)), $\alpha_{SL}$ can be provided by a higher layer parameter for SL PRS (e.g., sl-Alpha-SLPRS), if configured, else $\alpha_{SL}$ can be provided by higher layer parameter for PSSCH/PSCCH (e.g., sl-Alpha-PSSCH-PSCCH-r16), if configured, else $\alpha_{SL}=1$.

In a variant example (e.g., a resource pool shared between SL-PRS and SL communication or a resource pool shared between SL PRS and PSSCH (e.g., PSSCH carrying SL data or SL-SCH)), $\alpha_{SL}$ can be provided by higher layer parameter for PSSCH/PSCCH (e.g., sl-Alpha-PSSCH-PSCCH-r16), if configured, else $\alpha_{SL}$ can be provided by a higher layer parameter for SL PRS (e.g., sl-Alpha-SLPRS), if configured, else $\alpha_{SL}=1$.

In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, $\alpha_{SL}$ for SL PRS is given by alpha used for PSSCH (e.g., sl-Alpha-PSSCH-PSCCH-r16) if configured, else $\alpha_{SL}=1$. (2) if SL PRS is transmitted in a slot not containing PSSCH, $\alpha_{SL}$ for SL PRS is given by alpha configured for SL PRS (e.g., sl-Alpha-SLPRS) if configured, else $\alpha_{SL}=1$.

In another example (e.g., a resource pool shared between SL-PRS and SL communication or a resource pool shared between SL PRS and PSSCH (e.g., PSSCH carrying SL data or SL-SCH)), (1) if SL PRS is transmitted in a slot containing PSSCH, $\alpha_{SL}$ for SL PRS is given by alpha used for PSSCH (e.g., sl-Alpha-PSSCH-PSCCH-r16) if configured, else $\alpha_{SL}=1$. (2) if SL PRS is transmitted in a slot not containing PSSCH, $\alpha_{SL}$ for SL PRS is given by alpha configured for SL PRS (e.g., sl-Alpha-SLPRS) if configured, else $\alpha_{SL}$ for SL PRS is given by alpha used for PSSCH (e.g., sl-Alpha-PSSCH-PSCCH-r16) if configured, else $\alpha_{SL}=1$.

$PL_{SL}$ is the SL pathloss, which is given by $PL_{SL}$=referenceSignalPower–higher layer filtered RSRP as shown in following examples.

In one example (e.g., for a dedicated resource pool for SL PRS), referenceSignalPower is obtained by summing the SL PRS transmit power per RE over all antenna ports and higher layer filtered across SL PRS transmission occasions using filter configuration provided by sl-FilterCoefficient.

In one example (e.g., a resource pool shared between SL-PRS and SL communication or a resource pool shared between SL PRS and PSSCH (e.g., PSSCH carrying SL data or SL-SCH)), referenceSignalPower is obtained by summing the PSSCH (or PSSCH DMRS) transmit power per RE over all antenna ports and higher layer filtered across PSSCH transmission occasions using filter configuration provided by sl-FilterCoefficient.

In one example (e.g., for a dedicated resource pool for SL PRS), referenceSignalPower is obtained by summing the SL PRS transmit power and/or the PSCCH (or PSCCH DMRS) transmit power per RE over all antenna ports and higher layer filtered across SL PRS transmission occasions and/or PSSCH transmission occasions using filter configuration provided by sl-FilterCoefficient. A higher layer parameter (and/or by pre-configuration) can configured or determine whether SL PRS and/or PSCCH (or PSSCH DMRS) is used.

In one example, referenceSignalPower is obtained by summing the SL PRS transmit power and/or the PSSCH (or PSSCH DMRS) transmit power per RE over all antenna ports and higher layer filtered across SL PRS transmission occasions and/or PSSCH transmission occasions using filter configuration provided by sl-FilterCoefficient.

In one example, referenceSignalPower is obtained by summing the PSSCH (or PSSCH DMRS) transmit power per RE over all antenna ports and higher layer filtered across SL PRS transmission occasions and/or PSSCH transmission occasions using filter configuration provided by sl-FilterCoefficient.

In one example, referenceSignalPower is obtained by summing the SL PRS transmit power per RE over all antenna ports and higher layer filtered across SL PRS transmission occasions and/or PSSCH transmission occasions using filter configuration provided by sl-FilterCoefficient.

In one example, referenceSignalPower is obtained by summing the PSSCH (or PSSCH DMRS) transmit power per RE over all antenna ports and higher layer filtered across SL PRS transmission occasions using filter configuration provided by sl-FilterCoefficient.

In one example (e.g., for a dedicated resource pool for SL PRS), "higher layer filtered RSRP" is the SL RSRP measured by the UE receiving the SL PRS transmissions and reported to the UE that transmitted SL PRS. The SL RSRP is measured on SL PRS and filtered across SL PRS transmission occasions using filter configuration provided by sl-FilterCoefficient.

In one example (e.g., a resource pool shared between SL-PRS and SL communication or a resource pool shared between SL PRS and PSSCH (e.g., PSSCH carrying SL data or SL-SCH)), "higher layer filtered RSRP" is the SL RSRP measured by the UE receiving the SL PRS transmissions and reported to the UE that transmitted SL PRS. The SL RSRP is measured on PSSCH DMRS (or PSSCH) and filtered across PSSCH transmission occasions using filter configuration provided by sl-FilterCoefficient.

In one example (e.g., for a dedicated resource pool for SL PRS), "higher layer filtered RSRP" is the SL RSRP measured by the UE receiving the SL PRS transmissions and reported to the UE that transmitted SL PRS. The SL RSRP is measured on SL PRS and/or PSCCH DMRS and filtered across SL PRS transmission occasions using filter configuration provided by sl-FilterCoefficient. A higher layer parameter (and/or by pre-configuration) can configured or determine whether SL PRS and/or PSCCH (or PSSCH DMRS) is used.

In one example, "higher layer filtered RSRP" is the SL RSRP measured by the UE receiving the SL PRS transmissions and reported to the UE that transmitted SL PRS. The SL RSRP is measured on SL PRS and/or PSSCH DMRS (or PSSCH) and filtered across SL PRS transmission occasions and/or PSSCH transmission occasions using filter configuration provided by sl-FilterCoefficient.

In one example, "higher layer filtered RSRP" is the SL RSRP measured by the UE receiving the SL PRS transmissions and reported to the UE that transmitted SL PRS. The SL RSRP is measured on PSSCH DMRS (or PSSCH) and filtered across SL PRS transmission occasions and/or PSSCH transmission occasions using filter configuration provided by sl-FilterCoefficient.

In one example, "higher layer filtered RSRP" is the SL RSRP measured by the UE receiving the SL PRS transmissions and reported to the UE that transmitted SL PRS. The SL RSRP is measured on SL PRS and filtered across SL PRS transmission occasions and/or PSSCH transmission occasions using filter configuration provided by sl-FilterCoefficient.

In one example, "higher layer filtered RSRP" is the SL RSRP measured by the UE receiving the SL PRS transmissions and reported to the UE that transmitted SL PRS. The SL RSRP is measured on PSSCH DMRS (or PSSCH) and filtered across SL PRS transmission occasions using filter configuration provided by sl-FilterCoefficient.

The UE splits its power equally among antenna ports that have non-zero power.

In one example, in case of a single antenna port, the UE transmits the signal on that antenna port with the determined power.

In one example, SL PRS has one antenna port.

In one example, SL PRS can have one antenna port or two antenna ports.

In one example, SL PRS has the same number of antenna ports as PSSCH, e.g., in a resource pool shared between SL-PRS and SL communication or a resource pool shared between SL PRS and PSSCH (e.g., PSSCH carrying SL data or SL-SCH).

In one example, SL PRS has the same number of antenna ports as PSSCH, e.g., when SL PRS and PSSCH are transmitted in a same slot.

In one example, if SL PRS and PSSCH are transmitted in a same resource pool, SL PRS is transmitted on one antenna port, with a power equal to the total PSSCH power (e.g., summed over all antenna ports of PSSCH). The PSSCH power is that of PSSCH that is transmitted or would have been transmitted in a same slot as SL PRS.

In one example, if SL PRS and PSSCH are transmitted in a same slot, SL PRS is transmitted on one antenna port, with a power equal to the total PSSCH power (e.g., summed over all antenna ports of PSSCH).

In one example, if SL PRS and PSSCH are transmitted in a same resource pool, SL PRS is transmitted on one antenna port, with a power equal to the PSSCH power of one antenna port. The PSSCH power is that of PSSCH that is transmitted or would have been transmitted in a same slot as SL PRS.

In one example, if SL PRS and PSSCH are transmitted in a same slot, SL PRS is transmitted on one antenna port, with a power equal to the total PSSCH power of one antenna port.

In one example, if SL PRS and PSSCH are transmitted in a same resource pool, SL PRS is transmitted on N antenna ports, where N is the number of antenna ports of PSSCH. The power on each SL PRS antenna port is equal to the power on each PSSCH antenna port. The PSSCH power is that of PSSCH that is transmitted or would have been transmitted in a same slot as SL PRS. In one example, the power is evenly split among the N antenna ports.

In one example, if SL PRS and PSSCH are transmitted in a same slot, SL PRS is transmitted on N antenna ports, where N is the number of antenna ports of PSSCH. The power on each SL PRS antenna port is equal to the power on each PSSCH antenna port. In one example, the power is evenly split among the N antenna ports.

In one example, in symbols where SL-PRS and PSCCH are transmitted, if any, a UE determines a power, $P_{SL-PRS2}(i)$, in dBm, for a SL-PRS transmission occasion i of a resource pool, on an active SL BWP b of a carrier f, and in symbols where SL-PRS and PSCCH, if any, are transmitted as:

$$P_{SL-PRS2}(i) = 10 \log_{10}\left(\frac{M_{RB}^{SL-PRS}(i) - M_{RB}^{PSCCH}(i)}{M_{RB}^{SL-PRS}(i)}\right) + P_{SL-PRS}(i)$$

where: (1)

$$M_{RB}^{SL-PRS}(i)$$

is the number of resource blocks for SL-PRS transmission occasion i; (2)

$$M_{RB}^{PSCCH}(i)$$

is the number of resource blocks for PSCCH transmission occasion i; and (3) $P_{SL-PRS}(i)$ is the SL-PRS power in symbols with no PSCCH.

In one example, a UE determines a power, $P_{PSCCH}(i)$, in dBm, for a PSCCH transmission occasion i associated with SL-PRS of a resource pool, on an active SL BWP b of a carrier f, as:

$$P_{PSCCH}(i) = 10 \ \log_{10} \left( \frac{M_{RB}^{PSCCH}(i)}{M_{RB}^{SL-PRS}(i)} \right) + P_{SL-PRS}(i)$$

where: (1)

$$M_{RB}^{SL-PRS}(i)$$

is the number of resource blocks for SL-PRS transmission occasion i; (2)

$$M_{RB}^{PSCCH}(i)$$

is the number of resource blocks for PSCCH transmission occasion i; and (3) $P_{SL-PRS}(i)$ is the SL-PRS power in symbols with no PSCCH.

For SL-PRS and PSCCH, the UE splits its power equally among antenna ports that have non-zero power.

In one example, in case of a single antenna port, the UE transmits the signal on that antenna port with the determined power.

In one example, SL PRS and PSCCH are transmitted in a slot (with no PSSCH) and SL PRS has one antenna port. PSCCH has one antenna port.

In one example, SL PRS and PSCCH are transmitted in a slot (with no PSSCH) and SL PRS has N antenna ports. PSCCH has N antenna ports.

In one example, SL PRS, PSCCH and PSSCH are transmitted in a slot (or resource pool), SL PRS has N1 antenna ports (e.g., N1=1) and PSSCH has N2 antenna ports. PSCCH has N2 antenna ports.

In one example, SL PRS, PSCCH and PSSCH are transmitted in a slot (or resource pool), SL PRS has N1 antenna ports (e.g., N1=1) and PSSCH has N2 antenna ports. PSCCH has N1 antenna ports.

In one example, SL PRS, PSCCH and PSSCH are transmitted in a resource pool, SL PRS has N1 antenna ports and PSSCH has N2 antenna ports. In a slot with PSCCH and SL PRS, (no PSSCH), PSCCH has N1 antenna ports. In a slot with PSCCH and PSSCH (no SL PRS), PSCCH has N2 antenna ports. In a slot with PSCCH and PSSCH and SL PRS, PSCCH has N2 antenna ports.

In one example, SL PRS, PSCCH and PSSCH are transmitted in a resource pool, SL PRS has N1 antenna ports and PSSCH has N2 antenna ports. In a slot with PSCCH and SL PRS, (no PSSCH), PSCCH has N1 antenna ports. In a slot with PSCCH and PSSCH (no SL PRS), PSCCH has N2 antenna ports. In a slot with PSCCH and PSSCH and SL PRS, PSCCH has N1 antenna ports.

In one example, SL PRS, PSCCH and PSSCH are transmitted in a resource pool, SL PRS has N antenna ports and PSSCH has N antenna ports. PSCCH has N antenna ports.

In one example, in symbols where SL-PRS and PSCCH and/or PSSCH are transmitted, if any, a UE determines a power, $P_{SL-PRS2}(i)$, in dBm, for a SL-PRS transmission occasion i of a resource pool, on an active SL BWP b of a carrier f, and in symbols where SL-PRS and PSCCH and/or PSSCH, if any, are transmitted as:

$$P_{SL-PRS2}(i) = 10 \ \log_{10} \left( \frac{M_{RB}^{SL-PRS}(i) - M_{RB}^{PSCCH}(i) - M_{RB}^{PSSCH}(i)}{M_{RB}^{SL-PRS}(i)} \right) + P_{SL-PRS}(i)$$

where: (1)

$$M_{RB}^{SL-PRS}(i)$$

is the number of resource blocks for SL-PRS transmission occasion i; (2)

$$M_{RB}^{PSCCH}(i)$$

is the number of resource blocks for PSCCH transmission occasion i; (3)

$$M_{RB}^{PSSCH}(i)$$

is the number of resource blocks for PSSCH transmission occasion i; and (4) $P_{SL-PRS}(i)$ is the SL-PRS power in symbols with no PSCCH or PSSCH.

In one example, a UE determines a power, $P_{PSCCH}(i)$, in dBm, for a PSCCH transmission occasion i associated with SL-PRS of a resource pool, on an active SL BWP b of a carrier f, as:

$$P_{PSCCH}(i) = 10 \ \log_{10} \left( \frac{M_{RB}^{PSCCH}(i)}{M_{RB}^{SL-PRS}(i)} \right) + P_{SL-PRS}(i)$$

where: (1)

$$M_{RB}^{SL-PRS}(i)$$

is the number of resource blocks for SL-PRS transmission occasion i; (2)

$$M_{RB}^{PSCCH}(i)$$

is the number of resource blocks for PSCCH transmission occasion i; and (3) $P_{SL-PRS}(i)$ is the SL-PRS power in symbols with no PSCCH.

In one example, a UE determines a power, $P_{PSSCH}(i)$, in dBm, for a PSSCH transmission occasion i associated with SL-PRS of a resource pool, on an active SL BWP b of a carrier f, as:

$$P_{PSSCH}(i) = 10 \ \log_{10} \left( \frac{M_{RB}^{PSSCH}(i)}{M_{RB}^{SL-PRS}(i)} \right) + P_{SL-PRS}(i)$$

where: (1)

$$M_{RB}^{SL-PRS}(i)$$

is the number of resource blocks for SL-PRS transmission occasion i; (2)

$$M_{RB}^{PSSCH}(i)$$

is the number of resource blocks for PSSCH transmission occasion i; and (3) $P_{SL-PRS}(i)$ is the SL-PRS power in symbols with no PSSCH or PSCCH.

For SL-PRS and PSCCH and/or PSSCH, the UE splits its power equally among antenna ports that have non-zero power.

In one example, in case of a single antenna port, the UE transmits the signal on that antenna port with the determined power.

In one example, SL PRS and PSCCH are transmitted in a slot (with no PSSCH) and SL PRS has one antenna port. PSCCH has one antenna port.

In one example, SL PRS and PSCCH are transmitted in a slot (with no PSSCH) and SL PRS has N antenna ports. PSCCH has N antenna ports.

In one example, SL PRS, PSCCH and PSSCH are transmitted in a slot (or resource pool), SL PRS has N1 antenna ports (e.g., N1=1) and PSSCH has N2 antenna ports. PSCCH has N2 antenna ports.

In one example, SL PRS, PSCCH and PSSCH are transmitted in a slot (or resource pool), SL PRS has N1 antenna ports (e.g., N1=1) and PSSCH has N2 antenna ports. PSCCH has N1 antenna ports.

In one example, SL PRS, PSCCH and PSSCH are transmitted in a resource pool, SL PRS has N1 antenna ports and PSSCH has N2 antenna ports. In a slot with PSCCH and SL PRS, (no PSSCH), PSCCH has N1 antenna ports. In a slot with PSCCH and PSSCH (no SL PRS), PSCCH has N2 antenna ports. In a slot with PSCCH and PSSCH and SL PRS, PSCCH has N2 antenna ports.

In one example, SL PRS, PSCCH and PSSCH are transmitted in a resource pool, SL PRS has N1 antenna ports and PSSCH has N2 antenna ports. In a slot with PSCCH and SL PRS, (no PSSCH), PSCCH has N1 antenna ports. In a slot with PSCCH and PSSCH (no SL PRS), PSCCH has N2 antenna ports. In a slot with PSCCH and PSSCH and SL PRS, PSCCH has N1 antenna ports.

In one example, SL PRS, PSCCH and PSSCH are transmitted in a resource pool, SL PRS has N antenna ports and PSSCH has N antenna ports. PSCCH has N antenna ports.

In one example, in symbols where PSSCH and PSCCH and/or SL PRS are transmitted, if any, a UE determines a power, $P_{PSSCH2}(i)$, in dBm, for a PSSCH transmission occasion i of a resource pool, on an active SL BWP b of a carrier f, and in symbols where PSSCH and PSCCH and/or SL-PRS, if any, are transmitted as:

$$P_{PSSCH2}(i) = 10 \log_{10} \left( \frac{M_{RB}^{PSSCH}(i) - M_{RB}^{PSCCH}(i) - M_{RB}^{SL-PRS}(i)}{M_{RB}^{PSSCH}(i)} \right) + P_{PSSCH}(i)$$

where:

$$M_{RB}^{SL-PRS}(i) \tag{1}$$

is the number of resource blocks for SL-PRS transmission occasion i;

$$M_{RB}^{PSCCH}(i) \tag{2}$$

is the number of resource blocks for PSCCH transmission occasion i; (3)

$$M_{RB}^{PSSCH}(i)$$

is the number of resource blocks for PSSCH transmission occasion i; and (4) $P_{PSSCH}(i)$ is the PSSCH power in symbols with no PSCCH or SL-PRS.

In one example, a UE determines a power, $P_{PSCCH}(i)$, in dBm, for a PSCCH transmission occasion i associated with PSSCH of a resource pool, on an active SL BWP b of a carrier f, as:

$$P_{PSCCH}(i) = 10 \log_{10} \left( \frac{M_{RB}^{PSCCH}(i)}{M_{RB}^{PSSCH}(i)} \right) + P_{PSSCH}(i)$$

where: (1)

$$M_{RB}^{PSSCH}(i)$$

is the number of resource blocks for PSSCH transmission occasion i; (2)

$$M_{RB}^{PSCCH}(i)$$

is the number of resource blocks for PSCCH transmission occasion i; and (3) $P_{PSSCH}(i)$ is the PSSCH power in symbols with no PSCCH.

In one example, a UE determines a power, $P_{SL-PRS}(i)$, in dBm, for a SL-PRS transmission occasion i associated with SL-PRS of a resource pool, on an active SL BWP b of a carrier f, as:

$$P_{SL-PRS}(i) = 10 \log_{10} \left( \frac{M_{RB}^{SL-PRS}(i)}{M_{RB}^{PSSCH}(i)} \right) + P_{PSSCH}(i)$$

where: (1)

$$M_{RB}^{SL-PRS}(i)$$

is the number of resource blocks for SL-PRS transmission occasion i; (2)

$$M_{RB}^{PSSCH}(i)$$

is the number of resource blocks for PSSCH transmission occasion i; and (3) $P_{PSSCH}(i)$ is the PSSCH power in symbols with no PSSCH or SL-PRS.

For PSSCH and PSCCH and/or SL-PRS, the UE splits its power equally among antenna ports that have non-zero power.

In one example, in case of a single antenna port, the UE transmits the signal on that antenna port with the determined power.

In one example, SL PRS and PSCCH are transmitted in a slot (with no PSSCH) and SL PRS has one antenna port. PSCCH has one antenna port.

In one example, SL PRS and PSCCH are transmitted in a slot (with no PSSCH) and SL PRS has N antenna ports. PSCCH has N antenna ports.

In one example, SL PRS, PSCCH and PSSCH are transmitted in a slot (or resource pool), SL PRS has N1 antenna ports (e.g., N1=1) and PSSCH has N2 antenna ports. PSCCH has N2 antenna ports.

In one example, SL PRS, PSCCH and PSSCH are transmitted in a slot (or resource pool), SL PRS has N1 antenna ports (e.g., N1=1) and PSSCH has N2 antenna ports. PSCCH has N1 antenna ports.

In one example, SL PRS, PSCCH and PSSCH are transmitted in a resource pool, SL PRS has N1 antenna ports and PSSCH has N2 antenna ports. In a slot with PSCCH and SL PRS, (no PSSCH), PSCCH has N1 antenna ports. In a slot with PSCCH and PSSCH (no SL PRS), PSCCH has N2 antenna ports. In a slot with PSCCH and PSSCH and SL PRS, PSCCH has N2 antenna ports.

In one example, SL PRS, PSCCH and PSSCH are transmitted in a resource pool, SL PRS has N1 antenna ports and PSSCH has N2 antenna ports. In a slot with PSCCH and SL PRS, (no PSSCH), PSCCH has N1 antenna ports. In a slot with PSCCH and PSSCH (no SL PRS), PSCCH has N2 antenna ports. In a slot with PSCCH and PSSCH and SL PRS, PSCCH has N1 antenna ports.

In one example, SL PRS, PSCCH and PSSCH are transmitted in a resource pool, SL PRS has N antenna ports and PSSCH has N antenna ports. PSCCH has N antenna ports.

In one example, a resource pool is dedicated for SL-PRS, P0 for DL pathloss based power control for SL PRS can be configured and/or updated by a higher layer parameter (e.g., dl-P0-SLPRS). If P0 for DL pathloss based power control for SL PRS is not configured, DL pathloss based power control for SL PRS is disabled.

In one example, a resource pool is dedicated for SL-PRS, P0 for SL pathloss based power control for SL PRS can be configured and/or updated by a higher layer parameter (e.g., sl-P0-SLPRS). If P0 for SL pathloss based power control for SL PRS is not configured, SL pathloss based power control for SL PRS is disabled.

In one example, a resource pool is dedicated for SL-PRS, P0 for DL pathloss based power control for SL PRS can be configured and/or updated by a higher layer parameter P0 for DL pathloss based power control for PSSCH/PSCCH (e.g., dl-P0-PSSCH-PSCCH-r16, or dl-P0-PSSCH-PSCCH-r17). If P0 for DL pathloss based power control for PSSCH/PSCCH is not configured/supported, DL pathloss based power control for SL PRS is disabled.

In one example, a resource pool is dedicated for SL-PRS, P0 for SL pathloss based power control for SL PRS can be configured and/or updated by a higher layer parameter P0 for SL pathloss based power control for PSSCH/PSCCH (e.g., sl-P0-PSSCH-PSCCH-r16, or sl-P0-PSSCH-PSCCH-r17). If P0 for SL pathloss based power control for PSSCH/PSCCH is not configured/supported, SL pathloss based power control for SL PRS is disabled.

In one example, a resource pool is dedicated for SL-PRS. P0 for DL pathloss based power control can be configured and/or updated by a higher layer parameter for SL PRS (e.g., dl-P0-SLPRS) and/or higher layer for PSSCH/PSCCH (e.g., dl-P0-PSSCH-PSCCH-r16, or dl-P0-PSSCH-PSCCH-r17). P0 for DL pathloss based power control for SL PRS is based on P0 configured for SL PRS (e.g., dl-P0-SLPRS), if configured, else, P0 for DL pathloss based power control for SL PRS is based on P0 configured for PSSCH/PSSCH (e.g., dl-P0-PSSCH-PSCCH-r16, or dl-P0-PSSCH-PSCCH-r17), if configured, else (neither are configured), DL pathloss based power control for SL PRS is disabled.

In one example, a resource pool is dedicated for SL-PRS. P0 for SL pathloss based power control can be configured and/or updated by a higher layer parameter for SL PRS (e.g., sl-P0-SLPRS) and/or higher layer for PSSCH/PSCCH (e.g., sl-P0-PSSCH-PSCCH-r16, or sl-P0-PSSCH-PSCCH-r17). P0 for SL pathloss based power control for SL PRS is based on P0 configured for SL PRS (e.g., sl-P0-SLPRS), if configured, else, P0 for SL pathloss based power control for SL PRS is based on P0 configured for PSSCH/PSSCH (e.g., sl-P0-PSSCH-PSCCH-r16, or sl-P0-PSSCH-PSCCH-r17), if configured, else (neither are configured), SL pathloss based power control for SL PRS is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for DL pathloss based power control for SL PRS can be configured and/or updated by a higher layer parameter (e.g., dl-P0-SLPRS). If P0 for DL pathloss based power control for SL PRS is not configured, DL pathloss based power control for SL PRS is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for DL pathloss based power control for PSSCH/PSCCH (e.g., for measurement reports) can be configured and/or updated by a higher layer parameter (e.g., dl-P0-PSSCH-PSCCH). If P0 for DL pathloss based power control for SL PRS is not configured, DL pathloss based power control for PSSCH/PSCCH is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for SL pathloss based power control for SL PRS can be configured and/or updated by a higher layer parameter (e.g., sl-P0-SLPRS). If P0 for SL pathloss based power control for SL PRS is not configured, SL pathloss based power control for SL PRS is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for SL pathloss based power control for PSSCH/PSCCH (e.g., for measurement reports) can be configured and/or updated by a higher layer parameter (e.g., sl-P0-PSSCH-PSCCH). If P0 for SL pathloss based power control for SL PRS is not configured, SL pathloss based power control for PSSCH/PSCCH is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for DL pathloss based power control for SL PRS and PSSCH/PSCCH (e.g., for measurement reports) can be configured and/or updated by a higher layer parameter used for PSSCH/PSCCH (e.g., dl-P0-PSSCH-PSCCH-r16, or dl-P0-PSSCH-PSCCH-r17). If P0 for DL pathloss based power control for PSSCH/PSCCH is not configured, DL pathloss based power control for SL PRS and PSSCH/PSCCH is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for SL pathloss based power control for SL PRS and PSSCH/PSCCH (e.g., for measurement reports) can be configured and/or updated by a higher layer parameter used for PSSCH/PSCCH (e.g., sl-P0-PSSCH-PSCCH-r16, or sl-P0-PSSCH-PSCCH-r17). If P0 for SL pathloss based power control for PSSCH/PSCCH is not configured, SL pathloss based power control for SL PRS and PSSCH/PSCCH is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for DL pathloss based power control for SL PRS and PSSCH/PSCCH (e.g., for measurement reports) can be configured and/or updated by a higher layer parameter used for SL PRS (e.g., dl-P0-SLPRS). If P0 for DL pathloss based power control for SL PRS is not configured, DL pathloss based power control for SL PRS and PSSCH/PSCCH is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for SL pathloss based power control for SL PRS and PSSCH/PSCCH (e.g., for measurement reports) can be configured and/or updated by a higher layer parameter used for SL PRS (e.g., sl-P0-SLPRS). If P0 for SL pathloss based power control for SL PRS is not configured, SL pathloss based power control for SL PRS and PSSCH/PSCCH is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for DL pathloss based power control can be configured and/or updated by a higher layer parameter for SL PRS (e.g., dl-P0-SLPRS) and/or higher layer for PSSCH/PSCCH (e.g., dl-P0-PSSCH-PSCCH-r16, or dl-P0-PSSCH-PSCCH-r17). P0 for DL pathloss based power control for SL PRS is based on P0 configured for SL PRS (e.g., dl-P0-SLPRS), if configured, else, P0 for DL pathloss based power control for SL PRS is based on P0 configured for PSSCH/PSSCH (e.g., dl-P0-PSSCH-PSCCH-r16, or dl-P0-PSSCH-PSCCH-r17), if configured, else (neither are configured), DL pathloss based power control for SL PRS is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for DL pathloss based power control can be configured and/or updated by a higher layer parameter for SL PRS (e.g., dl-P0-SLPRS) and/or higher layer for PSSCH/PSCCH (e.g., dl-P0-PSSCH-PSCCH-r16, or dl-P0-PSSCH-PSCCH-r17). P0 for DL pathloss based power control for PSSCH/PSCCH (e.g., for measurement reports) is based on P0 configured for PSSCH/PSSCH (e.g., dl-P0-PSSCH-PSCCH-r16, or dl-P0-PSSCH-PSCCH-r17), if configured, else P0 for DL pathloss based power control for PSSCH/PSCCH is based on P0 configured for SL PRS (e.g., dl-P0-SLPRS), if configured, else (neither are configured), DL pathloss based power control for PSSCH/PSCCH is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for SL pathloss based power control can be configured and/or updated by a higher layer parameter for SL PRS (e.g., sl-P0-SLPRS) and/or higher layer for PSSCH/PSCCH (e.g., sl-P0-PSSCH-PSCCH-r16, or sl-P0-PSSCH-PSCCH-r17). P0 for SL pathloss based power control for SL PRS is based on P0 configured for SL PRS (e.g., sl-P0-SLPRS), if configured, else, P0 for SL pathloss based power control for SL PRS is based on P0 configured for PSSCH/PSSCH (e.g., sl-P0-PSSCH-PSCCH-r16, or sl-P0-PSSCH-PSCCH-r17), if configured, else (neither are configured), SL pathloss based power control for SL PRS is disabled.

In one example, a resource pool is dedicated for positioning, e.g., the resource pool can be used for SL-PRS and for SL positioning measurements. In one example, SL positioning measurements can be included in PSSCH/PSCCH transmissions. P0 for SL pathloss based power control can be configured and/or updated by a higher layer parameter for SL PRS (e.g., sl-P0-SLPRS) and/or higher layer for PSSCH/PSCCH (e.g., sl-P0-PSSCH-PSCCH-r16, or sl-P0-PSSCH-PSCCH-r17). P0 for SL pathloss based power control for PSSCH/PSCCH (e.g., for measurement reports) is based on P0 configured for PSSCH/PSSCH (e.g., sl-P0-PSSCH-PSCCH-r16, or sl-P0-PSSCH-PSCCH-r17), if configured, else P0 for SL pathloss based power control for PSSCH/PSCCH is based on P0 configured for SL PRS (e.g., sl-P0-SLPRS), if configured, else (neither are configured), DL pathloss based power control for PSSCH/PSCCH is disabled.

In one example, a resource pool is shared for SL-PRS and SL communications, P0 for DL pathloss based power control for SL PRS can be configured and/or updated by a higher layer parameter (e.g., dl-P0-SLPRS). If P0 for DL pathloss based power control for SL PRS is not configured, DL pathloss based power control for SL PRS is disabled.

In one example, a resource pool is shared for SL-PRS and SL communications, P0 for SL pathloss based power control for SL PRS can be configured and/or updated by a higher layer parameter (e.g., sl-P0-SLPRS). If P0 for SL pathloss based power control for SL PRS is not configured, SL pathloss based power control for SL PRS is disabled.

In one example, a resource pool is shared for SL-PRS and SL communications, P0 for DL pathloss based power control for SL PRS can be configured and/or updated by a higher layer parameter P0 for DL pathloss based power control for PSSCH/PSCCH (e.g., dl-P0-PSSCH-PSCCH-r16, or dl-P0-PSSCH-PSCCH-r17). If P0 for DL pathloss based power control for PSSCH/PSCCH is not configured/supported, DL pathloss based power control for SL PRS is disabled.

In one example, a resource pool is shared for SL-PRS and SL communications, P0 for SL pathloss based power control for SL PRS can be configured and/or updated by a higher layer parameter P0 for SL pathloss based power control for PSSCH/PSCCH (e.g., sl-P0-PSSCH-PSCCH-r16, or sl-P0-PSSCH-PSCCH-r17). If P0 for SL pathloss based power control for PSSCH/PSCCH is not configured/supported, SL pathloss based power control for SL PRS is disabled.

In one example, a resource pool is shared for SL-PRS and SL communications, P0 for DL pathloss based power control can be configured and/or updated by a higher layer parameter for SL PRS (e.g., dl-P0-SLPRS) and/or higher layer for PSSCH/PSCCH (e.g., dl-P0-PSSCH-PSCCH-r16, or dl-P0-PSSCH-PSCCH-r17). P0 for DL pathloss based power control for SL PRS is based on P0 configured for SL PRS (e.g., dl-P0-SLPRS), if configured, else, P0 for DL pathloss based power control for SL PRS is based on P0 configured for PSSCH/PSSCH (e.g., dl-P0-PSSCH-PSCCH-r16, or dl-P0-PSSCH-PSCCH-r17), if configured, else (neither are configured), DL pathloss based power control for SL PRS is disabled.

In one example, a resource pool is shared for SL-PRS and SL communications, P0 for SL pathloss based power control can be configured and/or updated by a higher layer parameter for SL PRS (e.g., sl-P0-SLPRS) and/or higher layer for PSSCH/PSCCH (e.g., sl-P0-PSSCH-PSCCH-r16, or sl-P0-PSSCH-PSCCH-r17). P0 for SL pathloss based power control for SL PRS is based on P0 configured for SL PRS (e.g., sl-P0-SLPRS), if configured, else, P0 for SL pathloss based power control for SL PRS is based on P0 configured for PSSCH/PSSCH (e.g., sl-P0-PSSCH-PSCCH-r16, or sl-P0-PSSCH-PSCCH-r17), if configured, else (neither are configured), SL pathloss based power control for SL PRS is disabled.

In one example, a resource pool is shared for SL-PRS and SL communications, P0 for DL pathloss based power control can be configured and/or updated by a higher layer parameter for SL PRS (e.g., dl-P0-SLPRS) and higher layer for PSSCH/PSCCH (e.g., dl-P0-PSSCH-PSCCH-r16, or dl-P0-PSSCH-PSCCH-r17): (1) in a slot containing SL-PRS and no PSSCH, P0 for DL pathloss based power control for SL PRS is based on P0 configured for SL PRS (e.g., dl-P0-SLPRS) and (2) in a slot containing SL-PRS and PSSCH, P0 for DL pathloss based power control for SL PRS is based on P0 configured for PSSCH/PSSCH (e.g., dl-P0-PSSCH-PSCCH-r16, or dl-P0-PSSCH-PSCCH-r17).

In one example, a resource pool is shared for SL-PRS and SL communications, P0 for SL pathloss based power control can be configured and/or updated by a higher layer parameter for SL PRS (e.g., sl-P0-SLPRS) and higher layer for PSSCH/PSCCH (e.g., sl-P0-PSSCH-PSCCH-r16, or sl-P0-PSSCH-PSCCH-r17): (1) in a slot containing SL-PRS and no PSSCH, P0 for SL pathloss based power control for SL PRS is based on P0 configured for SL PRS (e.g., sl-P0-SLPRS) and (2) in a slot containing SL-PRS and PSSCH, P0 for SL pathloss based power control for SL PRS is based on P0 configured for PSSCH/PSSCH (e.g., sl-P0-PSSCH-PSCCH-r16, or sl-P0-PSSCH-PSCCH-r17).

In one example, if a PSCCH is associated with SL PRS, the PSCCH power is determined based on the power of the SL PRS. For example, a UE determines a power, $P_{PSCCH}(i)$, in dBm, for a PSCCH transmission occasion i associated with SL-PRS of a resource pool, on an active SL BWP b of a carrier f, as:

$$P_{PSCCH}(i) = 10 \log_{10}\left(\frac{M_{RB}^{PSCCH}(i)}{M_{RB}^{SL\text{-}PRS}(i)}\right) + P_{SL\text{-}PRS}(i)$$

where: (1)

$$M_{RB}^{SL\text{-}PRS}(i)$$

is the number of resource blocks for SL-PRS transmission occasion i; (2)

$$M_{RB}^{PSCCH}(i)$$

is the number of resource blocks for PSCCH transmission occasion i; and (3) $P_{SL\text{-}PRS}(i)$ is the SL-PRS power in symbols with no PSCCH and/or PSCCH.

In one example, if a PSSCH is associated with SL PRS, the PSSCH power is determined based on the power of the SL PRS. For example, a UE determines a power, $P_{PSSCH}(i)$, in dBm, for a PSSCH transmission occasion i associated with SL-PRS of a resource pool, on an active SL BWP b of a carrier f, as:

$$P_{PSSCH}(i) = 10 \log_{10}\left(\frac{M_{RB}^{PSSCH}(i)}{M_{RB}^{SL\text{-}PRS}(i)}\right) + P_{SL\text{-}PRS}(i)$$

where: (1)

$$M_{RB}^{SL\text{-}PRS}(i)$$

is the number of resource blocks for SL-PRS transmission occasion i; (2)

$$M_{RB}^{PSSCH}(i)$$

is the number of resource blocks for PSSCH transmission occasion i; and (3) $P_{SL\text{-}PRS}(i)$ is the SL-PRS power in symbols with no PSSCH and/or PSCCH.

In one example, if a PSCCH is associated with PSSCH, the PSCCH power is determined based on the power of the PSSCH. For example, a UE determines a power, $P_{PSCCH}(i)$, in dBm, for a PSCCH transmission occasion i of a resource pool, on an active SL BWP b of a carrier f, as:

$$P_{PSCCH}(i) = 10 \log_{10}\left(\frac{M_{RB}^{PSCCH}(i)}{M_{RB}^{PSSCH}(i)}\right) + P_{PSSCH}(i)$$

where: (1)

$$M_{RB}^{PSSCH}(i)$$

is the number of resource blocks for PSSCH transmission occasion i; (2)

$$M_{RB}^{PSCCH}(i)$$

is the number of resource blocks for PSCCH transmission occasion i; and (3) $P_{PSSCH}(i)$ is the PSSCH power in symbols with no PSCCH and/or SL-PRS.

In one example, if a SL-PRS is associated with PSSCH, the SL-PRS power is determined based on the power of the PSSCH. For example, a UE determines a power, $P_{SL-PRS}(i)$, in dBm, for a SL-PRS transmission occasion i associated with PSSCH of a resource pool, on an active SL BWP b of a carrier f, as:

$$P_{SL-PRS}(i) = 10 \, \log_{10} \left( \frac{M_{RB}^{SL-PRS}(i)}{M_{RB}^{PSSCH}(i)} \right) + P_{PSSCH}(i)$$

where: (1)

$$M_{RB}^{SL-PRS}(i)$$

is the number of resource blocks for SL-PRS transmission occasion i; (2)

$$M_{RB}^{PSSCH}(i)$$

is the number of resource blocks for PSSCH transmission occasion i; and (3) $P_{PSSCH}(i)$ is the PSSCH power in symbols with no SL-PRS and/or PSCCH.

In one example, if a PSCCH is transmitted in a same symbol as SL PRS, the PSCCH power is determined based on the power of the SL PRS. For example, a UE determines a power, $P_{PSCCH}(i)$, in dBm, for a PSCCH transmission occasion i associated with SL-PRS of a resource pool, on an active SL BWP b of a carrier f, as:

$$P_{PSCCH}(i) = 10 \, \log_{10} \left( \frac{M_{RB}^{PSCCH}(i)}{M_{RB}^{SL-PRS}(i)} \right) + P_{SL-PRS}(i)$$

where: (1)

$$M_{RB}^{SL-PRS}(i)$$

is the number of resource blocks for SL-PRS transmission occasion i; (2)

$$M_{RB}^{PSCCH}(i)$$

is the number of resource blocks for PSCCH transmission occasion i; and (3) $P_{SL-PRS}(i)$ is the SL-PRS power in symbols with no PSCCH and/or PSSCH.

In one example, if a PSSCH is transmitted in a same symbol as SL PRS, the PSSCH power is determined based on the power of the SL PRS. For example, a UE determines a power, $P_{PSSCH}(i)$, in dBm, for a PSSCH transmission occasion i associated with SL-PRS of a resource pool, on an active SL BWP b of a carrier f, as:

$$P_{PSSCH}(i) = 10 \, \log_{10} \left( \frac{M_{RB}^{PSSCH}(i)}{M_{RB}^{SL-PRS}(i)} \right) + P_{SL-PRS}(i)$$

where: (1)

$$M_{RB}^{SL-PRS}(i)$$

is the number of resource blocks for SL-PRS transmission occasion i; (2)

$$M_{RB}^{PSSCH}(i)$$

is the number of resource blocks for PSSCH transmission occasion i; and (3) $P_{SL-PRS}(i)$ is the SL-PRS power in symbols with no PSSCH and/or PSCCH.

In one example, if a PSCCH is transmitted in a same symbol as PSSCH, the PSCCH power is determined based on the power of the PSSCH. For example, a UE determines a power, $P_{PSCCH}(i)$, in dBm, for a PSCCH transmission occasion i of a resource pool, on an active SL BWP b of a carrier f, as:

$$P_{PSCCH}(i) = 10 \, \log_{10} \left( \frac{M_{RB}^{PSCCH}(i)}{M_{RB}^{PSSCH}(i)} \right) + P_{PSSCH}(i)$$

where: (1)

$$M_{RB}^{PSSCH}(i)$$

is the number of resource blocks for PSSCH transmission occasion i; (2)

$$M_{RB}^{PSCCH}(i)$$

is the number of resource blocks for PSCCH transmission occasion i; and (3) $P_{PSSCH}(i)$ is the PSSCH power in symbols with no PSCCH and/or SL-PRS.

In one example, if a SL-PRS is transmitted in a same symbol as PSSCH, the SL-PRS power is determined based on the power of the PSSCH. For example, a UE determines a power, $P_{SL-PRS}(i)$, in dBm, for a SL-PRS transmission occasion i associated with PSSCH of a resource pool, on an active SL BWP b of a carrier f, as:

$$P_{SL-PRS}(i) = 10 \, \log_{10} \left( \frac{M_{RB}^{SL-PRS}(i)}{M_{RB}^{PSSCH}(i)} \right) + P_{PSSCH}(i)$$

where: (1)

$$M_{RB}^{SL-PRS}(i)$$

is the number of resource blocks for SL-PRS transmission occasion i; (2)

$$M_{RB}^{PSSCH}(i)$$

is the number of resource blocks for PSSCH transmission occasion i; and (3) $P_{PSSCH}$ (i) is the PSSCH power in symbols with no SL-PRS and/or PSCCH.

FIGS. 10A-10B illustrate examples of SL-PRS transmission 1000 and 1050 according to embodiments of the present disclosure. The embodiment of the SL-PRS transmissions 1000 and 1050 illustrated in FIGS. 10A-10B is for illustration only.

In one example, the SL PRS is transmitted is symbols that do not overlap PSSCH or PSCCH as illustrated in FIG. 10A.

Figures 11A, 11B, 11C:
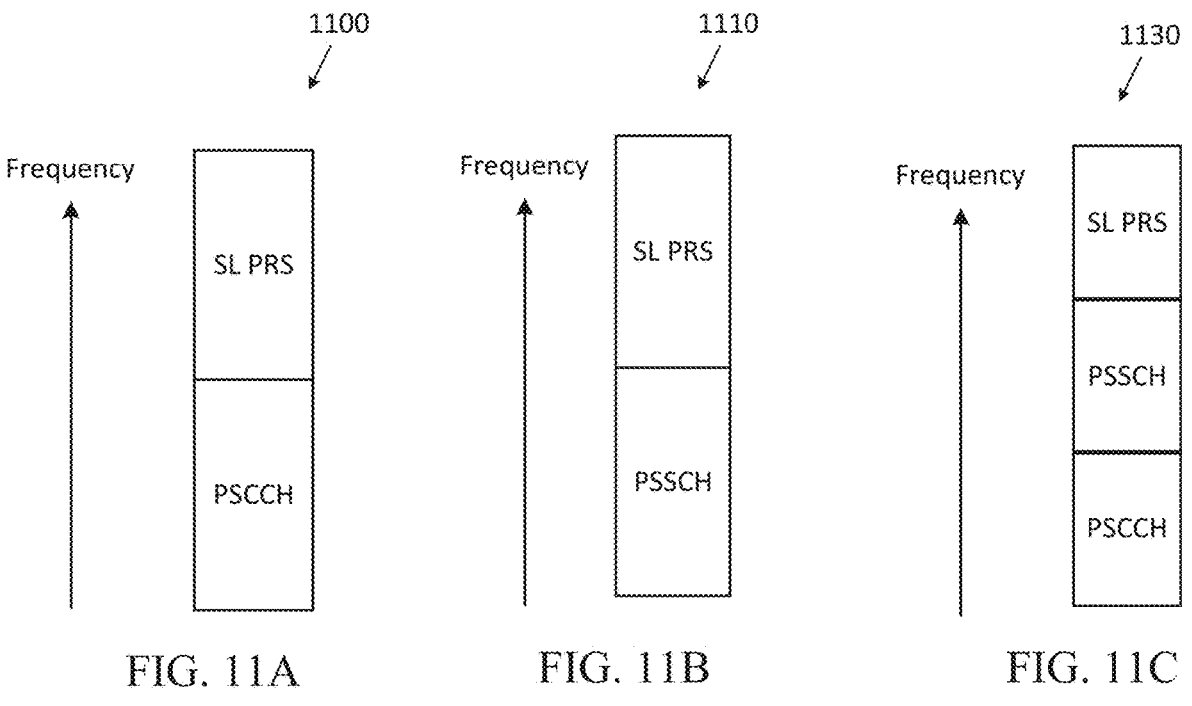
FIGS. 11A-11C illustrate examples of SL-PRS and PSSCH and/or PSCCH multiplexing according to embodiments of the present disclosure.

FIGS. 11A-11C illustrates example of SL-PRS and PSSCH and/or PSCCH multiplexing 1100-1120 according to embodiments of the present disclosure. The embodiment of the SL-PRS and PSSCH and/or PSCCH multiplexing 1100-1120 illustrated in FIGS. 11A-11C is for illustration only.

In one example, SL-PRS and PSSCH and/or PSCCH are multiplexed in the same symbol in frequency as illustrated in: FIG. 11A SL-PRS and PSCCH are multiplexed in frequency on a symbol; (2) in FIG. 11B SL-PRS and PSSCH are multiplexed in frequency on a symbol; and (3) in FIG. 11C SL-PRS and PSSCH and PSCCH are multiplexed in frequency on a symbol.

In one example, when SL-PRS and (PSSCH and/or PSCCH) are transmitted in a same slot the power per symbol is the same for symbols containing SL-PRS REs and/or PSCCH REs and/or PSSCH REs.

In one example, when SL-PRS and (PSSCH and/or PSCCH) are transmitted in a same slot the energy per resource element (EPRE) is the same for SL-PRS REs and/or PSCCH REs and/or PSSCH REs.

In one example, when SL-PRS and (PSSCH and/or PSCCH) are transmitted in a same number of REs (or sub-carriers or PRBs or sub-channels) transmitted per symbol is the same for symbols containing SL-PRS REs and/or PSCCH REs and/or PSSCH REs.

In one example, when SL-PRS and (PSSCH and/or PSCCH) are transmitted in a same slot the power per symbol can be different between symbols in which SL-PRS is transmitted and symbols in which PSSCH/PSCCH is transmitted. There are no symbols in which both SL PRS and PSSCH/PSCCH are transmitted from a UE.

In one example, let $N_{sym-SLPRS}$ be the number of SL-PRS PRBs in a symbol and let $N_{sym-PSSCHPSCCH}$ be the number of PSSCH/PSCCH REs in a symbol. Let $EPRE_{SLPRS}$ be the EPRE for SL-PRS in dBm/Hz and let $EPRE_{PSSCHPSCCH}$ be the ERPE for PSSCH/PSCCH in dBm/Hz.

In one example, $N_{sym-SLPRS}=N_{sym-PSSCHPSCCH}$.

In one example, $EPRE_{SLPRS}=EPRE_{PSSCHPSCCH}$.

In one example, $10 \log N_{sym-SLPRS}+EPRE_{SLPRS}=10 \log N_{sym-PSSCHPSCCH}+EPRE_{PSSCHPSCCH}$. i.e., the energy per symbol in a slot is the same, whether the symbol is used for SL-PRS or PSSCH/PSCCH. In one example, the number of PRBs per symbol is different between SL-PRS symbols and PSSCH/PSCCH symbols, the EPRE is adjusted to make the symbol power the same. In a variant example, energy per PRB is used instead of EPRE. In a variant example, energy per 2 PRBs is used instead of EPRE, where p is the sub-carrier spacing configuration.

In a variant example, if $EPRE_{SLPRS}$ and $EPRE_{PSSCHPSCCH}$ are in units power (e.g., Watt or mWatt) per Hertz or in units of energy, $N_{sym-SLPRS} \cdot EPRE_{SLPRS}= N_{sym-PSSCHPSCCH} \cdot EPRE_{PSSCHPSCCH}$. i.e., the energy per symbol in a slot is the same, whether the symbol is used for SL-PRS or PSSCH/PSCCH. In one example, the number of PRBs per symbol is different between SL-PRS symbols and PSSCH/PSCCH symbols, the EPRE is adjusted to make the symbol power the same. In a variant example, energy per PRB is used instead of EPRE. In a variant example, energy per 2 PRBs is used instead of EPRE, where p is the sub-carrier spacing configuration.

In one example, $EPRE_{SLPRS}=EPRE_{PSSCHPSCCH}$ and $N_{sym-SLPRS} \neq N_{sym-PSSCHPSCCH}$, and the energy (or power) of a SL-PRS symbol is different from the energy or power of a PSSCH/PSCCH symbol.

In one example, $EPRE_{SLPRS} \# EPRE_{PSSCHPSCCH}$ and $N_{sym-SLPRS}=N_{sym-PSSCHPSCCH}$, and the energy (or power) of a SL-PRS symbol is different from the energy or power of a PSSCH/PSCCH symbol.

In one example, a resource pool is dedicated for SL-PRS. A UE receiving a SL PRS can transmit an acknowledgment in response to the SL PRS. For example, if the SL PRS SINR and/or RSRP is greater than (or greater than or equal to) a threshold, a positive acknowledgment can be sent. In one example, if the SL PRS SINR and/or RSRP is less than or equal to (or less than) a threshold a negative acknowledgment can be sent. Wherein, the threshold, can be specified in system specifications and/or pre-configured and/or configured or updated by RRC signaling and/or MAC CE signaling and/or L1 control (e.g., DCI or SCI) signaling. In one example, a resource pool or a UE can be pre-configured and/or configured by RRC signaling and/or MAC CE signaling and/or L1 control (e.g., DCI or SCI) signaling whether or not to transmit or receive acknowledgement for SL PRS.

In one example, a resource pool is dedicated for SL-PRS. A UE can transmit or receive a PSFCH with conflict indication. In one example, a PSFCH can indicate a presence of conflict for SL PRS. In another, a PSFCH can indicate the absence of a conflict for SL PRS. In one example, a resource pool or a UE can be pre-configured and/or configured by RRC signaling and/or MAC CE signaling and/or L1 control (e.g., DCI or SCI) signaling whether or not to transmit or receive PSFCH with conflict information for SL PRS.

In one example, a resource pool is dedicated for positioning, e.g., the resource pool can be used for SL-PRS and for SL positioning measurements. A UE receiving a SL PRS can transmit an acknowledgment in response to the SL PRS. For example, if the SL PRS SINR and/or RSRP is greater than (or greater than or equal to) a threshold, a positive acknowledgment can be sent. In one example, if the SL PRS SINR and/or RSRP is less than or equal to (or less than) a threshold a negative acknowledgment can be sent. Wherein, the threshold, can be specified in system specifications and/or pre-configured and/or configured or updated by RRC signaling and/or MAC CE signaling and/or L1 control (e.g., DCI or SCI) signaling. A UE receiving a PSSCH/PSCCH with positioning measurements can transmit an acknowledgment in response to the PSSCH/PSCCH. In one example, a resource pool or a UE can be pre-configured and/or configured by RRC signaling and/or MAC CE signaling and/or L1 control (e.g., DCI or SCI) signaling whether or not to transmit or receive acknowledgement for SL PRS. In one example, a resource pool or a UE can be pre-configured and/or configured by RRC signaling and/or MAC CE signaling and/or L1 control (e.g., DCI or SCI) signaling whether or not to transmit or receive acknowledgement for PSSCH/PSCCH with positioning measurements. In one example, a resource pool or a UE can be pre-configured and/or configured by RRC signaling and/or MAC CE signaling and/or L1 control (e.g., DCI or SCI) signaling whether or not to transmit or receive acknowledgement for SL PRS and for PSSCH/PSCCH with positioning measurements.

In one example, a resource pool is dedicated for positioning, e.g., the resource pool can be used for SL-PRS and for SL positioning measurements. A UE can transmit or receive a PSFCH with conflict indication for SL PRS. In one example, a PSFCH can indicate a presence of conflict for SL PRS. In another, a PSFCH can indicate the absence of a conflict for SL PRS. A UE can transmit or receive a PSFCH with conflict indication for PSSCH/PSCCH with positioning measurements. In one example, a PSFCH can indicate a presence of conflict for PSSCH/PSCCH with positioning measurements. In another, a PSFCH can indicate the absence of a conflict for PSSCH/PSCCH with positioning measurements. In one example, a resource pool or a UE can be pre-configured and/or configured by RRC signaling and/or MAC CE signaling and/or L1 control (e.g., DCI or SCI) signaling whether or not to transmit or receive PSFCH with conflict information for SL PRS. In one example, a resource pool or a UE can be pre-configured and/or configured by RRC signaling and/or MAC CE signaling and/or L1 control (e.g., DCI or SCI) signaling whether or not to transmit or receive PSFCH with conflict information for PSSCH/PSCCH with positioning measurements. In one example, a resource pool or a UE can be pre-configured and/or configured by RRC signaling and/or MAC CE signaling and/or L1 control (e.g., DCI or SCI) signaling whether or not to transmit or receive PSFCH with conflict information for SL PRS and for PSSCH/PSCCH with positioning measurements.

In one example, a resource pool is shared for SL-PRS and SL communications. A UE receiving a SL PRS can transmit an acknowledgment in response to the SL PRS. For example, if the SL PRS SINR and/or RSRP is greater than (or greater than or equal to) a threshold, a positive acknowledgment can be sent. In one example, if the SL PRS SINR and/or RSRP is less than or equal to (or less than) a threshold a negative acknowledgment can be sent. Wherein, the threshold, can be specified in system specifications and/or pre-configured and/or configured or updated by RRC signaling and/or MAC CE signaling and/or L1 control (e.g., DCI or SCI) signaling. In one example, a resource pool or a UE can be pre-configured and/or configured by RRC signaling and/or MAC CE signaling and/or L1 control (e.g., DCI or SCI) signaling whether or not to transmit or receive acknowledgement for SL PRS. In one example, a UE receiving a PSSCH/PSCCH can transmit an acknowledgment in response to the PSSCH/PSCCH.

In one example, a resource pool is shared for SL-PRS and SL communications. A UE can transmit or receive a PSFCH with conflict indication. In one example, a PSFCH can indicate a presence of conflict for SL PRS. In another, a PSFCH can indicate the absence of a conflict for SL PRS. In one example, a resource pool or a UE can be pre-configured and/or configured by RRC signaling and/or MAC CE signaling and/or L1 control (e.g., DCI or SCI) signaling whether or not to transmit or receive PSFCH with conflict information for SL PRS. In one example, a UE can transmit or receive a PSFCH with conflict indication for PSSCH/PSCCH.

In one example, a UE has $N_{sch,TX,PSFCH}$ scheduled with PSFCH transmissions for HARQ-ACK information and conflict information. The UE is capable of transmitting a maximum of $N_{max,PSFCH}$. The UE determines $N_{TX,PSFCH}$ PSFCH to transmit, each with a power $P_{PSFCH,k}(i)$, for $1 \leq k \leq N_{TX,PSFCH}$, for a PSFCH transmission occasion i of a resource pool, on an active SL BWP b of a carrier f. A UE can be provided with higher layer parameter dl-P0-PSFCH for P0 for DL pathloss based power control for PSFCH. The UE calculates $P_{PSFCH,one}$ in dBm: $P_{PSFCH,one} = P_{O,PSFCH} + 10 \log_{10}(2^\mu) + \alpha_{PSFCH} \cdot PL$.

Where, the parameters in the last equation are as previously described. In one example, $P_{O,PSFCH}$ is determined based on P0 value for DL pathloss based power control for PSFCH as previously described (e.g., dl-P0-PSFCH-r16 or dl-P0-PSFCH-r17), wherein dl-P0-PSFCH-r16 or dl-P0-PSFCH-r17 are configured for a resource pool dedicated for SL PRS or a resource pool dedicated for positioning or a resource pool shared for SL PRS and SL communications. In another example, $P_{O,PSFCH}$ is determined based on P0 value, configured for DL pathloss based power control for PSFCH associated with SL-PRS and/or positioning measurements, and configured for a resource pool dedicated for SL PRS or a resource pool dedicated for positioning or a resource pool shared for SL PRS and SL communications (e.g., dl-P0-PSFCH-SLPRS).

In one example, $\alpha_{PSFCH}$ is determined based on alpha value for DL pathloss based power control for PSFCH as previously described (e.g., dl-Alpha-PSFCH-r16), wherein dl-Alpha-PSFCH-r16 are configured for a resource pool dedicated for SL PRS or a resource pool dedicated for positioning or a resource pool shared for SL PRS and SL communications. In another example, $\alpha_{PSFCH}$ is determined based on alpha value, configured for DL pathloss based power control for PSFCH associated with SL-PRS and/or positioning measurements, and configured for a resource pool dedicated for SL PRS or a resource pool dedicated for positioning or a resource pool shared for SL PRS and SL communications (e.g., dl-Alpha-PSFCH-SLPRS).

In one example, a UE has $N_{sch,TX,PSFCH}$ scheduled with PSFCH transmissions for HARQ-ACK information and conflict information. The UE is capable of transmitting a maximum of $N_{max,PSFCH}$. The UE determines $N_{TX,PSFCH}$ PSFCH to transmit, each with a power $P_{PSFCH,k}(i)$, for $1 \leq k \leq N_{TX,PSFCH}$, for a PSFCH transmission occasion i of a resource pool, on an active SL BWP b of a carrier f.

The following scenarios, shown in TABLE 4, are considered.

TABLE 4

| | Scenario 1 | Scenario 2 | Scenario 3 | Scenario 4 |
|---|---|---|---|---|
| | | Scenarios | | |
| Conditions | $N_{sch,\ TX,\ PSFCH} \le N_{max,\ PSFCH}$ There is enough power to transmit $N_{sch,\ TX,\ PSFCH}$, i.e., $P_{PSFCH,\ one}$ + $10 \log_{10}(N_{sch,\ TX,\ PSFCH}) \le \le P_{CMAX}$ | $N_{sch,\ TX,\ PSFCH} \le N_{max,\ PSFCH}$ There is not enough power to transmit $N_{sch,\ TX,\ PSFCH}$, i.e., $P_{PSFCH,\ one}$ + $10 \log_{10}(N_{sch,\ TX,\ PSFCH}) >$ $P_{CMAX}$ | $N_{sch,\ TX,\ PSFCH} > N_{max,\ PSFCH}$ There is not enough power to transmit $N_{TX,\ PSFCH}$, i.e., $P_{PSFCH,\ one}$ + $10 \log_{10}(N_{TX,\ PSFCH}) \le$ $P_{CMAX}$ | $N_{sch,\ TX,\ PSFCH} > N_{max,\ PSFCH}$ There is not enough power to transmit $N_{TX,\ PSFCH}$, i.e., $P_{PSFCH,\ one}$ + $10 \log_{10}(N_{TX,\ PSFCH}) >$ $P_{CMAX}$ |
| Outcome | Transmit $N_{sch,\ TX,\ PSFCH}$ each with power $P_{PSFCH,\ one}$ | UE prioritizes PSFCH channels for transmission as described | UE selects $N_{TX,\ PSFCH}$ for transmission based on priority. Each transmitted with power $P_{PSFCH,\ one}$ | UE prioritizes PSFCH channels for transmission as described |

In one example of scenarios 1, the number of scheduled PSFCH transmissions in a transmission occasion is less than or equal to the maximum number of PSFCHs the UE can transmit, i.e., $N_{sch,TX,PSFCH} \le N_{max,PSFCH}$: there is enough power to transmit the $N_{sch,TX,PSFCH}$ PSFCHs, i.e., $P_{PSFCH,one}+10 \log_{10}(N_{sch,TX,PSFCH}) \le P_{CMAX}$, Wherein, $P_{CMAX}$ is the configured maximum output power of the UE determined for $N_{sch,TX,PSFCH}$ transmissions. In this case, the UE can transmit $N_{sch,TX,PSFCH}$, each with power $P_{PSFCH,k}(i)=P_{PSFCH,one}$, where k=1, . . . $N_{sch,TX,PSFCH}$.

In one example of scenario 2: (1) the number of scheduled PSFCH transmissions in a transmission occasion is less than or equal to the maximum number of PSFCHs the UE can transmit, i.e., $N_{sch,TX,PSFCH} \le N_{max,PSFCH}$; and (2) there is not enough power to transmit the $N_{sch,TX,PSFCH}$ PSFCHs, i.e., $P_{PSFCH,one}+10 \log_{10}(N_{sch,TX,PSFCH}) > P_{CMAX}$, Wherein, $P_{CMAX}$ is the configured maximum output power of the UE determined for $N_{sch,TX,PSFCH}$ transmissions.

In this scenario, the UE can select a fewer number of PSFCH transmissions to transmit, such that the configured maximum output power of the UE (e.g., $P_{CMAX}$) is not exceeded.

In one example, there is one group for all the PSFCH transmissions. For example, the one group can include: PSFCH with acknowledgement for SL PRS and/or PSFCH with acknowledgement for PSSCH/PSCCH (e.g., with positioning measurements and/or SL data for SL communications), and/or conflict information for SL PRS and/or conflict information for PSSCH/PSCCH (e.g., with positioning measurements and/or SL data for SL communications).

The UE determines $N_{TX,PSFCH}$ PSFCH transmissions, for PSFCH transmissions such that $$N_{TX,PSFCH} \ge \max\left(1, \sum_{i=1}^{K} M_i\right).$$

Where, for $1 \le i \le 8$, $M_i$ is the number of PSFCH transmissions with priority level i. K is the largest value satisfying $$P_{PSFCH,one} + 10\log_{10}\left(\max\left(1, \sum_{i=1}^{K} M_i\right)\right) \le P_{CMAX},$$

if any, otherwise K=0. The PSFCH power is given by: $P_{PSFCH,k}(i)=\min(P_{CMAX}-10 \log_{10}(N_{TX,PSFCH}),P_{PSFCH,one})$, where $P_{CMAX}$ is determined for $N_{TX,PSFCH}$ transmissions.

In one example, there are two groups for all the PSFCH transmissions. The groups can be determined according to the examples of TABLE 5 (other examples are also possible): In one example, there is no PSFCH with acknowledgement for SL PRS, the corresponding entry is not present in table 2. In one example, there is no PSFCH with conflict for SL PRS, the corresponding entry is not present in TABLE 5.

TABLE 5

| | Groups for PSFCH transmissions | |
|---|---|---|
| Example | Group 1 | Group 2 |
| Example 1 | PSFCH with acknowledgement for SL PRS | PSFCH with conflict information for SL PRS |
| Example 2 | PSFCH with conflict information for SL PRS | PSFCH with acknowledgement for SL PRS |
| Example 3 | PSFCH with acknowledgement for PSSCH/PSCCH with positioning measurements and/or SL data for SL communications | PSFCH with conflict information for PSSCH/PSCCH with positioning measurements and/or SL data for SL communications |
| Example 4 | PSFCH with conflict information for PSSCH/PSCCH with positioning measurements and/or SL data for SL communications | PSFCH with acknowledgement for PSSCH/PSCCH with positioning measurements and/or SL data for SL communications |
| Example 5 | PSFCH with acknowledgement for SL PRS and/or PSSCH/PSCCH with positioning measurements and/or SL data for SL communications | PSFCH with conflict information for SL PRS and/or PSSCH/PSCCH with positioning measurements and/or SL data for SL communications |
| Example 6 | PSFCH with conflict information for SL PRS and/or PSSCH/PSCCH with positioning measurements and/or SL data for SL communications | PSFCH with acknowledgement for SL PRS and/or PSSCH/PSCCH with positioning measurements and/or SL data for SL communications |

TABLE 5-continued

| Example | Group 1 | Group 2 |
|---|---|---|
| Example 7 | PSFCH with acknowledgement and/or conflict information for SL PRS | PSFCH with acknowledgement and/or conflict information for PSSCH/PSCCH with positioning measurements and/or SL data for SL communications |
| Example 8 | PSFCH with acknowledgement and/or conflict information for PSSCH/PSCCH with positioning measurements and/or SL data for SL communications | PSFCH with acknowledgement and/or conflict information for SL PRS |
| Example 9 | PSFCH with acknowledgement for PSSCH/PSCCH with positioning measurements and/or SL data for SL communications | Other PSFCHs |
| . . . | . . . | . . . |

The UE determines $N_{TX,PSFCH}$ PSFCH transmissions, first with ascending order of priority for PSFCH transmissions of group 1, then with ascending order of priority for PSFCH transmissions of group 2, such that $$N_{TX,PSFCH} \geq \max\left(1, \sum_{i=1}^{K} M_i\right).$$

Where, for $1 \leq i \leq 8$, $M_i$ is the number of PSFCH transmissions of group 1 with priority level i, and for i>8, $M_i$ is the number of PSFCH transmissions of group 2 with priority level i−8. K is the largest value satisfying $$P_{PSFCH,one} + 10\log_{10}\left(\max\left(1, \sum_{i=1}^{K} M_i\right)\right) \leq P_{CMAX}, \text{ if any, otherwise } K = 0.$$

The PSFCH power is given by: $P_{PSFCH,k}(i)=\min(P_{CMAX}-10\log_{10}(N_{TX,PSFCH}),P_{PSFCH,one})$, where $P_{CMAX}$ is determined for $N_{TX,PSFCH}$ transmissions.

In one example, there are three groups for all the PSFCH transmissions. The groups can be determined according to the examples of TABLE 6 (other examples are also possible): In one example, there is no PSFCH with acknowledgement for SL PRS, the corresponding entry is not present in TABLE 6. In one example, there is no PSFCH with conflict for SL PRS, the corresponding entry is not present in TABLE 6.

TABLE 6

| Example | Group 1 | Group 2 | Group 3 |
|---|---|---|---|
| Example 1 | PSFCH with acknowledgement and/or conflict information for SL PRS | PSFCH with acknowledgement for PSSCH/PSCCH with positioning measurements and/or SL data for SL communications | PSFCH with conflict information for PSSCH/PSCCH with positioning measurements and/or SL data for SL communications |
| Example 2 | PSFCH with acknowledgement for PSSCH/PSCCH with positioning measurements and/or SL data for SL communications | PSFCH with conflict information for PSSCH/PSCCH with positioning measurements and/or SL data for SL communications | PSFCH with acknowledgement and/or conflict information for SL PRS |
| Example 3 | PSFCH with acknowledgement for SL PRS and/or for PSSCH/PSCCH (with positioning measurements and/or SL data for SL communications) | PSFCH with conflict information for SL PRS | PSFCH with conflict information for PSSCH/PSCCH with positioning measurements and/or SL data for SL communications |
| Example 4 | PSFCH with acknowledgement for SL PRS and/or for PSSCH/PSCCH (with positioning measurements and/or SL data for SL communications) | PSFCH with conflict information for PSSCH/PSCCH with positioning measurements and/or SL data for SL communications | PSFCH with conflict information for SL PRS |
| Example 5 | PSFCH with acknowledgement for PSSCH/PSCCH with positioning measurements and/or SL data for SL communications | PSFCH with acknowledgement for SL PRS | PSFCH with conflict information for SL PRS and/or for PSSCH/PSCCH (with positioning measurements and/or SL data for SL communications) |

TABLE 6-continued

| | Groups for PSFCH transmissions | | |
|---|---|---|---|
| Example | Group 1 | Group 2 | Group 3 |
| Example 6 | PSFCH with acknowledgement for PSSCH/PSCCH with positioning measurements and/or SL data for SL communications | PSFCH with conflict information for SL PRS and/or for PSSCH/PSCCH (with positioning measurements and/or SL data for SL communications) | PSFCH with acknowledgement for SL PRS |
| . . . | . . . | . . . | . . . |

The UE determines $N_{TX,PSFCH}$ PSFCH transmissions, first with ascending order of priority for PSFCH transmissions of group 1, then with ascending order of priority for PSFCH transmissions of group 2, then with ascending order of priority for PSFCH transmissions of group 3, such that $$N_{TX,PSFCH} \geq \max\left(1, \sum_{i=1}^{K} M_i\right).$$

Where, for $1 \leq i \leq 8$, $M_i$ is the number of PSFCH transmissions of group 1 with priority level i, and for $9 \leq i \leq 16$, $M_i$ is the number of PSFCH transmissions of group 2 with priority level i−8, and for i>16, $M_i$ is the number of PSFCH transmissions of group 3 with priority level i−16. K is the largest value satisfying $$P_{PSFCH,one} + 10\log_{10}\left(\max\left(1, \sum_{i=1}^{K} M_i\right)\right) \leq P_{CMAX},$$

if any, otherwise K=0. The PSFCH power is given by: $P_{PSFCH,k}(i)=\min(P_{CMAX}-10 \ \log_{10}(N_{TX,PSFCH}),P_{PSFCH,one})$, where $P_{CMAX}$ is determined for $N_{TX,PSFCH}$ transmissions.

In one example, there are four groups for all the PSFCH transmissions. The groups can be determined according to the examples of TABLE 7: in one example, there is no PSFCH with acknowledgement for SL PRS, the corresponding entry is not present in TABLE 7, hence only 3 groups are provided as in TABLE 6. In one example, there is no PSFCH with conflict for SL PRS, the corresponding entry is not present in TABLE 7, hence only 3 groups are provided as in TABLE 6. In one example, there is no PSFCH with acknowledgement for SL PRS and there is no PSFCH with conflict for SL PRS, the corresponding entries is not present in TABLE 7, hence only 2 groups are provided as in TABLE 5.

TABLE 7

| | Groups for PSFCH transmissions | | | |
|---|---|---|---|---|
| Example | Group 1 | Group 2 | Group 3 | Group 4 |
| Example 1 | PSFCH with acknowledgement for SL PRS | PSFCH with acknowledgement for PSSCH/PSCCH with positioning measurements and/or SL data for SL communications | PSFCH with conflict information for SL PRS | PSFCH with conflict information for PSSCH/PSCCH with positioning measurements and/or SL data for SL communications |
| Example 2 | PSFCH with acknowledgement for SL PRS | PSFCH with acknowledgement for PSSCH/PSCCH with positioning measurements and/or SL data for SL communications | PSFCH with conflict information PSSCH/PSCCH with positioning measurements and/or SL data for SL communications | PSFCH with conflict information for SL PRS |
| Example 3 | PSFCH with acknowledgement for SL PRS | PSFCH with conflict information for SL PRS | PSFCH with acknowledgement for PSSCH/PSCCH with positioning measurements and/or SL data for SL communications | PSFCH with conflict information for PSSCH/PSCCH with positioning measurements and/or SL data for SL communications |
| Example 4 | PSFCH with acknowledgement for SL PRS | PSFCH with conflict information for SL PRS | PSFCH with conflict information for PSSCH/PSCCH with positioning measurements and/or SL data for SL communications | PSFCH with acknowledgement for PSSCH/PSCCH with positioning measurements and/or SL data for SL communications |

TABLE 7-continued

| | Groups for PSFCH transmissions | | | |
|---|---|---|---|---|
| Example | Group 1 | Group 2 | Group 3 | Group 4 |
| Example 5 | PSFCH with acknowledgement for SL PRS | PSFCH with conflict information for PSSCH/PSCCH with positioning measurements and/or SL data for SL communications | PSFCH with acknowledgement for PSSCH/PSCCH with positioning measurements and/or SL data for SL communications | PSFCH with conflict information for SL PRS |
| Example 6 | PSFCH with acknowledgement for SL PRS | PSFCH with conflict information for PSSCH/PSCCH with positioning measurements and/or SL data for SL communications | PSFCH with conflict information for SL PRS | PSFCH with acknowledgement for PSSCH/PSCCH with positioning measurements and/or SL data for SL communications |
| Example 7 | PSFCH with acknowledgement for PSSCH/PSCCH with positioning measurements and/or SL data for SL communications | PSFCH with acknowledgement for SL PRS | PSFCH with conflict information for SL PRS | PSFCH with conflict information for PSSCH/PSCCH with positioning measurements and/or SL data for SL communications |
| Example 8 | PSFCH with acknowledgement for PSSCH/PSCCH with positioning measurements and/or SL data for SL communications | PSFCH with acknowledgement for SL PRS | PSFCH with conflict information for PSSCH/PSCCH with positioning measurements and/or SL data for SL communications | PSFCH with conflict information for SL PRS |
| Example 9 | PSFCH with acknowledgement for PSSCH/PSCCH with positioning measurements and/or SL data for SL communications | PSFCH with conflict information for SL PRS | PSFCH with acknowledgement for SL PRS | PSFCH with conflict information for PSSCH/PSCCH with positioning measurements and/or SL data for SL communications |
| Example 10 | PSFCH with acknowledgement for PSSCH/PSCCH with positioning measurements and/or SL data for SL communications | PSFCH with conflict information for SL PRS | PSFCH with conflict information for PSSCH/PSCCH with positioning measurements and/or SL data for SL communications | PSFCH with acknowledgement for SL PRS |
| Example 11 | PSFCH with acknowledgement for PSSCH/PSCCH with positioning measurements and/or SL data for SL communications | PSFCH with conflict information for PSSCH/PSCCH with positioning measurements and/or SL data for SL communications | PSFCH with acknowledgement for SL PRS | PSFCH with conflict information for SL PRS |
| Example 12 | PSFCH with acknowledgement for PSSCH/PSCCH with positioning measurements and/or SL data for SL communications | PSFCH with conflict information for PSSCH/PSCCH with positioning measurements and/or SL data for SL communications | PSFCH with conflict information for SL PRS | PSFCH with acknowledgement for SL PRS |
| Example 13 | PSFCH with conflict information for SL PRS | PSFCH with acknowledgement for SL PRS | PSFCH with acknowledgment for PSSCH/PSCCH with positioning measurements and/or SL data for SL communications | PSFCH with conflict information for PSSCH/PSCCH with positioning measurements and/or SL data for SL communications |
| Example 14 | PSFCH with conflict information for SL PRS | PSFCH with acknowledgement for SL PRS | PSFCH with acknowledgment for PSSCH/PSCCH with positioning measurements and/or SL data for SL communications | PSFCH with conflict information for PSSCH/PSCCH with positioning measurements and/or SL data for SL communications |
| Example 15 | PSFCH with conflict information for SL PRS | PSFCH with acknowledgement for PSSCH/PSCCH with positioning | PSFCH with acknowledgement for SL PRS | PSFCH with conflict information for PSSCH/PSCCH with positioning |

TABLE 7-continued

| Example | Group 1 | Group 2 | Group 3 | Group 4 |
|---|---|---|---|---|
| | | measurements and/or SL data for SL communications | | measurements and/or SL data for SL communications |
| Example 16 | PSFCH with conflict information for SL PRS | PSFCH with acknowledgement for PSSCH/PSCCH with positioning measurements and/or SL data for SL communications | PSFCH with conflict information for PSSCH/PSCCH with positioning measurements and/or SL data for SL communications | PSFCH with acknowledgement for SL PRS |
| Example 17 | PSFCH with conflict information for SL PRS | PSFCH with conflict information for PSSCH/PSCCH with positioning measurements and/or SL data for SL communications | PSFCH with acknowledgement for SL PRS | PSFCH with acknowledgment for PSSCH/PSCCH with positioning measurements and/or SL data for SL communications |
| Example 18 | PSFCH with conflict information for SL PRS | PSFCH with conflict information for PSSCH/PSCCH with positioning measurements and/or SL data for SL communications | PSFCH with acknowledgment for PSSCH/PSCCH with positioning measurements and/or SL data for SL communications | PSFCH with acknowledgement for SL PRS |
| Example 19 | PSFCH with conflict information for PSSCH/PSCCH with positioning measurements and/or SL data for SL communications | PSFCH with acknowledgement for SL PRS | PSFCH with acknowledgement for PSSCH/PSCCH with positioning measurements and/or SL data for SL communications | PSFCH with conflict information for SL PRS |
| Example 20 | PSFCH with conflict information for PSSCH/PSCCH with positioning measurements and/or SL data for SL communications | PSFCH with acknowledgement for SL PRS | PSFCH with conflict information for SL PRS | PSFCH with acknowledgement for PSSCH/PSCCH with positioning measurements and/or SL data for SL communications |
| Example 21 | PSFCH with conflict information for PSSCH/PSCCH with positioning measurements and/or SL data for SL communications | PSFCH with acknowledgement for PSSCH/PSCCH with positioning measurements and/or SL data for SL communications | PSFCH with acknowledgement for SL PRS | PSFCH with conflict information for SL PRS |
| Example 22 | PSFCH with conflict information for PSSCH/PSCCH with positioning measurements and/or SL data for SL communications | PSFCH with acknowledgement for PSSCH/PSCCH with positioning measurements and/or SL data for SL communications | PSFCH with conflict information for SL PRS | PSFCH with acknowledgement for SL PRS |
| Example 23 | PSFCH with conflict information for PSSCH/PSCCH with positioning measurements and/or SL data for SL communications | PSFCH with conflict information for SL PRS | PSFCH with acknowledgement for SL PRS | PSFCH with acknowledgement for PSSCH/PSCCH with positioning measurements and/or SL data for SL communications |
| Example 24 | PSFCH with conflict information for PSSCH/PSCCH with positioning measurements and/or SL data for SL communications | PSFCH with conflict information for SL PRS | PSFCH with acknowledgement for PSSCH/PSCCH with positioning measurements and/or SL data for SL communications | PSFCH with acknowledgement for SL PRS |

The UL determines $N_{TX,PSFCH}$ PSFCH transmissions, first with ascending order of priority for PSFCH transmissions of group 1, then with ascending order of priority for PSFCH transmissions of group 2, then with ascending order of priority for PSFCH transmissions of group 3, then with ascending order of priority for PSFCH transmissions of group 4, such that $$N_{TX,PSFCH} \geq \max\left(1, \sum_{i=1}^{K} M_i\right).$$

Where, for $1 \leq i \leq 8$, $M_i$ is the number of PSFCH transmissions of group 1 with priority level i, and for $9 \leq i \leq 16$, $M_i$ is the number of PSFCH transmissions of group 2 with priority level i–8, and for 17≤i≤24, $M_i$ is the number of PSFCH transmissions of group 3 with priority level i–16, and for i>24, $M_i$ is the number of PSFCH transmissions of group 4 with priority level i–24. K is the largest value satisfying $$P_{PSFCH,one} + 10\log_{10}\left(\max\left(1, \sum_{i=1}^{K} M_i\right)\right) \le P_{CMAX},$$

if any, otherwise K=0. The PSFCH power is given by: $P_{PSFCH,k}(i) = \min(P_{CMAX}-10 \ \log_{10}(N_{TX,PSFCH}), P_{PSFCH,one})$, where $P_{CMAX}$ is determined for $N_{TX,PSFCH}$ transmissions.

In one example of scenario 3: (1) the number of scheduled PSFCH transmissions in a transmission occasion is more than the maximum number of PSFCHs the UL can transmit, i.e., $N_{sch,TX,PSFCH}>N_{max,PSFCH}$ and (2) there is enough power to transmit the $N_{max,PSFCH}$ PSFCHs, i.e., $P_{PSFCH,one}+$ $10 \ \log_{10}(N_{max,PSFCH})\le P_{CMAX}$, Wherein, $P_{CMAX}$ is the configured maximum output power of the UL determined for $N_{sch,TX,PSFCH}$ transmissions.

In this case, the UE can transmit $N_{max,PSFCH}$, each with power $P_{PSFCH,k}(i)=P_{PSFCH,one}$, where k=1, . . . $N_{max,PSFCH}$. The $N_{max,PSFCH}$ to be transmitted can be determined based on prioritization as described later in this disclosure.

In one example of scenario 4: (1) the number of scheduled PSFCH transmissions in a transmission occasion is more than the maximum number of PSFCHs the UE can transmit, i.e., $N_{sch,TX,PSFCH}\le N_{max,PSFCH}$; and (2) there is not enough power to transmit the $N_{max,PSFCH}$ PSFCHs, i.e., $P_{PSFCH,one}+$ $10 \ \log_{10}(N_{max,PSFCH})>P_{CMAX}$, Wherein, $P_{CMAX}$ is the configured maximum output power of the UE determined for $N_{sch,TX,PSFCH}$ transmissions.

The $N_{max,PSFCH}$ to be transmitted can be determined based on prioritization as described later in this disclosure. Then the UE can select a fewer number of PSFCH transmissions than $N_{max,PSFCH}$ to transmit, such that the configured maximum output power of the UE (e.g., $P_{CMAX}$) is not exceeded.

In one example, there is one group for all the PSFCH transmissions. For example, the one group can include: PSFCH with acknowledgement for SL PRS and/or PSFCH with acknowledgement for PSSCH/PSCCH (e.g., with positioning measurements and/or SL data for SL communications), and/or conflict information for SL PRS and/or conflict information for PSSCH/PSCCH (e.g., with positioning measurements and/or SL data for SL communications).

The UE determines $N_{TX,PSFCH}$ PSFCH transmissions, for PSFCH transmissions such that $$N_{TX,PSFCH} \ge \max\left(1, \sum_{i=1}^{K} M_i\right).$$

Where, for 1≤i≤8, $M_i$ is the number of PSFCH transmissions with priority level i. K is the largest value satisfying $$P_{PSFCH,one} + 10\log_{10}\left(\max\left(1, \sum_{i=1}^{K} M_i\right)\right) \le P_{CMAX},$$

if any, otherwise K=0. The PSFCH power is given by: $P_{PSFCH,k}(i)=\min(P_{CMAX}-10 \ \log_{10}(N_{TX,PSFCH}), P_{PSFCH,one})$, where $P_{CMAX}$ is determined for $N_{TX,PSFCH}$ transmissions.

In one example, there are two groups for all the PSFCH transmissions. The groups can be determined according to the examples of TABLE 5 (other examples are also possible). The UE determines $N_{TX,PSFCH}$ PSFCH transmissions, first with ascending order of priority for PSFCH transmissions of group 1, then with ascending order of priority for PSFCH transmissions of group 2, such that $$N_{TX,PSFCH} \ge \max\left(1, \sum_{i=1}^{K} M_i\right).$$

Where, for 1≤i≤8, $M_i$ is the number of PSFCH transmissions of group 1 with priority level i, and for i>8, $M_i$ is the number of PSFCH transmissions of group 2 with priority level i–8. K is the largest value satisfying $$P_{PSFCH,one} + 10\log_{10}\left(\max\left(1, \sum_{i=1}^{K} M_i\right)\right) \le P_{CMAX},$$

if any, otherwise K=0. The PSFCH power is given by: $P_{PSFCH,k}(i)=\min(P_{CMAX}-10 \ \log_{10}(N_{TX,PSFCH}), P_{PSFCH,one})$, where $P_{CMAX}$ is determined for $N_{TX,PSFCH}$ transmissions.

In one example, there are three groups for all the PSFCH transmissions. The groups can be determined according to the examples of TABLE 6 (other examples are also possible). The UE determines $N_{TX,PSFCH}$ PSFCH transmissions, first with ascending order of priority for PSFCH transmissions of group 1, then with ascending order of priority for PSFCH transmissions of group 2, then with ascending order of priority for PSFCH transmissions of group 3, such that $$N_{TX,PSFCH} \ge \max\left(1, \sum_{i=1}^{K} M_i\right).$$

Where, for 1≤i≤8, $M_i$ is the number of PSFCH transmissions of group 1 with priority level i, and for 9≤i≤16, $M_i$ is the number of PSFCH transmissions of group 2 with priority level i–8, and for i>16, $M_i$ is the number of PSFCH transmissions of group 3 with priority level i–16. K is the largest value satisfying $$P_{PSFCH,one} + 10\log_{10}\left(\max\left(1, \sum_{i=1}^{K} M_i\right)\right) \le P_{CMAX},$$

if any, otherwise K=0. The PSFCH power is given by: $P_{PSFCH,k}(i)=\min(P_{CMAX}-10 \ \log_{10}(N_{TX,PSFCH}), P_{PSFCH,one})$, where $P_{CMAX}$ is determined for $N_{TX,PSFCH}$ transmissions.

In one example, there are four groups for all the PSFCH transmissions. The groups can be determined according to the examples of TABLE 7. The UE determines $N_{TX,PSFCH}$ PSFCH transmissions, first with ascending order of priority for PSFCH transmissions of group 1, then with ascending order of priority for PSFCH transmissions of group 2, then with ascending order of priority for PSFCH transmissions of group 3, then with ascending order of priority for PSFCH transmissions of group 4, such that $$N_{TX,PSFCH} \ge \max\left(1, \sum_{i=1}^{K} M_i\right).$$

Where, for 1≤i≤8, $M_i$ is the number of PSFCH transmissions of group 1 with priority level i, and for 9≤i≤16, $M_i$ is the number of PSFCH transmissions of group 2 with priority level i–8, and for 17≤i≤24, $M_i$ is the number of PSFCH transmissions of group 3 with priority level i–16, and for i>24, $M_i$ is the number of PSFCH transmissions of group 4 with priority level i–24. K is the largest value satisfying $$P_{PSFCH,one} + 10 \log_{10}\left(\max\left(1, \sum_{i=1}^{K} M_i\right)\right) \le P_{CMAX},$$

if any, otherwise K=0. The PSFCH power is given by: $P_{PSFCH,k}(i) = \min(P_{CMAX} - 10 \ \log_{10}(N_{TX,PSFCH}), P_{PSFCH,one})$, where $P_{CMAX}$ is determined for $N_{TX,PSFCH}$ transmissions.

In one example, a resource pool can be dedicated for SL-PRS. In one example, the priority of the SL PRS can be pre-configured and/or configured or updated by RRC signaling and MAC CE signaling and/or L1 control (DCI or SCI signaling). If not configured, or pre-configured, a priority level specified in the system specifications (e.g., highest priority level, or lowest priority level or priority level in the middle) can be used.

In one example, a resource pool can be dedicated for SL-PRS. In one example, the priority of the SL PRS can be indicated in an SCI Format (e.g., SCI in PSCCH, or SCI in PSSCH) associated with the SL PRS.

In one example, a resource pool can be dedicated for SL-PRS. A range of SL PRS priority values can be pre-configured and/or configured or updated by RRC signaling and MAC CE signaling and/or L1 control (DCI or SCI signaling). The priority of the SL PRS within the range (e.g., pre-configured or configured range) can indicated in an SCI Format (e.g., SCI in PSCCH, or SCI in PSSCH) associated with the SL PRS.

In one example, a resource pool can be dedicated for positioning, e.g., the resource pool can be used for SL PRS and for SL positioning measurements. In one example, the priority of the SL PRS can be pre-configured and/or configured or updated by RRC signaling and MAC CE signaling and/or L1 control (DCI or SCI signaling). If not configured, or pre-configured, a priority level specified in the system specifications (e.g., highest priority level, or lowest priority level or priority level in the middle) can be used.

In one example, a resource pool can be dedicated for positioning, e.g., the resource pool can be used for SL PRS and for SL positioning measurements. In one example, the priority of the SL PRS can be indicated in an SCI Format (e.g., SCI in PSCCH, or SCI in PSSCH) associated with the SL PRS.

In one example, a resource pool can be dedicated for positioning, e.g., the resource pool can be used for SL PRS and for SL positioning measurements. A range of SL PRS priority values can be pre-configured and/or configured or updated by RRC signaling and MAC CE signaling and/or L1 control (DCI or SCI signaling). The priority of the SL PRS within the range (e.g., pre-configured or configured range) can indicated in an SCI Format (e.g., SCI in PSCCH, or SCI in PSSCH) associated with the SL PRS.

In one example, a resource pool can be shared for SL-PRS and SL communications. In one example, the priority of the SL PRS can be pre-configured and/or configured or updated by RRC signaling and MAC CE signaling and/or L1 control (DCI or SCI signaling). If not configured, or pre-configured, a priority level specified in the system specifications (e.g., highest priority level, or lowest priority level or priority level in the middle) can be used.

In one example, a resource pool can be shared for SL-PRS and SL communications. In one example, the priority of the SL PRS can be indicated in an SCI Format (e.g., SCI in PSCCH, or SCI in PSSCH) associated with the SL PRS.

In one example, a resource pool can be shared for SL-PRS and SL communications. A range of SL PRS priority values can be pre-configured and/or configured or updated by RRC signaling and MAC CE signaling and/or L1 control (DCI or SCI signaling). The priority of the SL PRS within the range (e.g., pre-configured or configured range) can indicated in an SCI Format (e.g., SCI in PSCCH, or SCI in PSSCH) associated with the SL PRS.

In one example, a resource pool can be dedicated for positioning, e.g., the resource pool can be used for SL PRS and for SL positioning measurements or the resource pool can be shared for SL-PRS (SL positioning) and SL communications. In one example, the priority of the PSSCH/PSCCH for reporting positioning measurements can be pre-configured and/or configured or updated by RRC signaling and MAC CE signaling and/or L1 control (DCI or SCI signaling). If not configured, or pre-configured, a priority level specified in the system specifications (e.g., highest priority level, or lowest priority level or priority level in the middle) can be used.

In one example, a resource pool can be dedicated for positioning, e.g., the resource pool can be used for SL PRS and for SL positioning measurements or the resource pool can be shared for SL-PRS (SL positioning) and SL communications. In one example, the priority of the PSSCH/PSCCH for reporting positioning measurements can indicated in an SCI Format (e.g., SCI in PSCCH, or SCI in PSSCH) associated with the SL PRS.

In one example, a resource pool can be dedicated for positioning, e.g., the resource pool can be used for SL PRS and for SL positioning measurements or the resource pool can be shared for SL-PRS (SL positioning) and SL communications. A range of priority values for PSSCH/PSCCH for reporting positioning measurements can be pre-configured and/or configured or updated by RRC signaling and MAC CE signaling and/or L1 control (DCI or SCI signaling). The priority of the PSSCH/PSCCH for reporting positioning measurements within the range (e.g., pre-configured or configured range) can indicated in an SCI Format (e.g., SCI in PSCCH, or SCI in PSSCH) associated with the PSSCH/PSCCH for reporting positioning measurements.

In one example, a resource pool can be dedicated for positioning, e.g., the resource pool can be used for SL PRS and for SL positioning measurements or the resource pool can be shared for SL-PRS (SL positioning) and SL communications. The priority level of PSSCH/PSCCH for positioning measurement report is the same as the priority level of the corresponding SL PRS used for the positioning measurement.

In one example, a resource pool can be dedicated for positioning, e.g., the resource pool can be used for SL PRS and for SL positioning measurements or the resource pool can be shared for SL-PRS (SL positioning) and SL communications. The priority level of PSSCH/PSCCH for positioning measurement report is determined (e.g., by specification, configuration and/or indication) independent of the priority level of the corresponding SL PRS used for the positioning measurement.

A highest priority level or value can correspond to a lowest priority, and a lowest priority level or value can correspond to a highest priority. For example, priority level or value "1" or "0" can correspond to the highest priority, and priority level or value "8" or "7" can correspond to the lowest priority.

In one example, for a PSFCH transmission or reception with acknowledgment of a SL PRS, a priority value for the PSFCH is equal to the priority value of the associated SL PRS.

In one example, for a PSFCH transmission or reception with acknowledgment of a SL PRS, a priority value for the PSFCH is equal to the priority value indicated by SCI format associated with the SL PRS associated with acknowledgment.

In one example, for a PSFCH transmission with conflict information of a SL PRS, a priority value for the PSFCH is equal to the smallest priority value determined (or indicated) by the corresponding SL PRS for the conflicting resource(s).

In one example, for a PSFCH transmission with conflict information of a SL PRS, a priority value for the PSFCH is equal to the smallest priority value determined (or indicated) by the corresponding SL PRS and/or PSSCH for the conflicting resource(s).

In one example, for a PSFCH transmission with conflict information of a SL PRS, a priority value for the PSFCH is equal to the smallest priority value determined (or indicated) by the corresponding SCI formats associated with SL PRS for the conflicting resource(s).

In one example, for a PSFCH transmission with conflict information of a SL PRS, a priority value for the PSFCH is equal to the smallest priority value determined (or indicated) by the corresponding SCI formats associated with SL PRS and/or PSSCH for the conflicting resource(s).

In one example, for a PSFCH reception with conflict information of a SL PRS, a priority value for the PSFCH is equal to the priority value determined (or indicated) by the corresponding SL PRS for the conflicting resource.

In one example, for a PSFCH reception with conflict information of a SL PRS, a priority value for the PSFCH is equal to the priority value determined (or indicated) by the corresponding SCI formats associated with SL PRS for the conflicting resource.

In one example, for PSFCH transmissions in a slot, the PSFCH transmissions have a priority value equal to the smallest priority value of PSFCH transmissions with acknowledgement, if any, and PSFCH transmissions with conflict information, if any, in the slot.

In one example, for PSFCH receptions in a slot, the PSFCH receptions have a priority value equal to the smallest priority value of PSFCH receptions with acknowledgement, if any, and PSFCH receptions with conflict information, if any, in the slot.

In one example, if (1) a UE would transmit a first channel or signal using the E-UTRA radio access, and transmit second channels and/or signals using NR radio access, (2) a transmission of the first channel or signal overlaps in time with a transmission of the second channels and/or signals, and (3) the priories of the channels and signals are known to the UE at least T msec before the earliest transmission, where $T \leq 4$ up to the UEs implementation; the UE transmits the channels or signals of the radio access technology with the highest priority. The priority is determined based on (1) the SCI formats scheduling the transmissions, (2) as indicated by higher layers for S-SSB (e.g., provided by higher layer parameter sl-SSB-Priority NR) and E-UTRA SL synchronization signal, (3) for PSFCH as described earlier, (4) for SL PRS, as specified in the system specification and/or pre-configured and/or configured/updated by RRC signaling and/or MAC CE signaling and/or L1 control (e.g., DCI or SCI) signaling and/or indicated by SCI.

In one example, if (1) a UE would respectively transmit or receive a first channel or signal using the E-UTRA radio access, and receive a second channel or signal or transmit second channels and/or signals using NR radio access, (2) a transmission or reception of the first channel or signal overlaps in time with a reception of the second channel or signal or a transmission of the second channels and/or signals, and (3) the priories of the channels and signals are known to the UE at least T msec before the earliest transmission, where $T \leq 4$ up to the UEs implementation; the UE transmits or receives the channels or signals of the radio access technology with the highest priority. The priority is determined based on (1) the SCI formats scheduling the transmissions, (2) as indicated by higher layers for S-SSB (provided by higher layer parameter sl-SSB-Priority NR) and E-UTRA SL synchronization signal, (3) for PSFCH as described earlier, (4) for SL PRS, as specified in the system specification and/or pre-configured and/or configured/updated by RRC signaling and/or MAC CE signaling and/or L1 control (e.g., DCI or SCI) signaling and/or indicated by SCI.

In one example, if (1) a UE would transmit a set of $N_{sch,TX,PSFCH}$ PSFCHs and receive a set of $N_{sch,RX,PSFCH}$ PSFCHs, and (2) the transmissions of the $N_{sch,TX,PSFCH}$ PSFCHs overlap in time with the receptions of the $N_{sch,RX,PSFCH}$ PSFCHs, the UE transmits or receives only a set of PSFCHs corresponding to the smallest priority field value (highest priority) determined based on one of the following examples.

In one example, the set containing the PFSCH with the smallest priority value (or highest priority) among all PSFCHs.

In one example, the PSFCHs can be partitioned into two groups for example as illustrated in TABLE 5. The set containing a PSFCH is determined by: (1) first determined by PSFCHs within group 1 with the smallest priority value (or highest priority); and (2) if there are no PSFCHs in group 1, then determined by PSFCHs within group 2 with the smallest priority value (or highest priority).

In one example, the PSFCHs can be partitioned into three groups for example as illustrated in TABLE 6. The set containing a PSFCH is determined by: (1) first determined by PSFCHs within group 1 with the smallest priority value (or highest priority); (2) if there are no PSFCHs in group 1, then determined by PSFCHs within group 2 with the smallest priority value (or highest priority); and (3) if there are no PSFCHs in group 1 and group 2, then determined by PSFCHs within group 3 with the smallest priority value (or highest priority).

In one example, the PSFCHs can be partitioned into four groups for example as illustrated in TABLE 7. The set containing a PSFCH is determined by: (1) first determined by PSFCHs within group 1 with the smallest priority value (or highest priority); (2) if there are no PSFCHs in group 1, then determined by PSFCHs within group 2 with the smallest priority value (or highest priority); (3) if there are no PSFCHs in group 1 and group 2, then determined by PSFCHs within group 3 with the smallest priority value (or highest priority); and (4) if there are no PSFCHs in group 1 and group 2 and group 3, then determined by PSFCHs within group 4 with the smallest priority value (or highest priority).

In one example, if a UE would transmit $N_{sch,TX,PSFCH}$ PSFCHs in a PSFCH transmission occasion and the UE transmits $N_{TX,PSFCH}$ PSFCHs in the transmission occasion, the UE determines the PSFCHs to transmit based on one of the following examples, in the order indicated until $N_{TX,PSFCH}$ PSFCHs are transmitted.

In one example, the UE first transmits PSFCHs from $N_{TX,PSFCH}$ PSFCHs with the smallest priority values (highest priority).

In one example, the PSFCHs can be partitioned into two groups for example as illustrated in TABLE 5. In this example: (1) the UE first can transmit PSFCHs within group 1 from $N_{TX,PSFCH}$ PSFCHs with the smallest priority values (highest priority); and (2) subsequently the UE can transmit the remaining PSFCHs within group 2 from $N_{TX,PSFCH}$ PSFCHs with the smallest priority values (highest priority).

In one example, the PSFCHs can be partitioned into three groups for example as illustrated in TABLE 6. In this example: (1) the UE first can transmit PSFCHs within group 1 from $N_{TX,PSFCH}$ PSFCHs with the smallest priority values (highest priority); (2) subsequently the UE can transmit PSFCHs within group 2 from $N_{TX,PSFCH}$ PSFCHs with the smallest priority values (highest priority); and (3) subsequently the UE can transmit the remaining PSFCHs within group 3 from $N_{TX,PSFCH}$ PSFCHs with the smallest priority values (highest priority).

In one example, the PSFCHs can be partitioned into four groups for example as illustrated in TABLE 7. In this example: (1) the UE first can transmit PSFCHs within group 1 from $N_{TX,PSFCH}$ PSFCHs with the smallest priority values (highest priority); (2) subsequently the UE can transmit PSFCHs within group 2 from $N_{TX,PSFCH}$ PSFCHs with the smallest priority values (highest priority); (3) subsequently the UE can transmit PSFCHs within group 3 from $N_{TX,PSFCH}$ PSFCHs with the smallest priority values (highest priority); and (4) subsequently the UE can transmit the remaining PSFCHs within group 4 from $N_{TX},P_{SFC}H$ PSFCHs with the smallest priority values (highest priority).

In one example, if a UE indicates a capability to receive $N_{RX,PSFCH}$ PSFCHs in a PSFCH reception occasion, the UE determines the PSFCHs to receive based on one of the following examples, in the order indicated until $N_{RX,PSFCH}$ PSFCHs are received.

In one example, the UE attempts to receive all PSFCHs, or it can prioritize based on priority of PSFCH among all PSFCHs.

In one example, the PSFCHs can be partitioned into two groups for example as illustrated in TABLE 5. In this example: (1) the UE first can receive PSFCHs within group 1; and (2) subsequently the UE can receive PSFCHs within group 2.

In one example, the PSFCHs can be partitioned into three groups for example as illustrated in TABLE 6. In this example: (1) the UE first can receive PSFCHs within group 1; (2) subsequently the UE can receive PSFCHs within group 2; and (3) subsequently the UE receive PSFCHs within group 3.

In one example, the PSFCHs can be partitioned into four groups for example as illustrated in TABLE 7. In this example: (1) the UE first can receive PSFCHs within group 1; (2) subsequently the UE can receive PSFCHs within group 2; (3) subsequently the UE can receive PSFCHs within group 3; and (4) subsequently the UE can receive PSFCH within group 4.

For prioritization of SL PRS transmission or SL PRS reception and UL transmission, the same rules are followed as for the prioritization of SL transmission or SL reception and UL transmission as described in TS 38.213, wherein priority of SL PRS is determined as previously described in this disclosure.

In one example, if (1) a UE would transmit (Tx) or receive (Rx) a SL PRS, and (2) the UE would transmit (Tx) or receive (Rx) a PSSCH/PSCCH with a positioning measurement report, and (3) the SL PRS and the PSSCH/PSCCH with a positioning measurement report overlap in (a) time and frequency resources if Tx/Tx or Rx/Rx (b) in time resource if Tx/Rx or Rx/Tx, the UE transmits or receives the SL resources with the smallest priority value (highest priority). This is illustrated in TABLE 8.

In one example, if (1) a UE would transmit (Tx) or receive (Rx) a SL PRS, and (2) the UE would transmit (Tx) or receive (Rx) a PSSCH/PSCCH (e.g., with positioning measurements or SL data for SL communications), and (3) the SL PRS and the PSSCH/PSCCH overlap in (a) time and frequency resources if Tx/Tx or Rx/Rx (b) in time resource if Tx/Rx or Rx/Tx, the UE transmits or receives the SL resources with the smallest priority value (highest priority). This is illustrated in TABLE 8.

TABLE 8

| UL PRS | | | |
|---|---|---|---|
| SL PRS | PSSCH/PSCCH | Type of over | Outcome |
| SL PRS Tx higher priority | PSSCH/PSCCH Tx lower priority | Overlap in time and frequency | Transmit SL PRS |
| SL PRS Tx lower priority | PSSCH/PSCCH Tx higher priority | Overlap in time and frequency | Transmit PSSCH/PSCCH |
| SL PRS Tx higher priority | PSSCH/PSCCH Rx lower priority | Overlap in time | Transmit SL PRS |
| SL PRS Tx lower priority | PSSCH/PSCCH Rx higher priority | Overlap in time | Receive PSSCH/PSCCH |
| SL PRS Rx higher priority | PSSCH/PSCCH Tx lower priority | | Overlap in time |
| SL PRS Rx lower priority | PSSCH/PSCCH Tx higher priority | Overlap in time | Transmit PSSCH/PSCCH |
| SL PRS Rx higher priority | PSSCH/PSCCH Rx lower priority | Overlap in time and frequency | Receive SL PRS |
| SL PRS Rx lower priority | PSSCH/PSCCH Rx higher priority | Overlap in time and frequency | Receive PSSCH/PSCCH |

In one example, if (1) a UE would transmit (Tx) or receive (Rx) a SL PRS, and (2) the UE would transmit (Tx) or receive (Rx) a PSSCH/PSCCH with a positioning measurement report, and (3), the priority of the SL PRS and the PSSCH/PSCCH with a positioning measurement report are the same, and (4) the SL PRS and the PSSCH/PSCCH with a positioning measurement report overlap in (a) time and frequency resources if Tx/Tx or Rx/Rx (b) in time resource if Tx/Rx or Rx/Tx, the UE transmits or receives the SL resources based one of the following examples.

In one example, it is up to the UE's implementation.

In one example, SL PRS (e.g., by specifications or by configuration).

In one example, PSSCH/PSCCH with a positioning measurement report (e.g., by specifications or by configuration).

In one example, if (1) a UE would transmit (Tx) or receive (Rx) a SL PRS, and (2) the UE would transmit (Tx) or receive (Rx) a PSSCH/PSCCH (e.g., with a positioning measurement report or SL data for SL communication), and (3), the priority of the SL PRS and the PSSCH/PSCCH, and (4) the SL PRS and the PSSCH/PSCCH overlap in (a) time and frequency resources if Tx/Tx or Rx/Rx (b) in time resource if Tx/Rx or Rx/Tx, the UE transmits or receives the SL resources based one of the following examples.

In one example, it is up to the UE's implementation.

In one example, SL PRS (e.g., by specifications or by configuration).

In one example, PSSCH/PSCCH (e.g., by specifications or by configuration).

In the present disclosure, a power control for SL PRS and associated PSFCH in a dedicated resource pool for SL PRS or positioning or shared resource pool for SL PRS (SL positioning) and SL communications is provided.

In the present disclosure, a prioritization of SL PRS and associated PSFCH in a dedicated resource pool for SL PRS or positioning or shared resource pool for SL PRS (SL positioning) and SL communications is provided.

Embodiments and examples of the present disclosure are directed to the NR standard.

SL is one of the promising features of NR, targeting verticals such the automotive industry, public safety and other commercial application. SL has been first introduced to NR in release 16, with emphasis on V2X and public safety where the requirements are met. The support of SL has been expanded to other types of UEs such a vulnerable road users (VRUs), pedestrian UEs (PUEs) and other types of handheld devices, by supporting mechanisms for power saving for SL resource allocation as well as mechanisms that enhance reliability and reduce latency of SL transmissions. Another feature that NR supports is positioning, using the NR radio interface for performing positioning measurements to determine or assist in determining the location of a UE. NR positioning was first introduced using the Uu interface in Rel-16, and further enhanced for improved accuracy and reduced latency. In Rel-18 a new Work Item has been approved to specify SL positioning. In the present disclosure, the design of power control and prioritization for SL PRS are provided.

Figure 12:
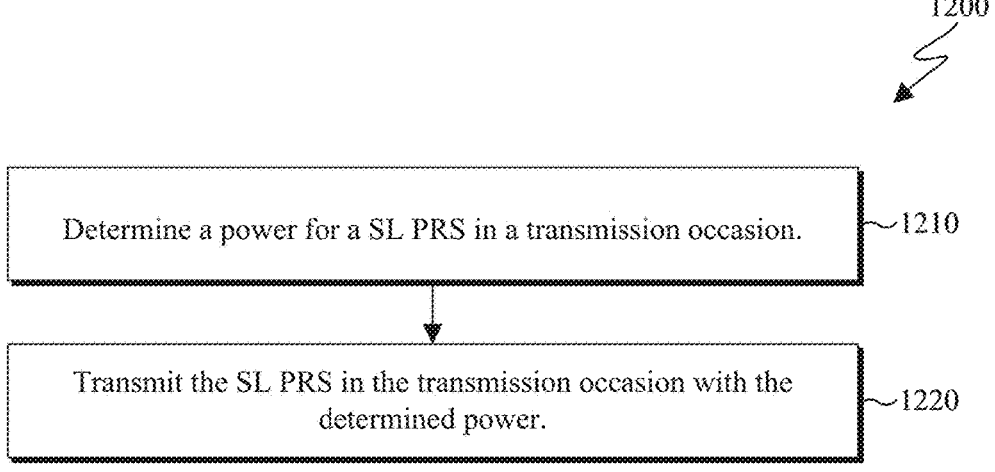
FIG. 12 illustrates an example method performed by a UE in a wireless communication system according to embodiments of the present disclosure.

FIG. 12 illustrates an example method 1200 performed by a UE in a wireless communication system according to embodiments of the present disclosure. The method 1200 of FIG. 12 can be performed by any of the UEs 111-116 of FIG. 1, such as the UE 116 of FIG. 3, and a corresponding method can be performed by another of the UEs 111-116. The method 1200 is for illustration only and other embodiments can be used without departing from the scope of the present disclosure.

The method 1200 begins with the UE determining a power for a SL PRS in a transmission occasion (1210). For example, in 1210, the UE may determine the power based on a formula of $P_{SL-PRS}(i)=\min(P_{CMAX},P_{MAX,CBR},\min(P_{SL-PRS,D}(i),P_{SL-PRS,SL}(i)))$. Here, $P_{CMAX}$ is a configured maximum output power of the UE, $P_{MAX,CBR}$ is related to a priority level of the SL PRS and a channel busy ratio (CBR) range for a CBR measured in slot i–N, where N is a congestion control processing time, $P_{SL-PRS,D}$ (i) is a component for downlink (DL) pathloss based power control for the SL PRS, and $P_{SL-PRS,SL}(i)$ is a component for SL pathloss based power control for the SL PRS. The UE then transmits the SL PRS in the transmission occasion with the determined power (1220).

In various embodiments, the SL PRS is associated with one antenna port.

In various embodiments, the UE may also receive information related to a $P_{O,D}$ value for the DL pathloss based power control and calculate the component for the DL pathloss based power control based on a formula of $$P_{SL-PRS,D}(i) = P_{O,D} + 10\log_{10}\left(2^{\mu} \cdot M_{RB}^{SL-PRS}(i)\right) + \alpha_D \cdot PL_D.$$

Here, μ is a sub-carrier spacing configuration of the SL PRS, $$M_{RB}^{SL-PRS}(i)$$

is a number of resource blocks for the SL PRS in the transmission occasion i, $\alpha_D$ is an alpha value for DL pathloss based power control for the SL PRS, and $PL_D$ is a downlink pathloss. In some embodiments, the UE operates in a resource pool shared with SL data, the $P_{O,D}$ is for the DL pathloss based power control configured for a PSSCH or a PSCCH, and the $\alpha_D$ is for the DL pathloss based power control configured for the PSSCH or PSCCH. In some embodiments, the UE operates in a resource pool dedicated for the SL PRS, the $P_{O,D}$ is for the DL pathloss based power control configured for the SL PRS, and the $\alpha_D$ is for the DL pathloss based power control configured for the SL PRS.

In various embodiments, when a value for $\alpha_D$ is not provided, the processor is further configured to set $\alpha_D=1$. In other embodiments, when a value for $P_{O,D}$ is not provided, the UE configured to calculate the component for the DL pathloss based power control based on a formula of $P_{SL-PRS,D}$(i) $\min(P_{CMAX},P_{MAX,CBR})$.

In various embodiments, the UE may also receive information related to a $P_{O,SL}$ value for the SL pathloss based power control and calculate the component for SL pathloss based power control for the SL PRS based on a formula of $$P_{SL-PRS,SL}(i) = P_{O,SL} + 10\log\left(2^{\mu} \cdot M_{RB}^{SL-PRS}(i)\right) + \alpha_{SL} \cdot PL_{SL}.$$

Here, μ is a sub-carrier spacing configuration of the SL PRS, $$M_{RB}^{SL-PRS}(i)$$

is a number of resource blocks for the SL PRS transmission occasion i, $\alpha_{SL}$ is an alpha value for the SL pathloss based power control for the SL PRS, and $PL_{SL}$ is a SL pathloss. In some embodiments, the UE operates in a resource pool shared with SL data, the $P_{O,SL}$ is the SL pathloss based power control configured for a PSSCH or a PSCCH, and the $\alpha_{SL}$ is for the SL pathloss based power control configured for the PSSCH or PSCCH.

In various embodiments, the UE may also receive information related to a higher layer filtered reference signal received power (RSRP) of the SL PRS from a UE receiving the SL PRS, where the higher layer filtered RSRP is filtered across SL PRS transmission occasions using a filter configuration provided by a parameter sl-FilterCoefficient. The UE may also calculate a reference signal transmit power based on a SL PRS transmit power per resource element (RE) filtered across SL PRS transmission occasions using a filter configuration provided by the parameter sl-FilterCoefficient and calculate the SL pathloss based on $PL_{SL}$=the reference signal power−the higher layer filtered RSRP.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a processor configured to determine a power for a sidelink (SL) positioning reference signal (PRS) in a transmission occasion i based on $P_{SL-PRS}(i)=\min(P_{CMAX}, P_{MAX,CBR}, \min(P_{SL-PRS,D}(i), P_{SL-PRS,SL}(i)))$, wherein:

$P_{CMAX}$ is a configured maximum output power of the UE, $P_{MAX,CBR}$ is related to a priority level of the SL PRS and a channel busy ratio (CBR) range for a CBR measured in slot i−N, where N is a congestion control processing time, $P_{SL-PRS,D}(i)$ is a component for downlink (DL) pathloss based power control for the SL PRS, and $P_{SL-PRS,SL}(i)$ is a component for SL pathloss based power control for the SL PRS; and a transceiver operably coupled to the processor, the transceiver configured to transmit the SL PRS in the transmission occasion i with the power $P_{SL-PRS}(i)$ to a second UE.

2. The UE of claim 1, wherein the SL PRS is associated with one antenna port.

3. The UE of claim 1, wherein:

the transceiver further configured to receive information related to a $P_{O,D}$ value for the DL pathloss based power control, the processor is further configured to calculate the component for the DL pathloss based power control based on $$P_{SL-PRS,D}(i) = P_{O,D} + 10\log_{10}\left(2^{\mu} \cdot M_{RB}^{SL-PRS}(i)\right) + \alpha_D \cdot PL_D,$$

μ is a sub-carrier spacing configuration of the SL PRS, $$M_{RB}^{SL-PRS}(i)$$

is a number of resource blocks for the SL PRS in the transmission occasion i, $\alpha_D$ is an alpha value for DL pathloss based power control for the SL PRS, and $PL_D$ is a downlink pathloss.

4. The UE of claim 3, wherein:

the UE operates in a resource pool shared with SL data, the $P_{O,D}$ is for the DL pathloss based power control configured for a physical sidelink shared channel (PSSCH) or a physical sidelink control channel (PSCCH), and the $\alpha_D$ is for the DL pathloss based power control configured for the PSSCH or PSCCH.

5. The UE of claim 3, wherein:

the UE operates in a resource pool dedicated for the SL PRS, the $P_{O,D}$ is for the DL pathloss based power control configured for the SL PRS, and the $\alpha_D$ is for the DL pathloss based power control configured for the SL PRS.

6. The UE of claim 3, wherein, when a value for $\alpha_D$ is not provided, the processor is further configured to set $\alpha_D=1$.

7. The UE of claim 1, wherein, when a value for $P_{O,D}$ is not provided, the processor is further configured to calculate the component for the DL pathloss based power control based on $P_{SL-PRS,D}(i)=\min(P_{CMAX}, P_{MAX,CBR})$.

8. The UE of claim 1, wherein:

the transceiver further configured to receive information related to a $P_{O,SL}$ value for the SL pathloss based power control, the processor is further configured to calculate the component for SL pathloss based power control for the SL PRS based on $$P_{SL-PRS,SL}(i) = P_{O,SL} + 10\log_{10}\left(2^{\mu} \cdot M_{RB}^{SL-PRS}(i)\right) + \alpha_{SL} \cdot PL_{SL},$$

μ is a sub-carrier spacing configuration of the SL PRS, $$M_{RB}^{SL-PRS}(i)$$

is a number of resource blocks for the SL PRS transmission occasion i, $\alpha_{SL}$ is an alpha value for the SL pathloss based power control for the SL PRS, and $PL_{SL}$ is a SL pathloss.

9. The UE of claim 8, wherein:

the UE operates in a resource pool shared with SL data, the $P_{O,SL}$ is the SL pathloss based power control configured for a physical sidelink shared channel (PSSCH) or a physical sidelink control channel (PSCCH), and the $\alpha_{SL}$ is for the SL pathloss based power control configured for the PSSCH or PSCCH.

10. The UE of claim 8, wherein:

the transceiver is further configured to receive information related to a higher layer filtered reference signal received power (RSRP) of the SL PRS from the second UE, wherein, the higher layer filtered RSRP is across SL PRS transmission occasions using a filter configuration provided by a parameter sl-FilterCoefficient, and the processor is further configured to:

calculate a reference signal power based on a SL PRS transmit power per resource element (RE), filtered across SL PRS transmission occasions using a filter configuration provided by the parameter sl-FilterCoefficient, and calculate the SL pathloss based on $PL_{SL}$=the reference signal power−the higher layer filtered RSRP.

11. A method of operating a user equipment (UE), the method comprising:

determining a power for a sidelink (SL) positioning reference signal (PRS) in a transmission occasion i based on $P_{SL-PRS}(i)=\min(P_{CMAX}, P_{MAX,CBR}, \min(P_{SL-PRS,D}(i), P_{SL-PRS,SL}(i)))$, wherein:

$P_{CMAX}$ is a configured maximum output power of the UE, $P_{MAX,CBR}$ is related to a priority level of the SL PRS and a channel busy ratio (CBR) range for a CBR measured in slot i−N, where N is a congestion control processing time, $P_{SL-PRS,D}(i)$ is a component for downlink (DL) pathloss based power control for the SL PRS, and $P_{SL\text{-}PRS,SL}(i)$ is a component for SL pathloss based power control for the SL PRS; and transmitting the SL PRS in the transmission occasion i with the power $P_{SL\text{-}PRS}(i)$ to a second UE.

12. The method of claim 11, wherein the SL PRS is associated with one antenna port.

13. The method of claim 11, further comprising:

receiving information related to a $P_{O,D}$ value for the DL pathloss based power control, and calculating the component for the DL pathloss based power control based on $$P_{SL\text{-}PRS,D}(i) = P_{O,D} + 10\log_{10}\!\left(2^{\mu} \cdot M_{RB}^{SL\text{-}PRS}(i)\right) + \alpha_D \cdot PL_D,$$

wherein:

$\mu$ is a sub-carrier spacing configuration of the SL PRS, $$M_{RB}^{SL\text{-}PRS}(i)$$

is a number of resource blocks for the SL PRS in the transmission occasion i, $\alpha_D$ is an alpha value for DL pathloss based power control for the SL PRS, and $PL_D$ is a downlink pathloss.

14. The method of claim 13, wherein:

the UE operates in a resource pool shared with SL data, the $P_{O,D}$ is for the DL pathloss based power control configured for a physical sidelink shared channel (PSSCH) or a physical sidelink control channel (PSCCH), and the $\alpha_D$ is for the DL pathloss based power control configured for the PSSCH or PSCCH.

15. The method of claim 13, wherein:

the UE operates in a resource pool dedicated for the SL PRS, the $P_{O,D}$ is for the DL pathloss based power control configured for the SL PRS, and the $\alpha_D$ is for the DL pathloss based power control configured for the SL PRS.

16. The method of claim 13, further comprising, when a value for $\alpha_D$ is not provided, setting $\alpha_D{=}1$.

17. The method of claim 11, further comprising, when a value for $P_{O,D}$ is not provided, calculating the component for the DL pathloss based power control based on $P_{SL\text{-}PRS,D}(i){=}\min(P_{CMAX},P_{MAX,CBR})$.

18. The method of claim 11, further comprising:

receiving information related to a $P_{O,SL}$ value for the SL pathloss based power control, and calculating the component for SL pathloss based power control for the SL PRS based on $$P_{SL\text{-}PRS,SL}(i) = P_{O,SL} + 10\log_{10}\!\left(2^{\mu} \cdot M_{RB}^{SL\text{-}PRS}(i)\right) + \alpha_{SL} \cdot PL_{SL},$$

wherein:

$\mu$ is a sub-carrier spacing configuration of the SL PRS, $$M_{RB}^{SL\text{-}PRS}(i)$$

is a number of resource blocks for the SL PRS transmission occasion i, $\alpha_{SL}$ is an alpha value for the SL pathloss based power control for the SL PRS, and $PL_{SL}$ is a SL pathloss.

19. The method of claim 18, wherein:

the UE operates in a resource pool shared with SL data, the $P_{O,SL}$ is for the SL pathloss based power control configured for a physical sidelink shared channel (PSSCH) or a physical sidelink control channel (PSCCH), and the $\alpha_{SL}$ is for the SL pathloss based power control configured for the PSSCH or PSCCH.

20. The method of claim 18, further comprising:

receiving information related to a higher layer filtered reference signal received power (RSRP) of the SL PRS from the second UE, wherein the higher layer filtered RSRP is across SL PRS transmission occasions using a filter configuration provided by a parameter sl-Filter-Coefficient, calculating a reference signal power based on a SL PRS transmit per resource element (RE) filtered across SL PRS transmission occasions using a filter configuration provided by the parameter sl-FilterCoefficient, and calculating a SL pathloss based on $PL_{SL}{=}$the reference signal power$-$the higher layer filtered RSRP.

* * * * *